US012763914B2

(12) United States Patent
Hong et al.

(10) Patent No.: US 12,763,914 B2
(45) Date of Patent: Oct. 13, 2026

(54) METHOD AND APPARATUS FOR SIDELINK TERMINAL TO TRANSMIT AND RECEIVE SIGNAL RELATED TO CHANNEL STATE REPORT IN WIRELESS COMMUNICATION SYSTEM

(71) Applicant: LG ELECTRONICS INC., Seoul (KR)

(72) Inventors: Uihyun Hong, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 428 days.

(21) Appl. No.: 17/310,681

(22) PCT Filed: Feb. 24, 2020

(86) PCT No.: PCT/KR2020/002611

§ 371 (c)(1),
(2) Date: Aug. 17, 2021

(87) PCT Pub. No.: WO2020/171669

PCT Pub. Date: Aug. 27, 2020

(65) Prior Publication Data

US 2022/0077993 A1 Mar. 10, 2022

Related U.S. Application Data

(60) Provisional application No. 62/914,658, filed on Oct. 14, 2019, provisional application No. 62/809,729, filed on Feb. 24, 2019.

(51) Int. Cl.

| | |
|---|---|
| ***H04W 72/20*** | (2023.01) |
| ***H04B 7/06*** | (2006.01) |
| ***H04L 5/00*** | (2006.01) |

(52) U.S. Cl.
CPC ......... *H04L 5/0057* (2013.01); *H04B 7/0626* (2013.01); *H04W 72/20* (2023.01)

(58) Field of Classification Search
CPC ....... H04W 4/40; H04W 24/08; H04W 24/10; H04W 28/0236; H04W 28/0268;
(Continued)

(56) References Cited

U.S. PATENT DOCUMENTS

| | | | | |
|---|---|---|---|---|
| 9,344,173 B2 * | 5/2016 | Kim | ...................... | H04W 24/10 |
| 12,237,928 B2 * | 2/2025 | Ye | ......................... | H04L 1/1607 |

(Continued)

FOREIGN PATENT DOCUMENTS

| | | |
|---|---|---|
| WO | 2018208216 | 11/2018 |

OTHER PUBLICATIONS

PCT International Application No. PCT/KR2020/002611 International Search Report dated Jun. 18, 2020, 4 pages.

(Continued)

*Primary Examiner* — Jean A Gelin
(74) *Attorney, Agent, or Firm* — LEE, HONG, DEGERMAN, KANG & WAIMEY

(57) ABSTRACT

A method of transmitting and receiving a signal by a sidelink user equipment (UE) in a wireless communication system includes receiving a physical sidelink shared channel (PSSCH) including a channel state information reference signal (CSI-RS) and transmitting a channel state information (CSI) report based on the CSI-RS within a predetermined window. A parameter related to the predetermined window is independently configured with respect to at least one of a resource pool, a service type, a priority, a quality of service (QoS) parameter, a block error rate (BLER), a speed, a CSI payload size, a subchannel size or a frequency resource region size.

20 Claims, 33 Drawing Sheets

(58) Field of Classification Search

CPC ............... H04W 64/006; H04W 72/02; H04W 72/0453; H04W 72/1263; H04W 72/0473; H04W 72/20; H04W 72/23; H04W 72/25; H04W 72/27; H04W 72/29; H04W 92/18; H04L 5/0048; H04L 5/005; H04L 5/0051; H04L 5/0057; H04L 5/006; H04B 7/0626; H04B 7/0639; H04B 7/0632; H04B 7/0673; H04B 7/06954

USPC .......................................................... 370/329

See application file for complete search history.

(56) References Cited

U.S. PATENT DOCUMENTS

2013/0195045 A1* 8/2013 Papasakellariou ... H04B 7/0626 370/329
2013/0258874 A1* 10/2013 Khoshnevis .......... H04L 5/0064 370/252
2013/0286993 A1* 10/2013 Lee ....................... H04L 5/0053 370/329
2014/0105049 A1* 4/2014 Kim ...................... H04L 5/0057 370/252
2015/0023194 A1* 1/2015 Seo ....................... H04W 24/10 370/252
2015/0063324 A1 3/2015 Lee et al.
2015/0244443 A1* 8/2015 Papasakellariou ... H04B 7/0626 370/329
2016/0174096 A1* 6/2016 Khoshnevis .......... H04L 5/0048 370/252
2016/0204845 A1* 7/2016 Kim ..................... H04B 7/0478 370/329
2016/0212643 A1* 7/2016 Park ..................... H04B 7/0478
2016/0241434 A1 8/2016 Li et al.
2016/0277090 A1* 9/2016 Kim ..................... H04B 7/0479
2016/0278003 A1* 9/2016 Kim .................. H04W 72/0446
2018/0234994 A1* 8/2018 Yasukawa ............... H04W 4/70
2020/0029340 A1* 1/2020 He ........................ H04W 76/14
2020/0037343 A1* 1/2020 He ........................ H04W 72/20
2020/0228247 A1* 7/2020 Guo .................... H04W 52/383
2020/0322024 A1* 10/2020 Cheng ................... H04W 76/11
2020/0359375 A1* 11/2020 Hwang ................. H04L 5/0055
2021/0219268 A1* 7/2021 Li ......................... H04W 72/20
2021/0250919 A1* 8/2021 Wang .................... H04W 72/23
2021/0329603 A1* 10/2021 Zhao ................... H04W 72/542
2021/0345396 A1* 11/2021 Yu ......................... H04W 72/23
2021/0385845 A1* 12/2021 Zhao ................... H04W 72/569
2021/0410084 A1* 12/2021 Li ....................... H04W 52/265
2022/0014338 A1* 1/2022 Yoshioka .............. H04W 8/005
2022/0085923 A1* 3/2022 Ye ......................... H04L 1/1864
2022/0104238 A1* 3/2022 Aiba ..................... H04L 5/0053
2022/0109527 A1* 4/2022 Hwang ................. H04W 72/23
2022/0124622 A1* 4/2022 Islam .................. H04W 72/542
2022/0150730 A1* 5/2022 Freda .................... H04L 1/1812
2023/0050238 A1* 2/2023 Ganesan ............... H04W 76/14

OTHER PUBLICATIONS

Awal, "Efficient CQI Feedback Resource Utilization for Multi-user Multi-Carrier Wireless System" Dissertation, Computer Science, Graduate Division, University of Paris—Sud XI, Oct. 2011, 112 Pages.

Samsung, "Considerations on Sidelink CSI," 3GPP TSG RAN WG1 #96, R1-1902279, Feb.-Mar. 2019, 6 pages.

Korean Intellectual Property Office Application No. 10-2021-7025863, Notice of Allowance dated Jul. 11, 2024, 7 pages.

OPPO, "Physical layer structure for NR-V2X," R1-1902385, 3GPP TSG RAN WG1 #96, Mar. 2019, 6 pages.

Intel Corporation, "QoS and Congestion Control for NR V2X Sidelink Communication," R1-1902487, 3GPP TSG RAN WG1 Meeting #96, Mar. 2019, 9 pages.

* cited by examiner

【FIG. 1】
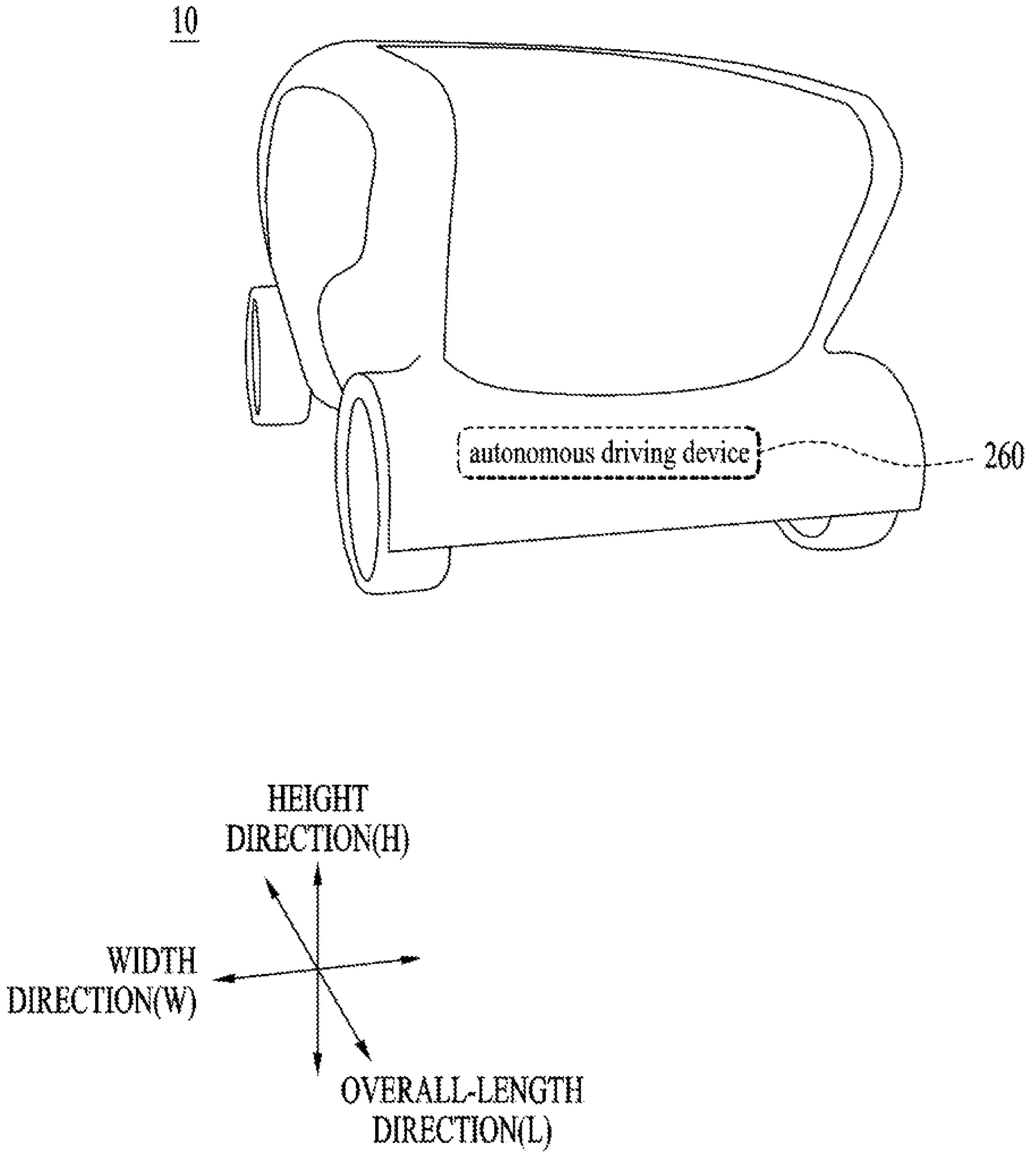

【FIG. 2】
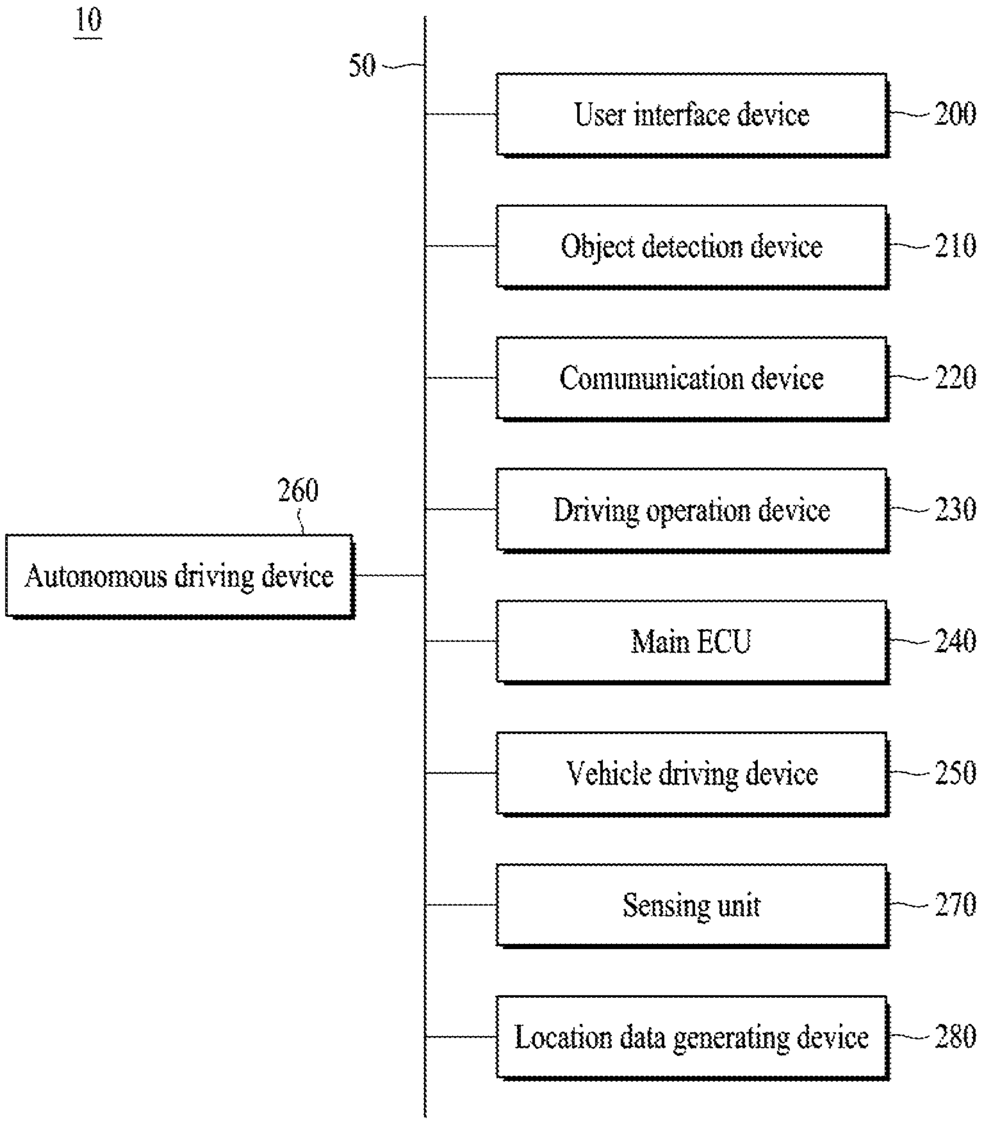

【FIG. 3】
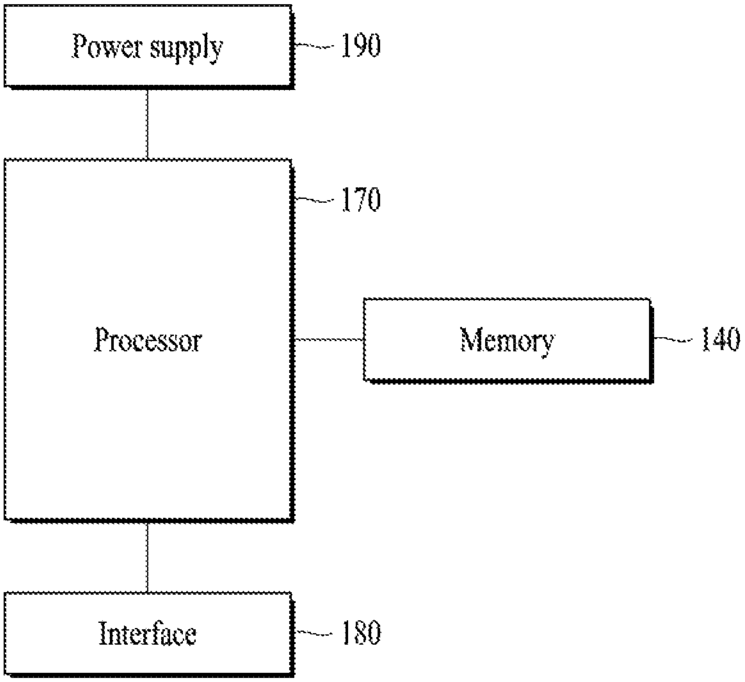

【FIG. 4】
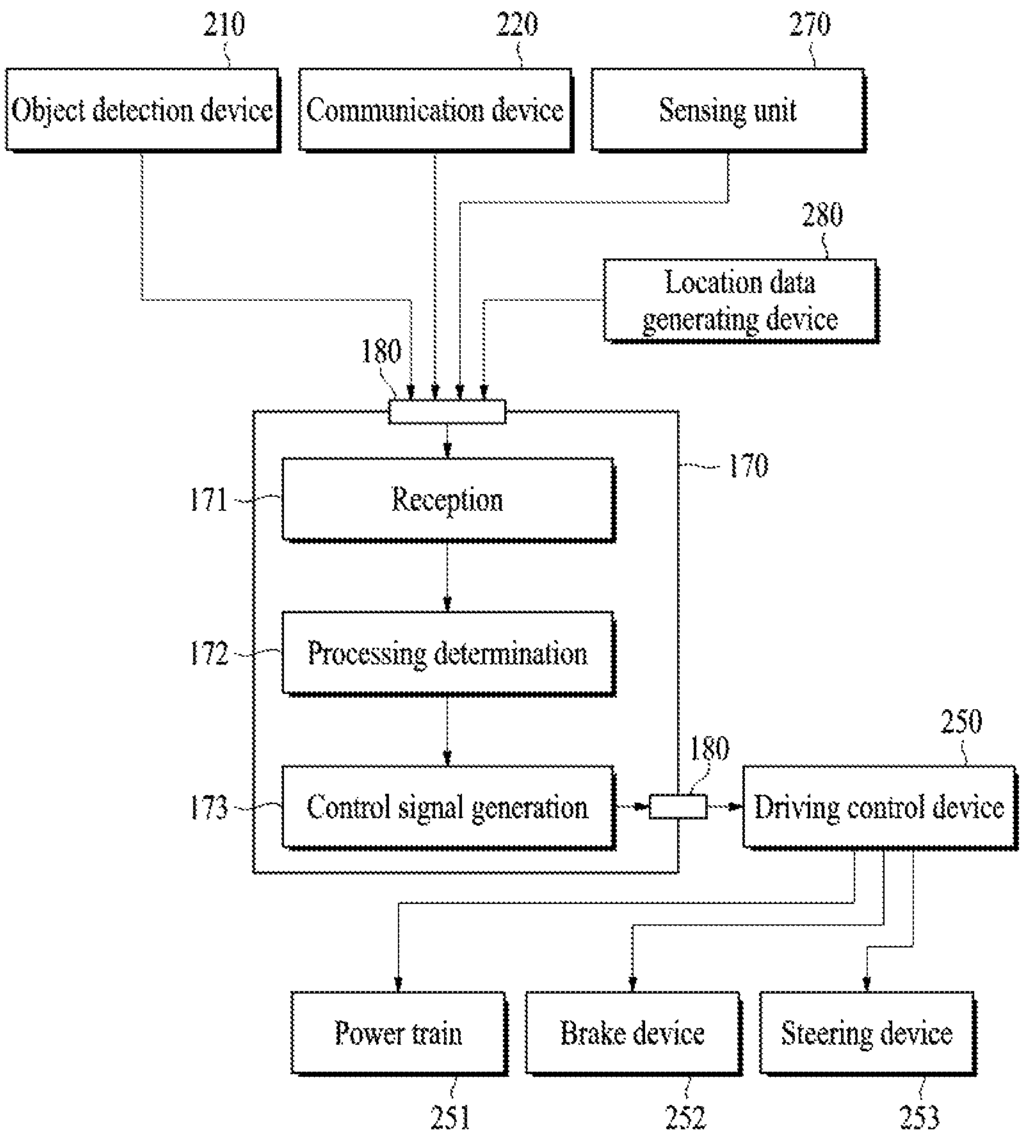

【FIG. 5】
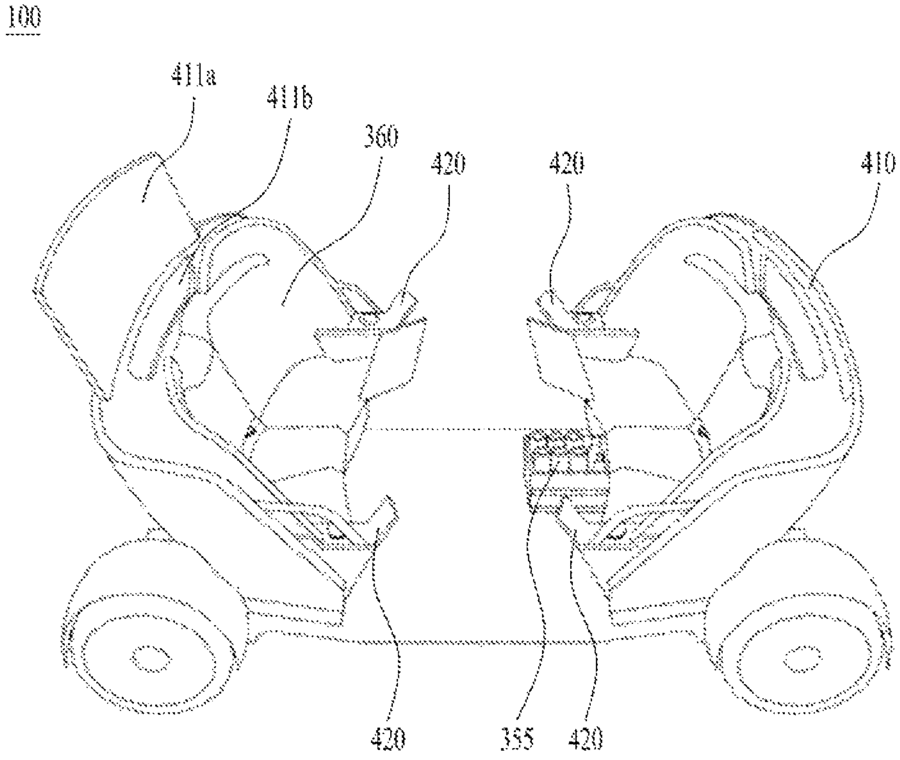

【FIG. 6】
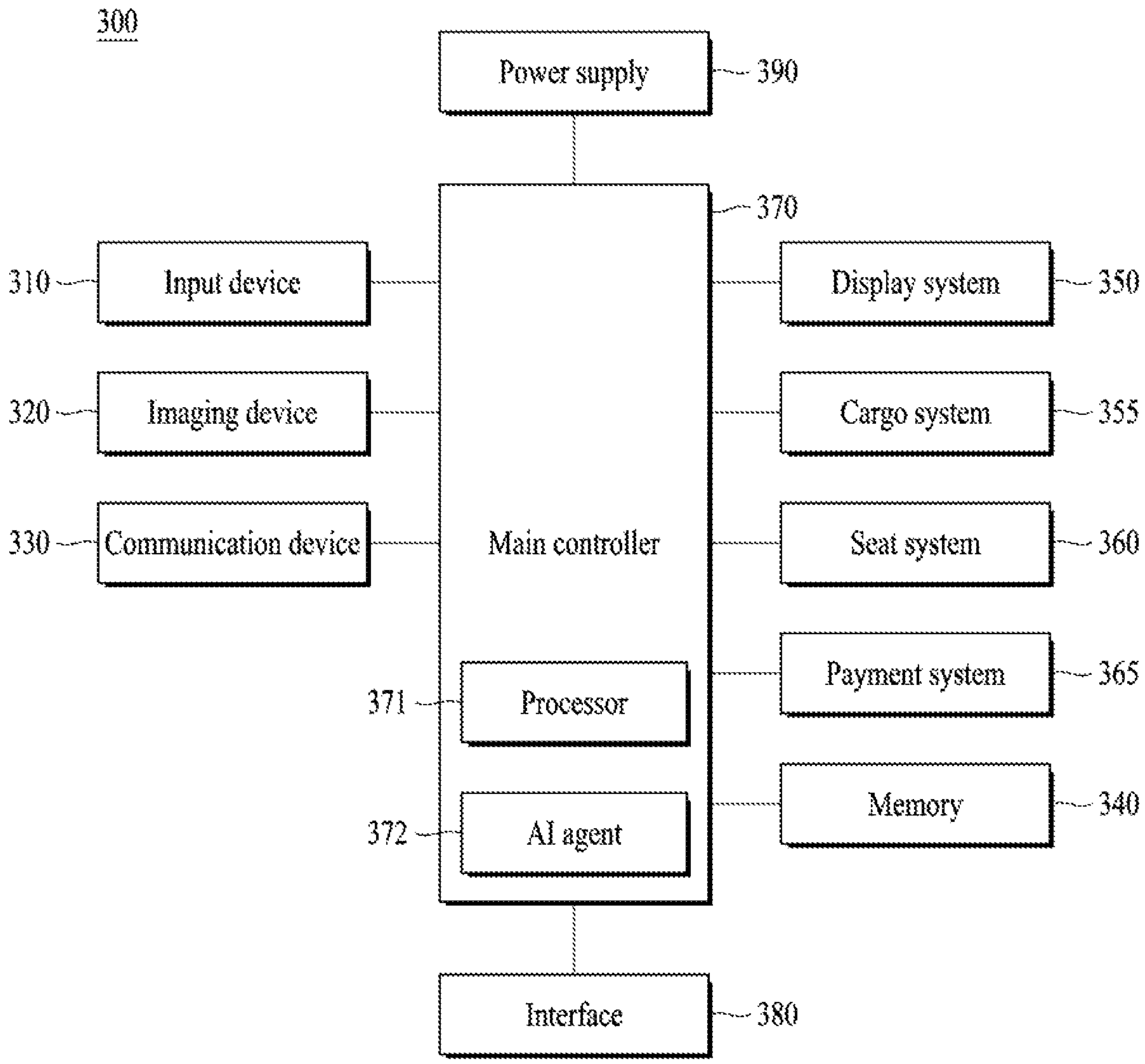

【FIG. 7】
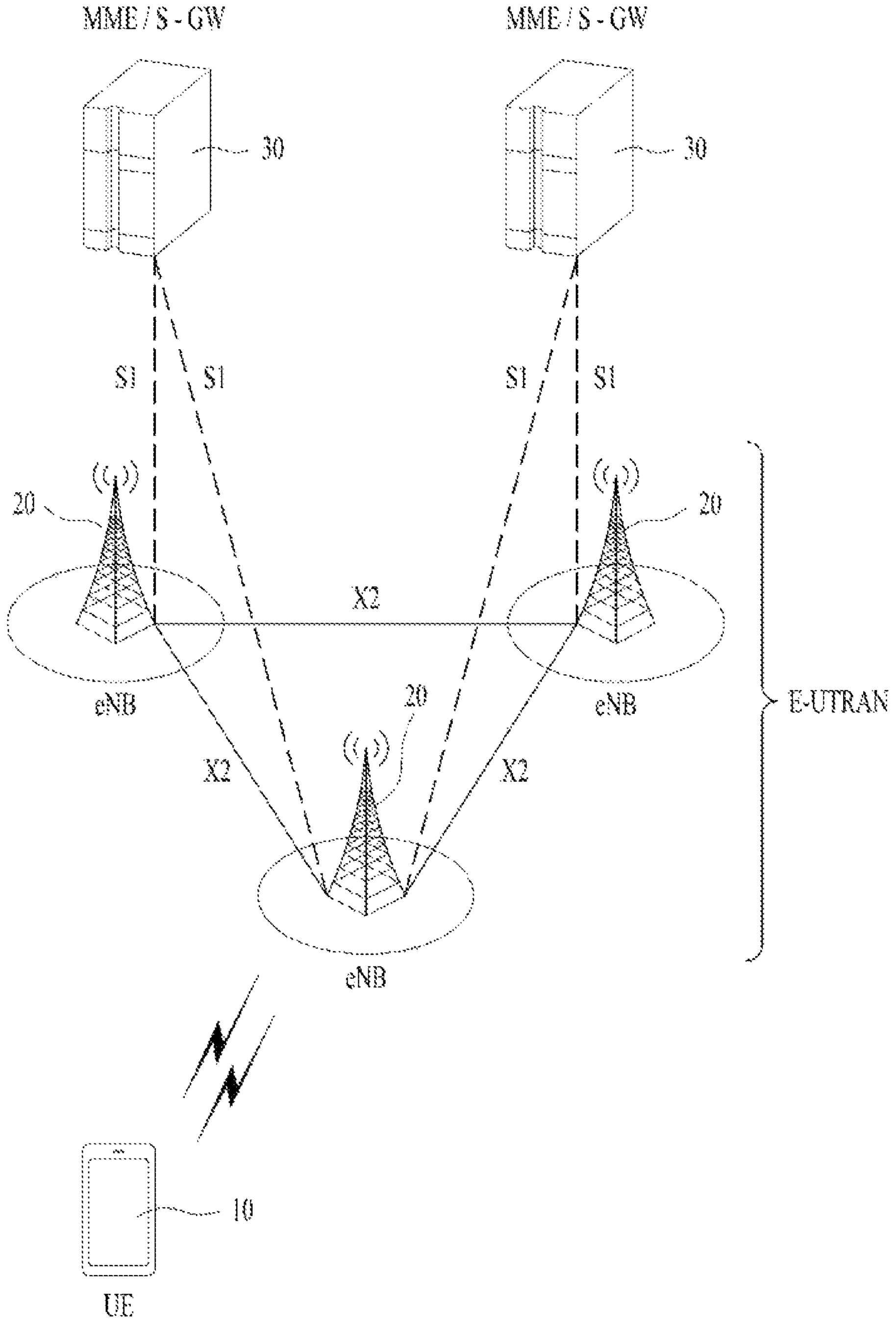

【FIG. 8】
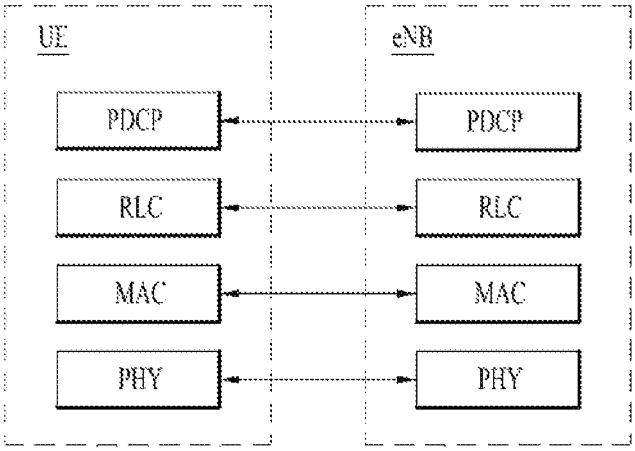
【FIG. 9】
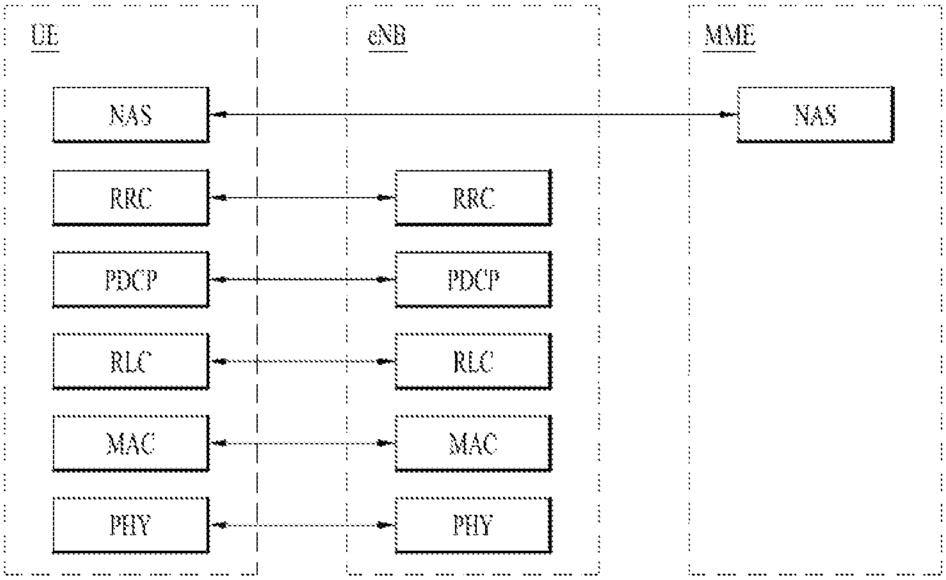

【FIG. 10】
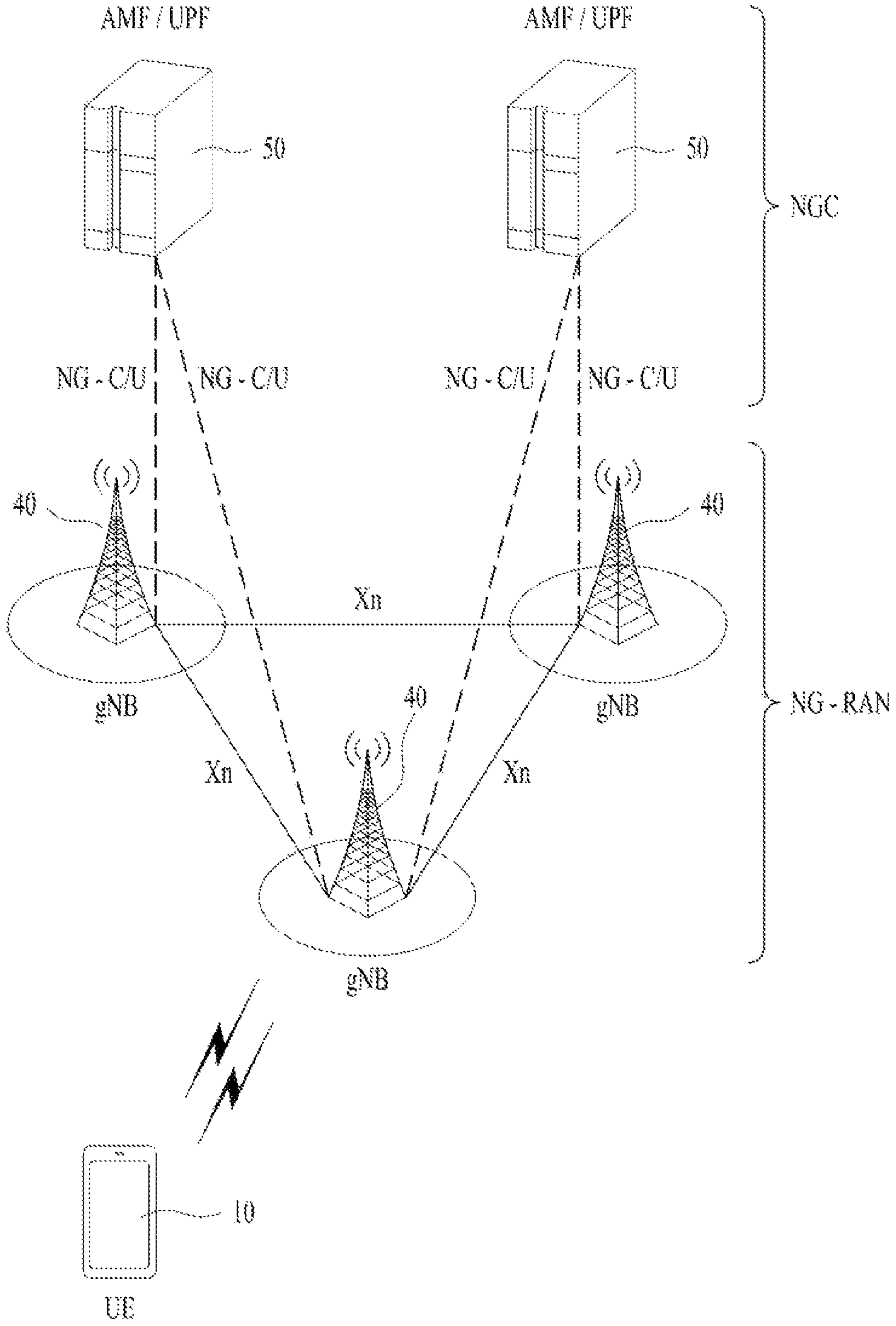

【FIG. 11】
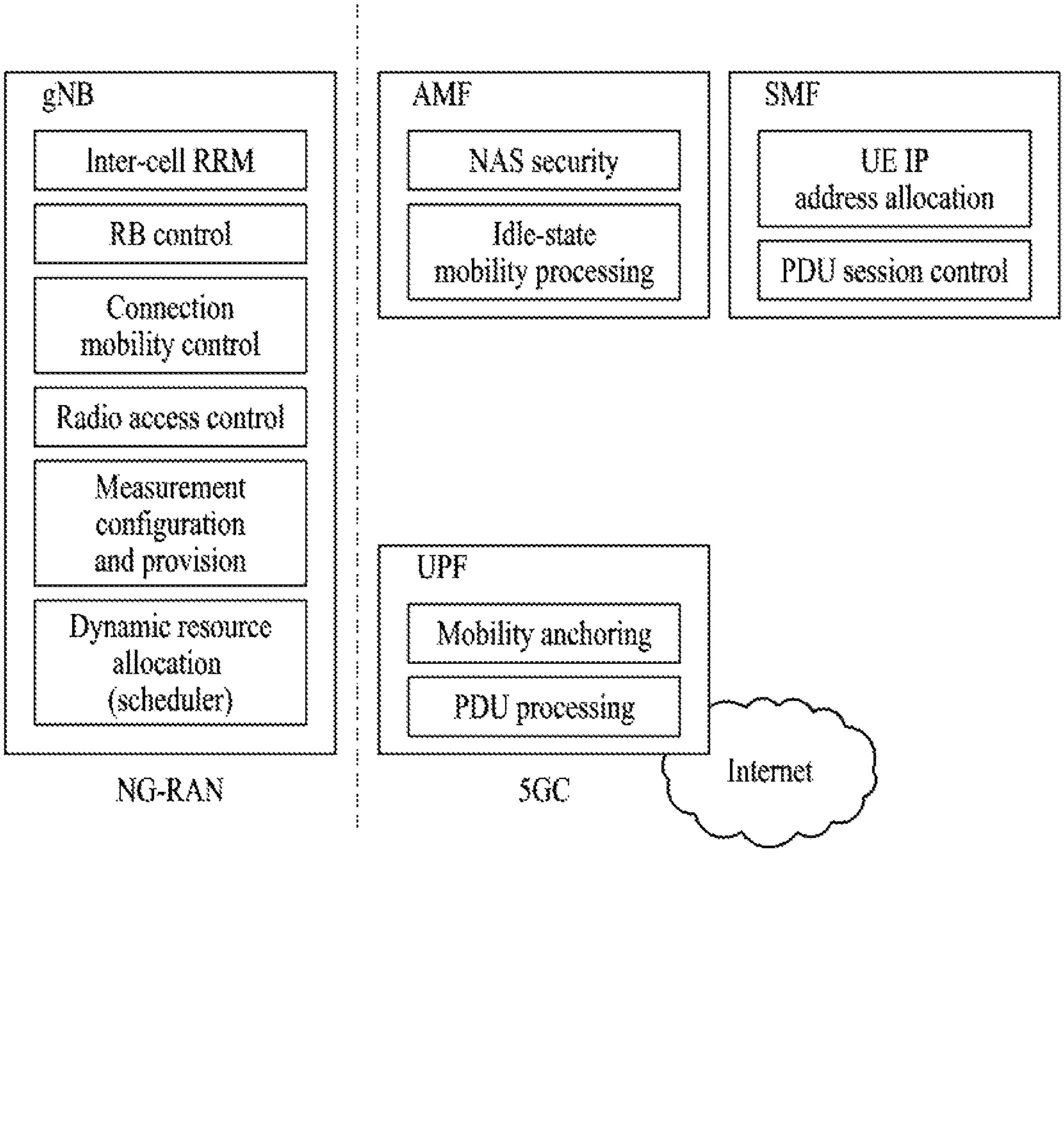

【FIG. 12】
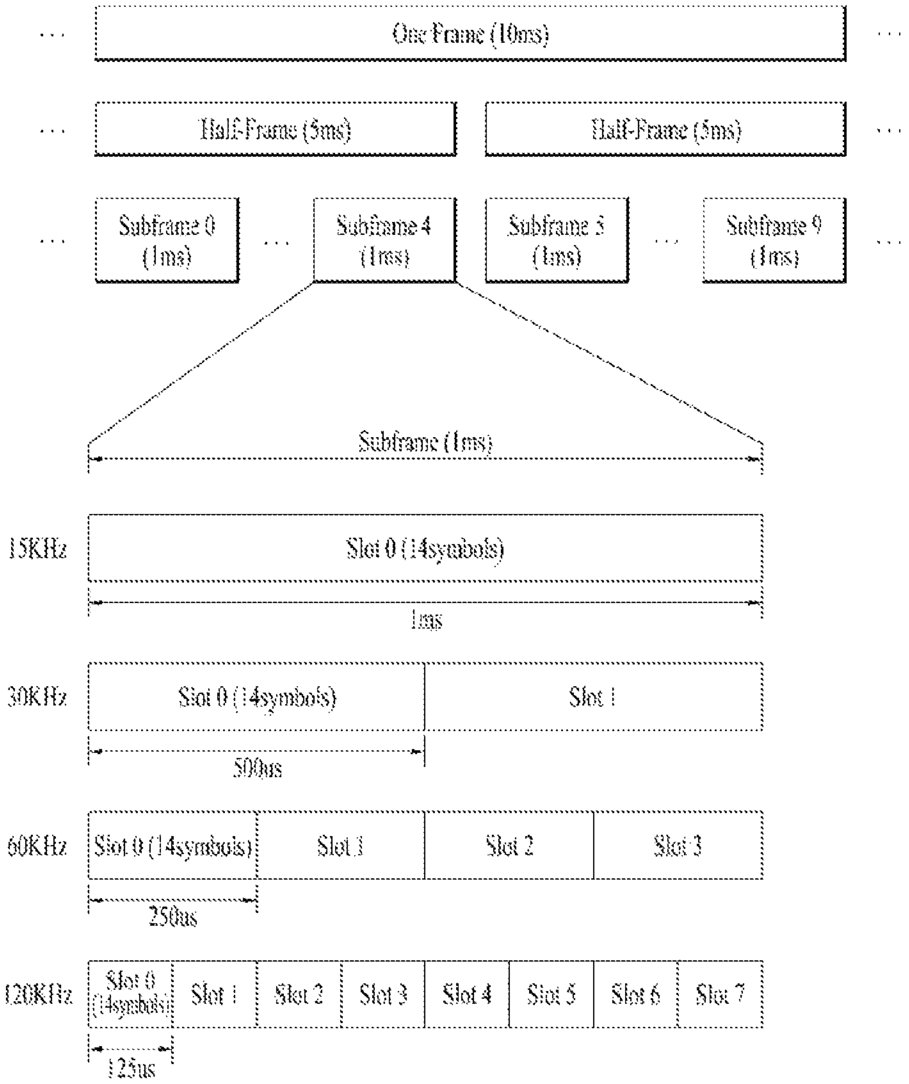

【FIG. 13】
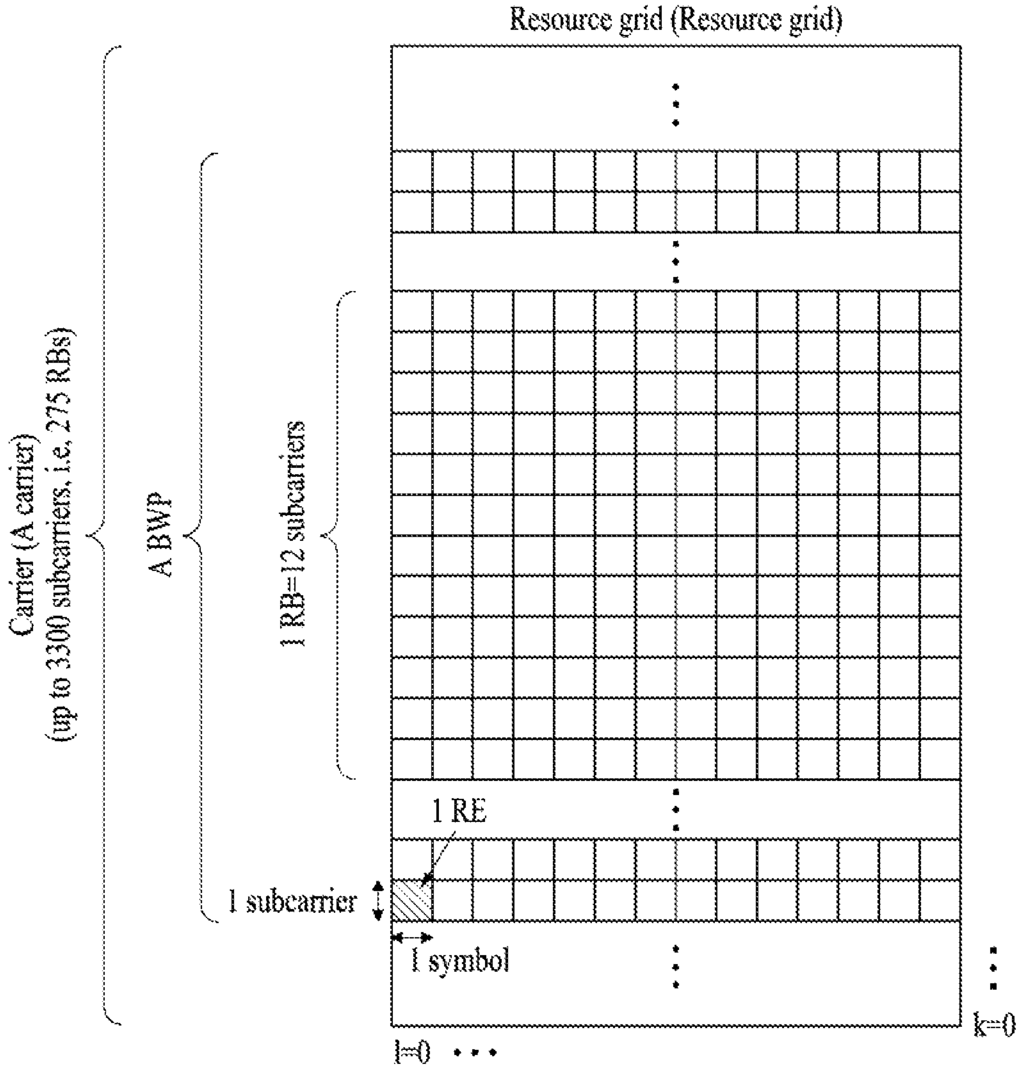

【FIG. 14】
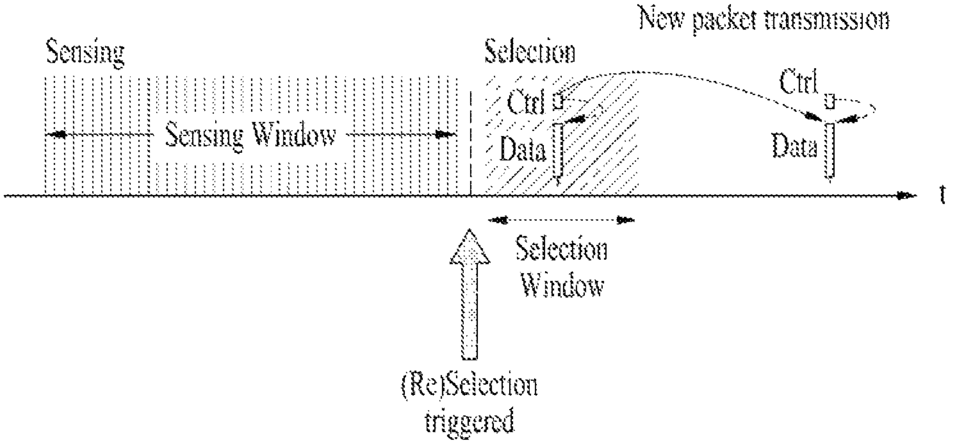

【FIG. 15】
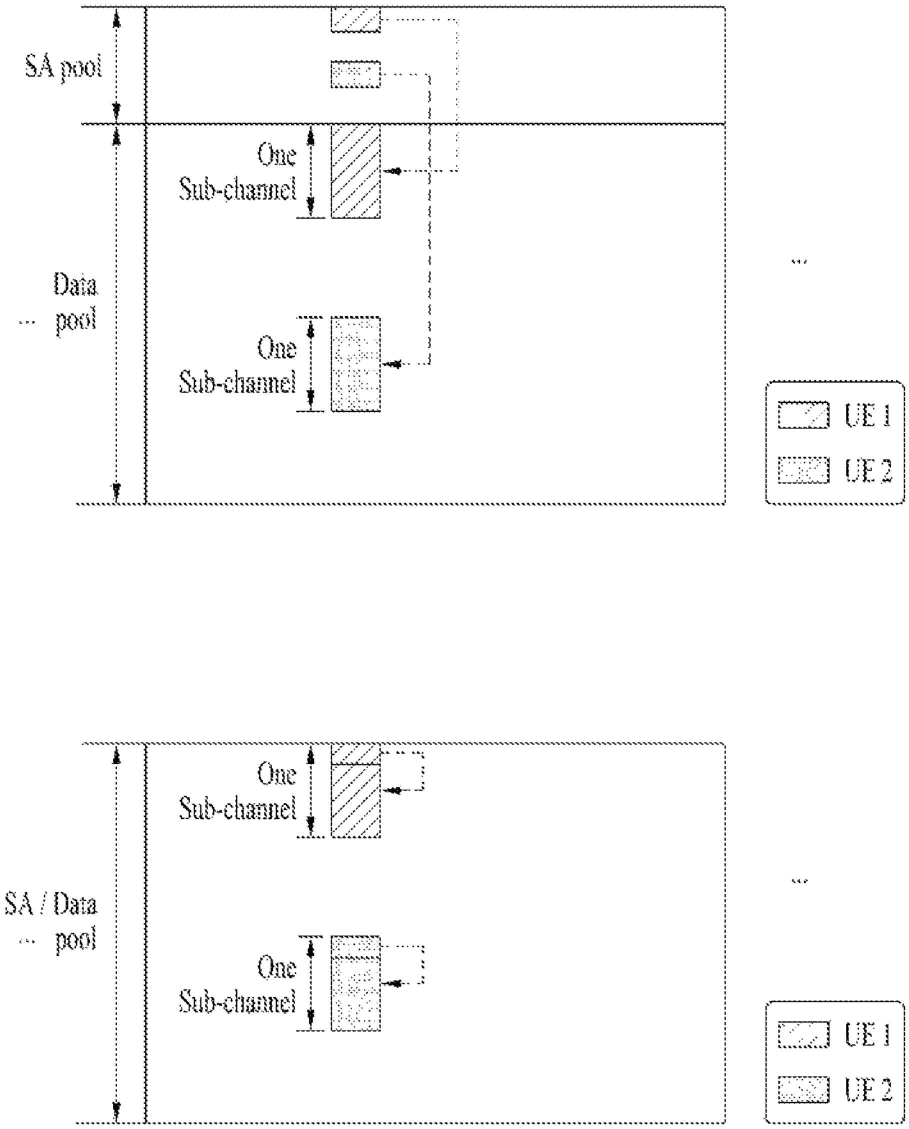

【FIG. 16】
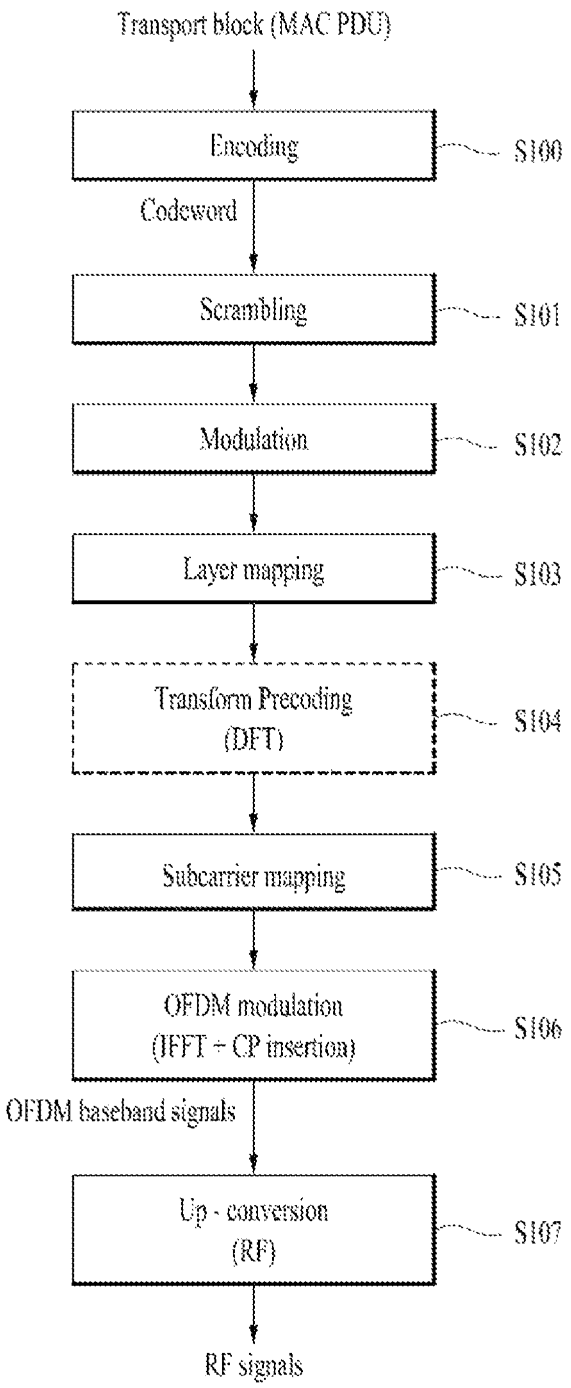

【FIG. 17】
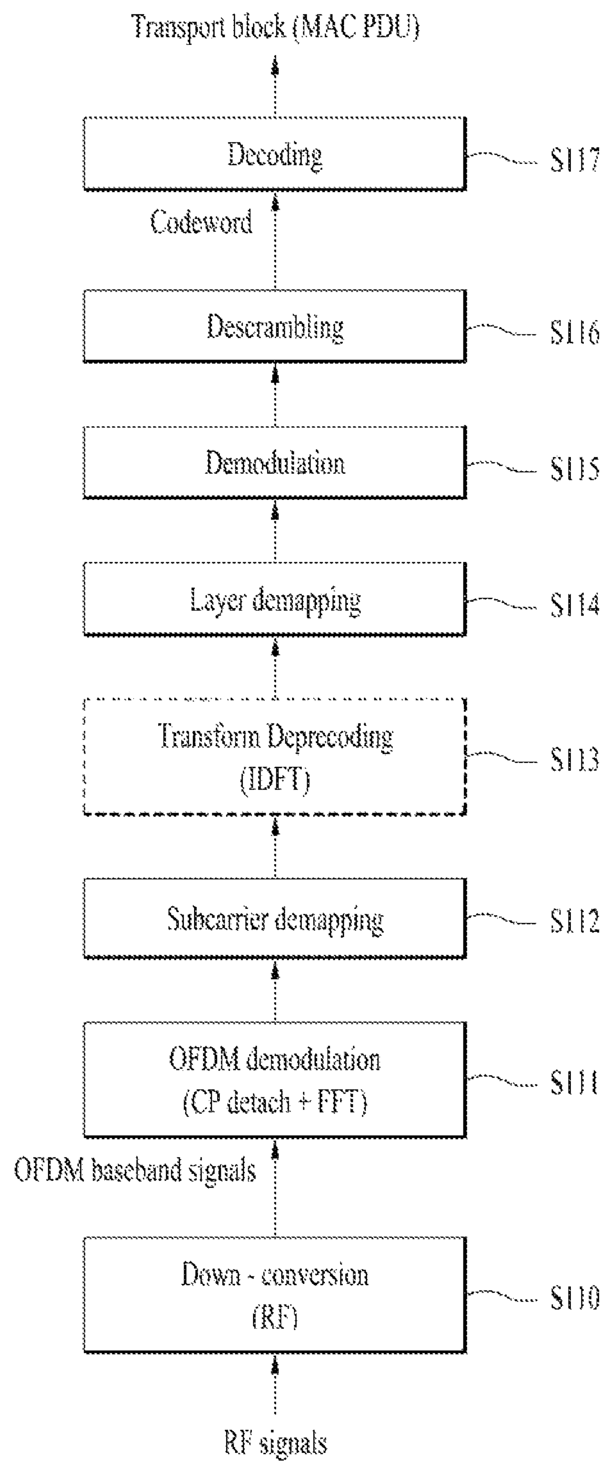

【FIG. 18】
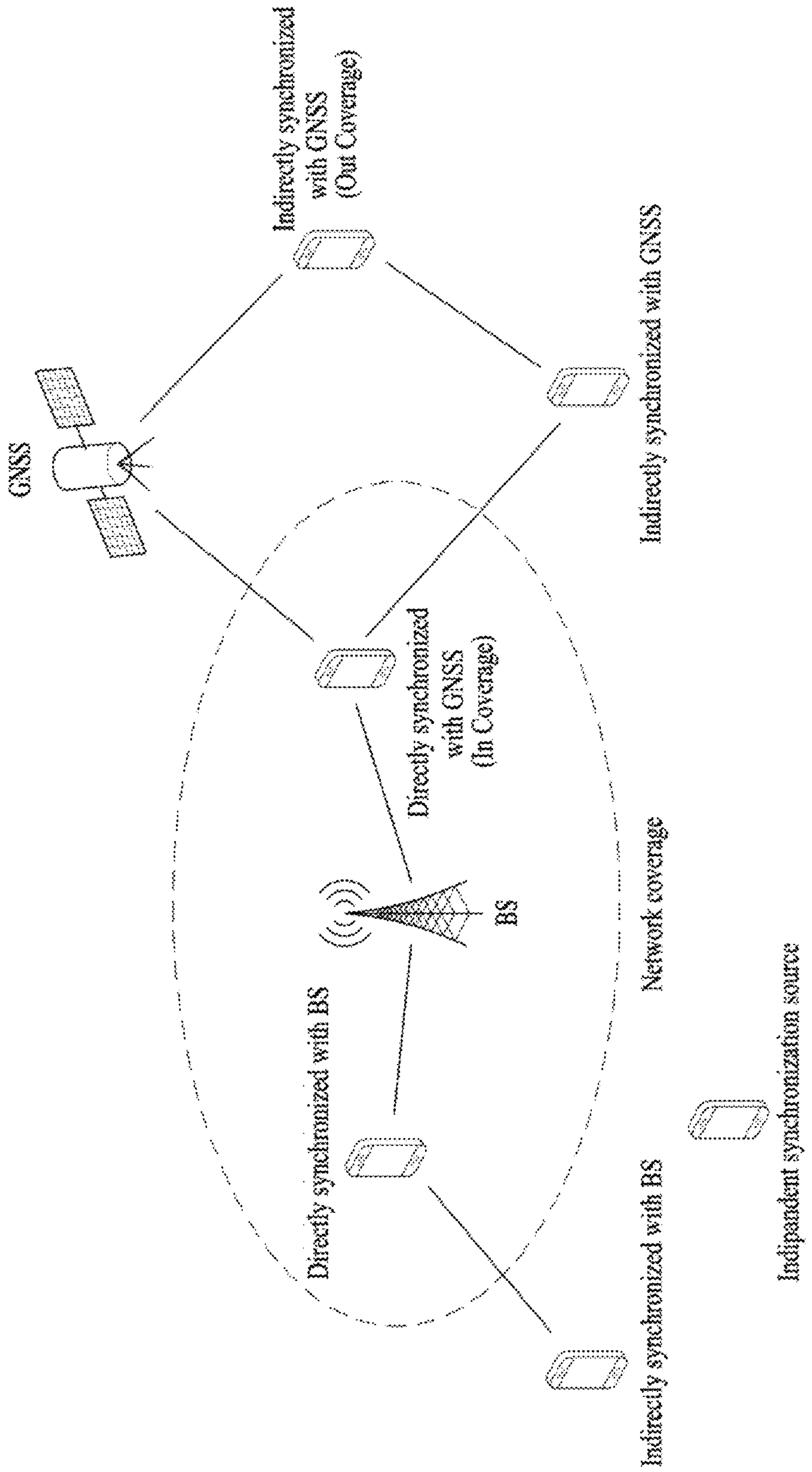

【FIG. 19】
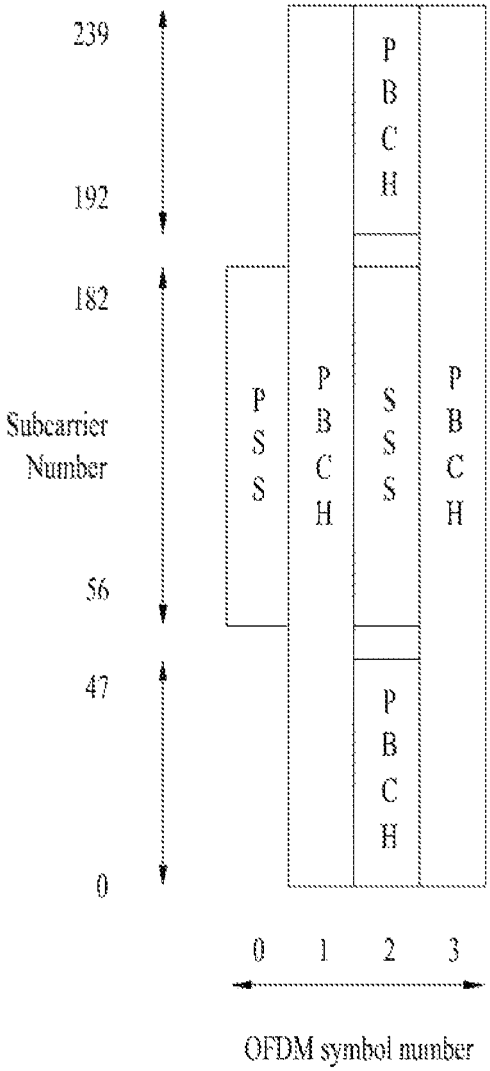

【FIG. 20】
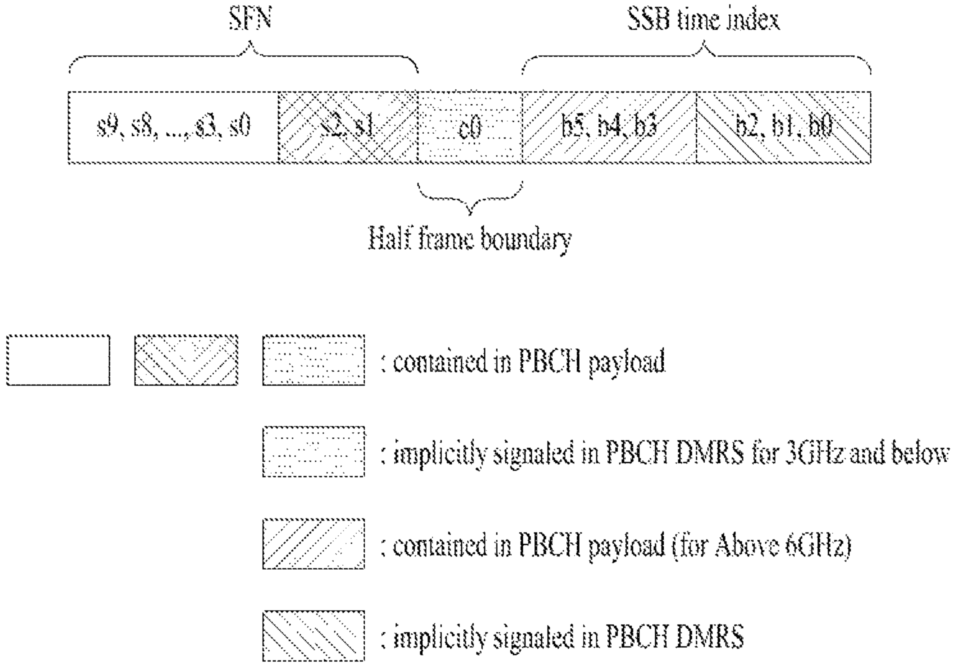

【FIG. 21】
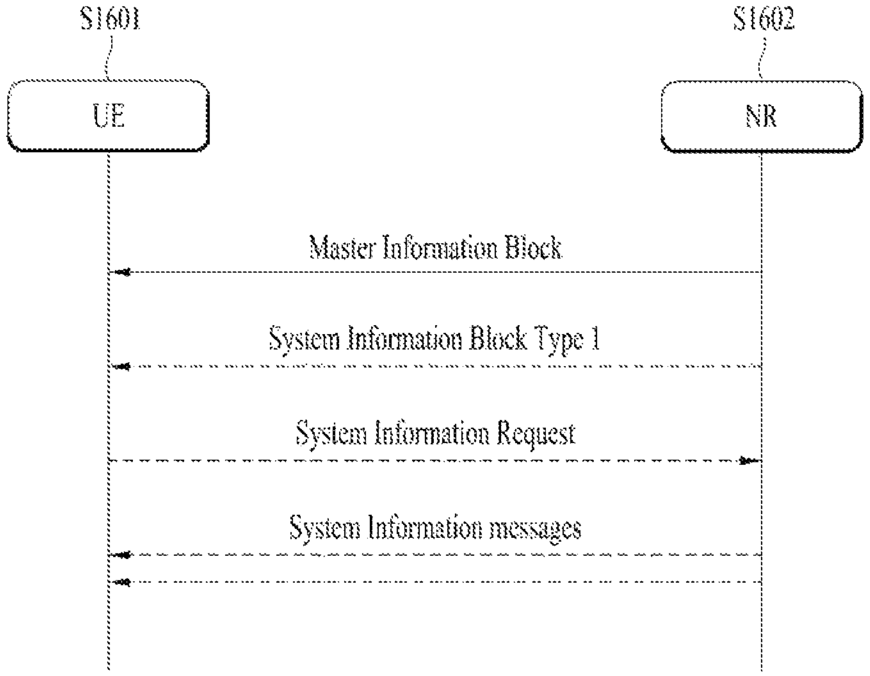
【FIG. 22】
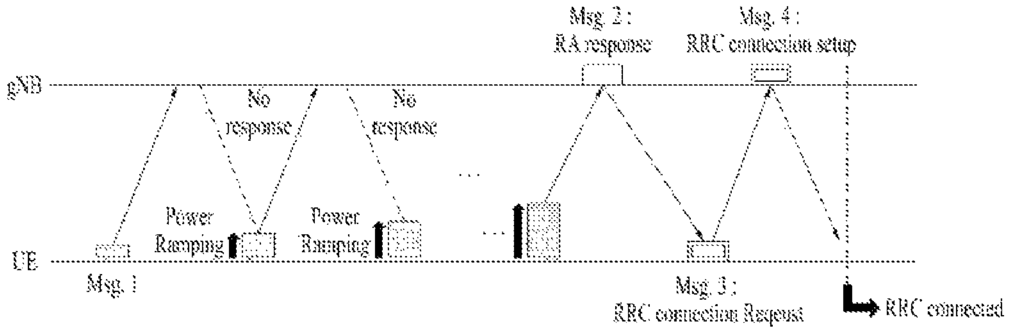

【FIG. 23】
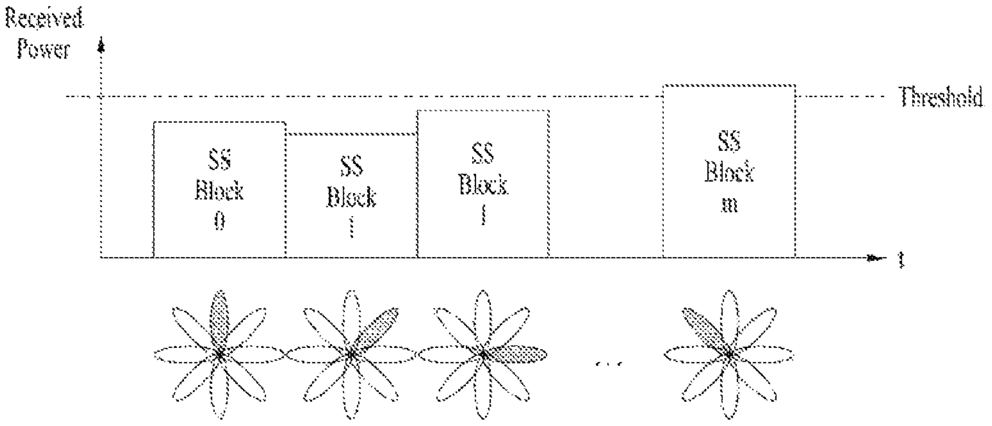
【FIG. 24】
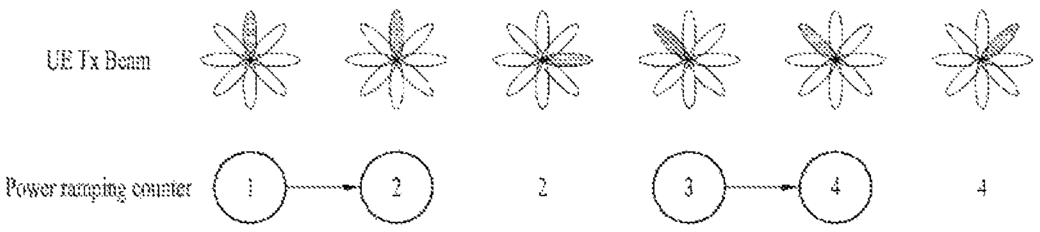

【FIG. 25】
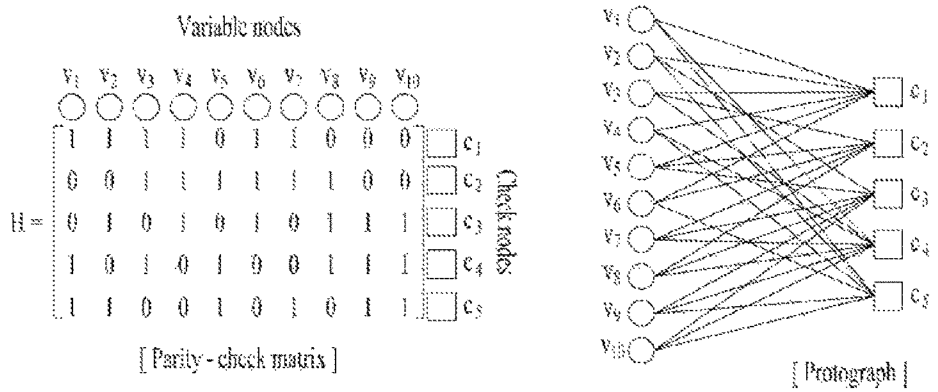
【FIG. 26】
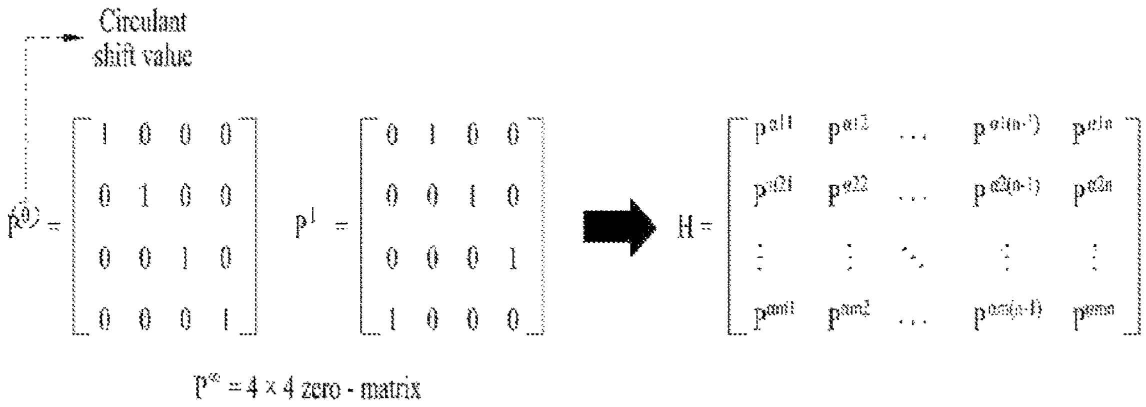

【FIG. 27】
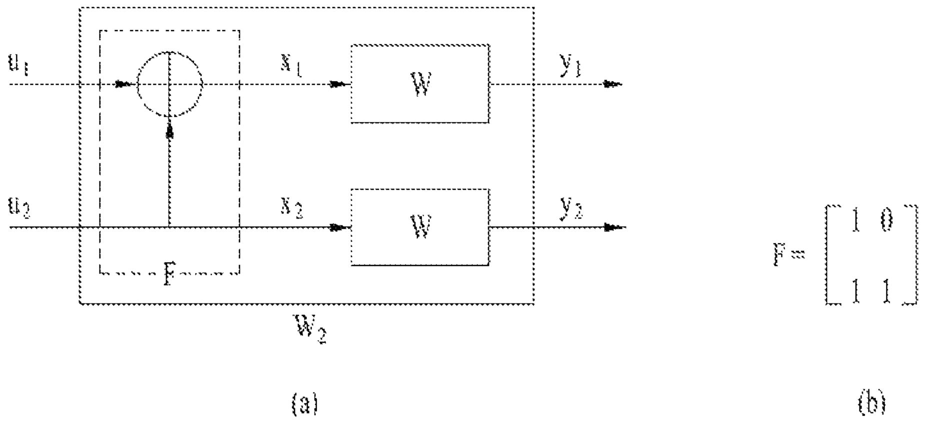
【FIG. 28】
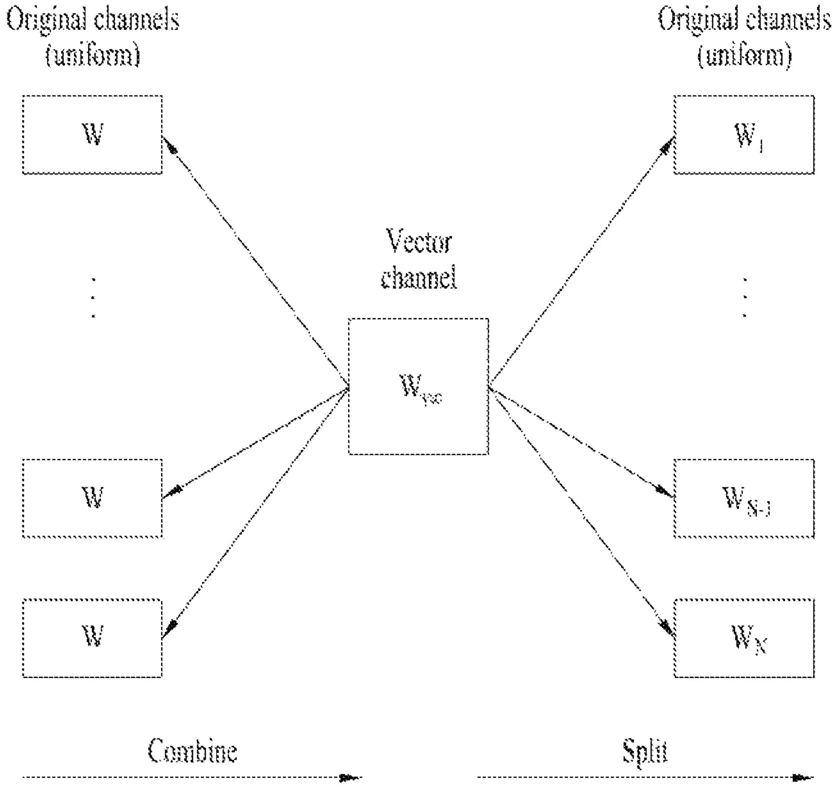

【FIG. 29】
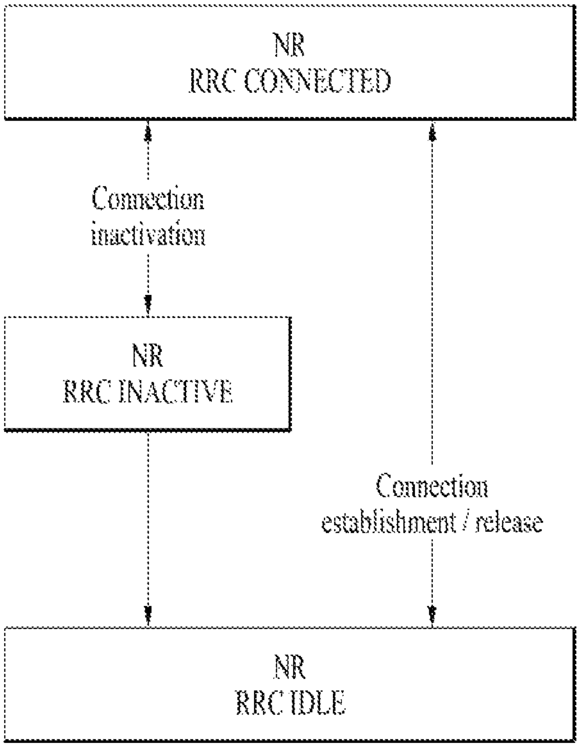

【FIG. 30】
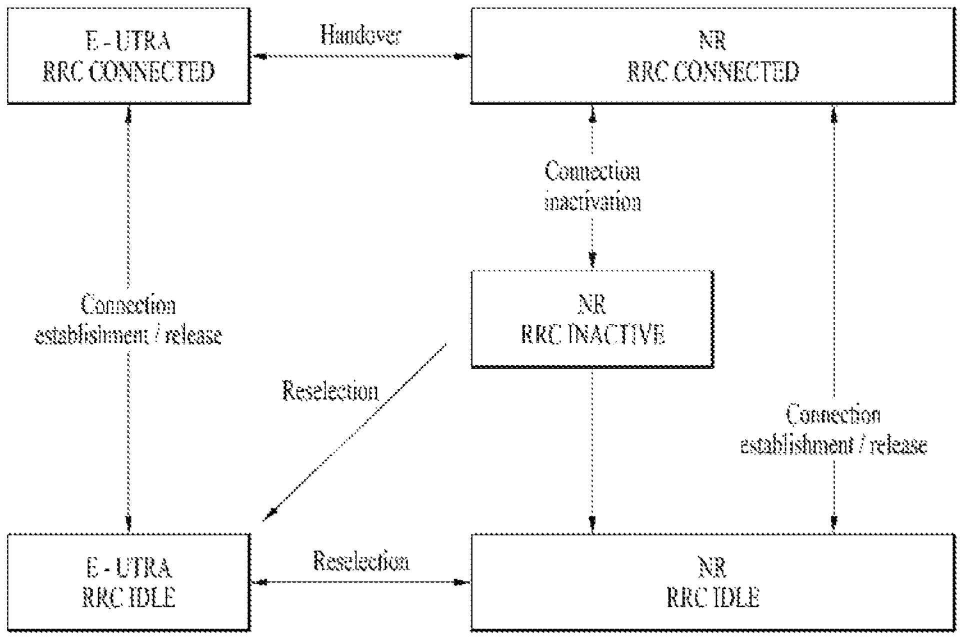
【FIG. 31】
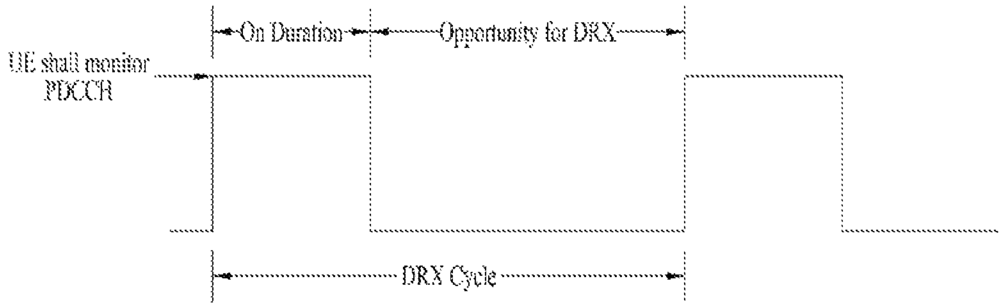

【FIG. 32】
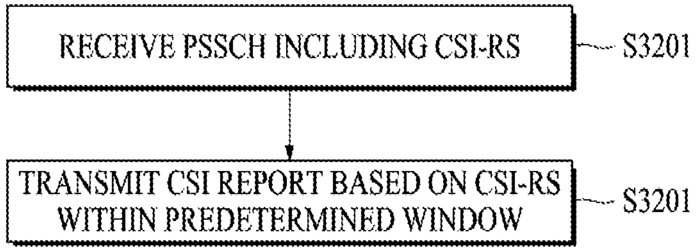
【FIG. 33】
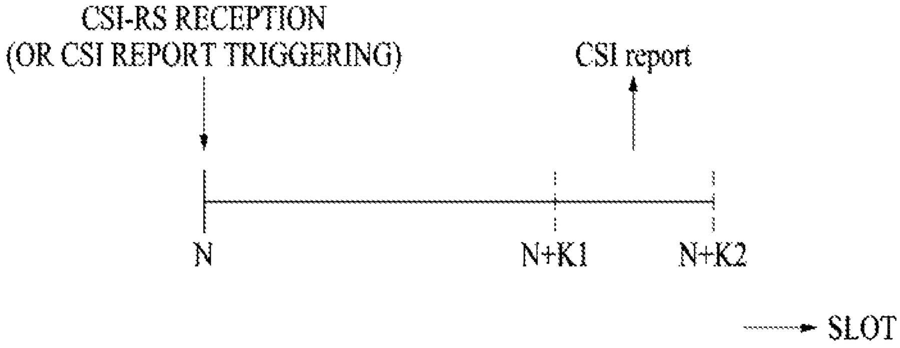

【FIG. 34】
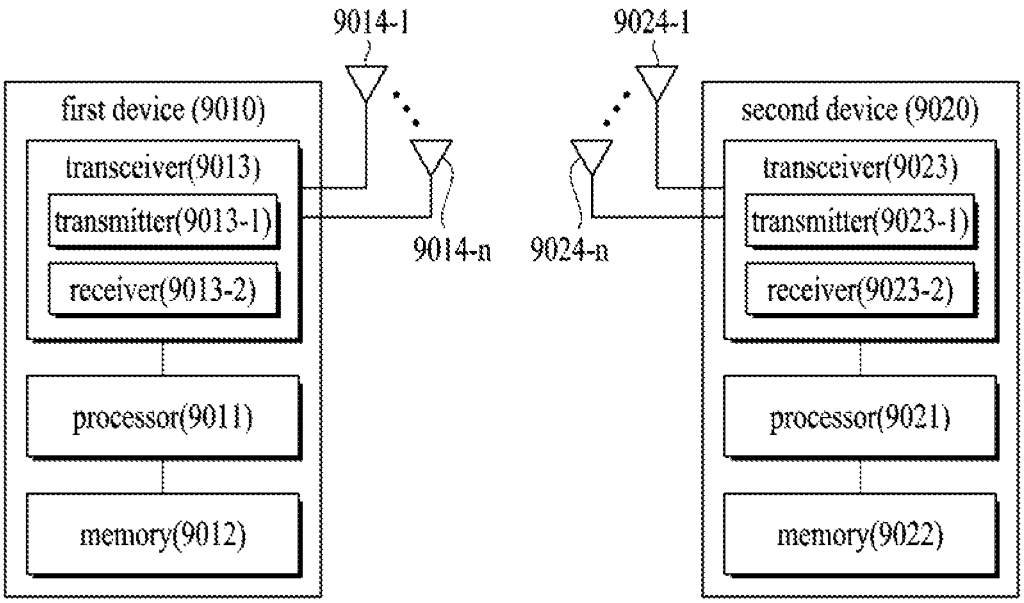

【FIG. 35】
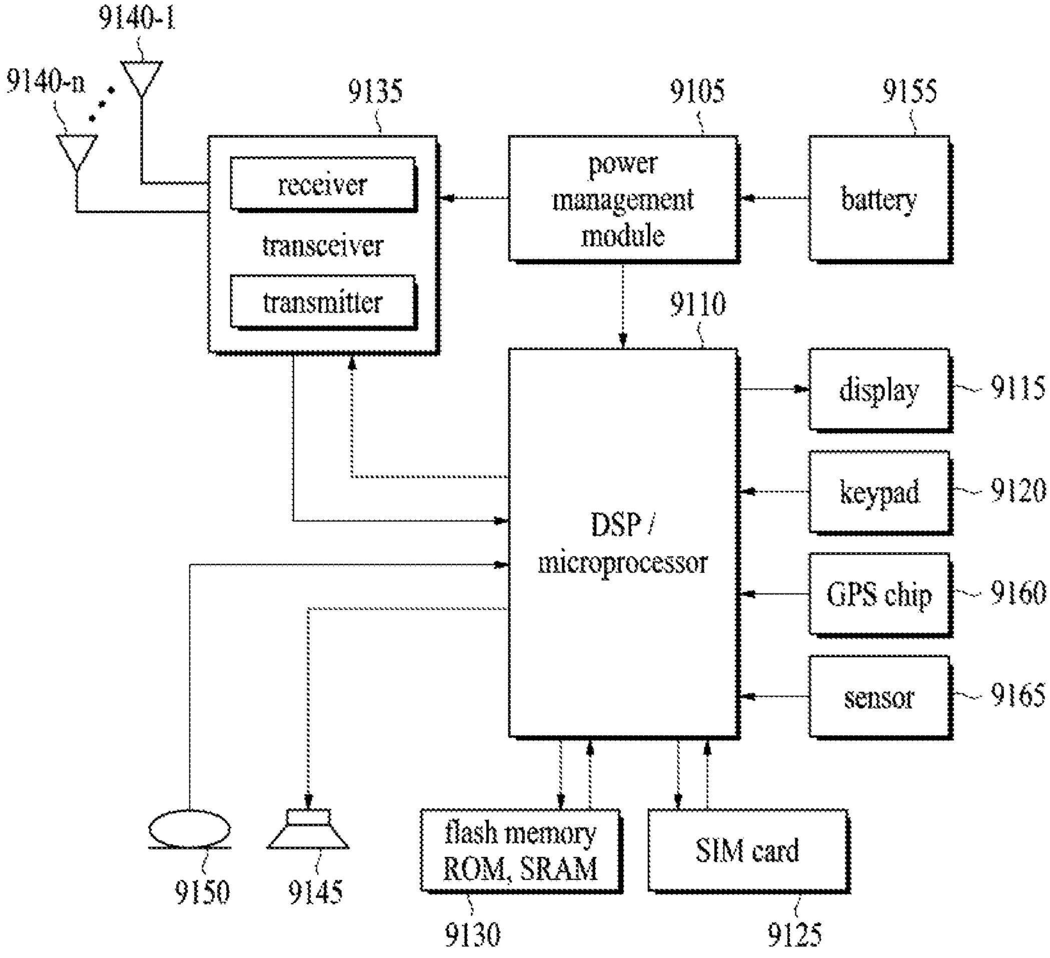

【FIG.36】
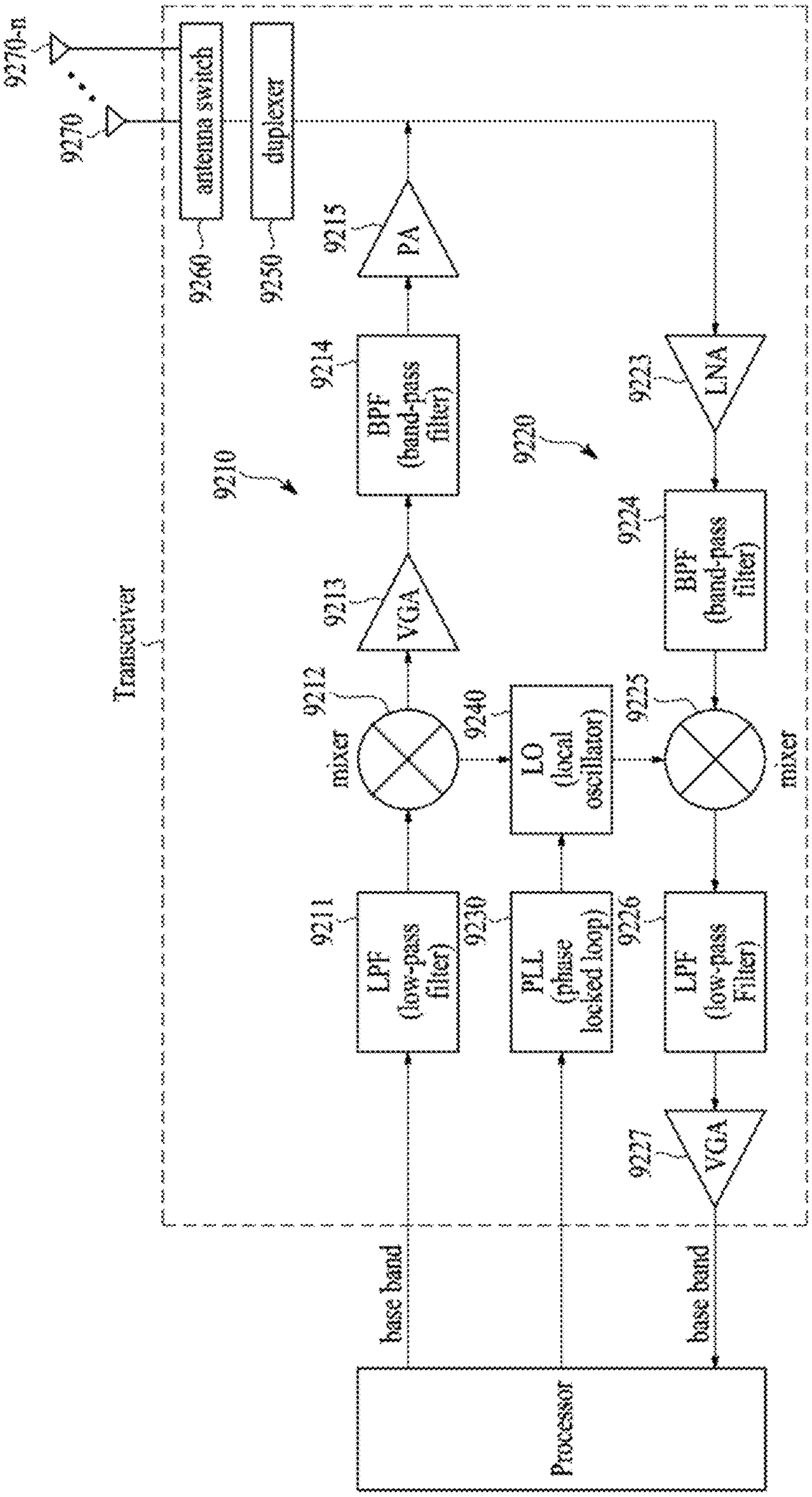

【FIG. 37】
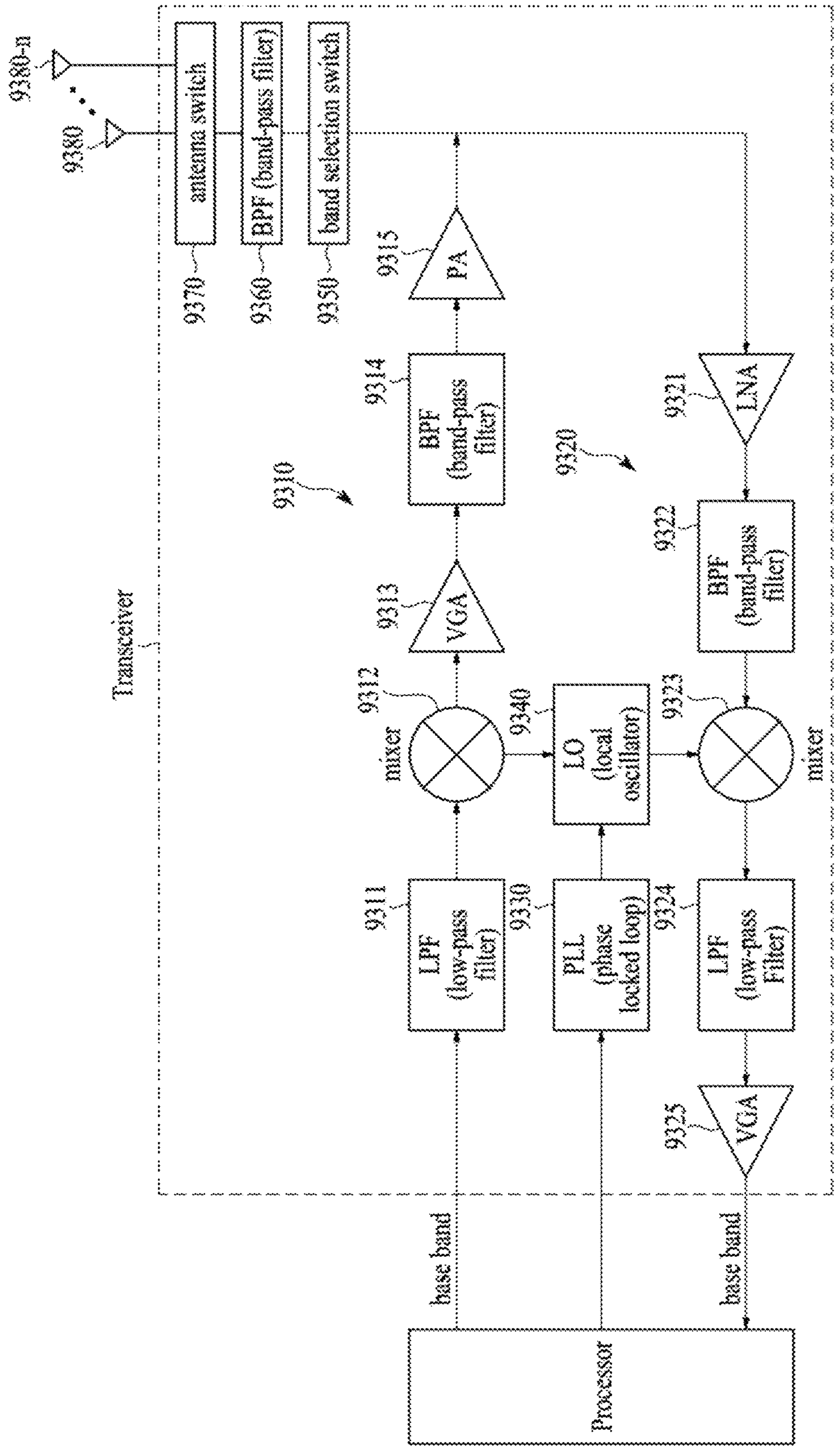

【FIG. 38】
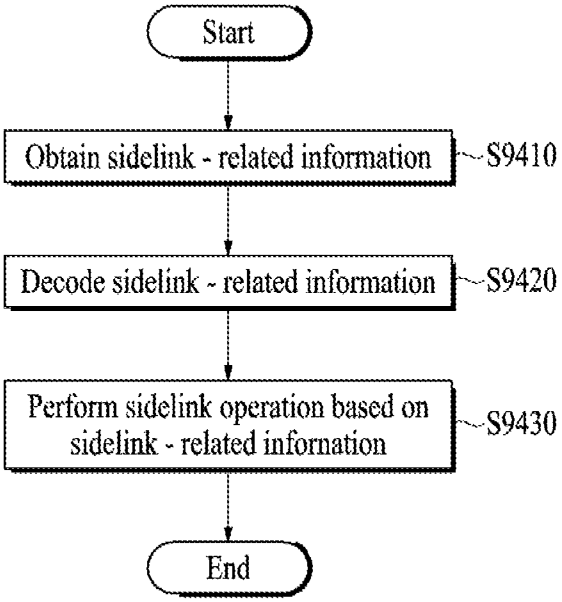

【FIG. 39】
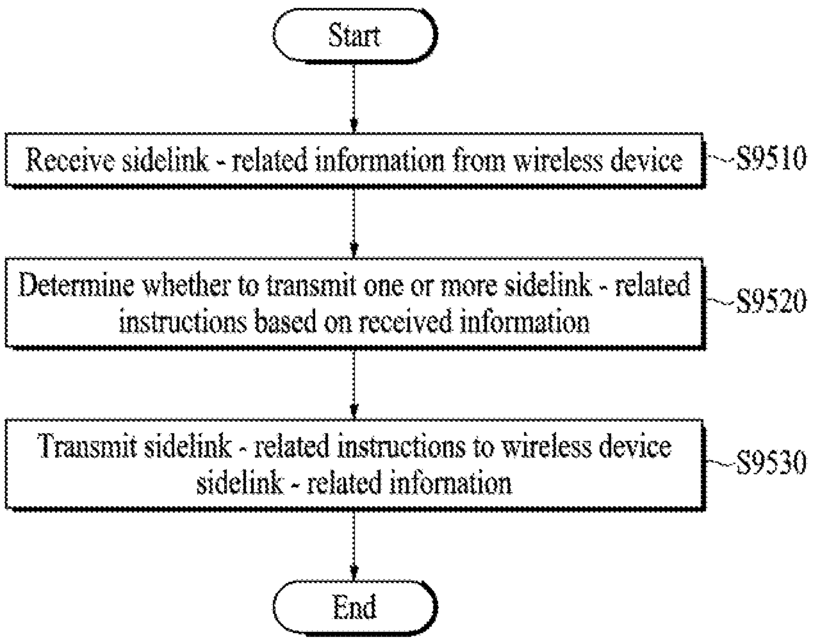

【FIG. 40】
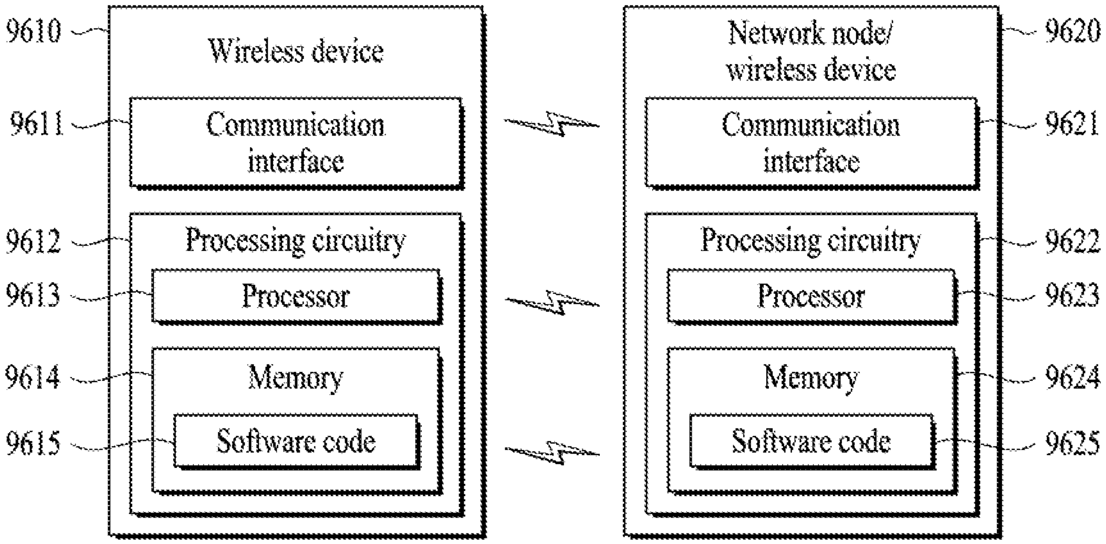

METHOD AND APPARATUS FOR SIDELINK TERMINAL TO TRANSMIT AND RECEIVE SIGNAL RELATED TO CHANNEL STATE REPORT IN WIRELESS COMMUNICATION SYSTEM

CROSS-REFERENCE TO RELATED APPLICATIONS

This application is the National Stage filing under 35 U.S.C. 371 of International Application No. PCT/KR2020/002611, filed on Feb. 24, 2020, which claims the benefit of U.S. Provisional Patent Application Nos. 62/809,729 filed on Feb. 24, 2019 and 62/914,658 filed on Oct. 14, 2019, the contents of which are all incorporated by reference herein in their entirety.

TECHNICAL FIELD

The following description relates to a wireless communication system and, more particularly, to a method and apparatus for transmitting and receiving a signal related to a channel state report.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A wireless communication system uses various radio access technologies (RATs) such as long term evolution (LTE), LTE-advanced (LTE-A), and wireless fidelity (WiFi). 5th generation (5G) is such a wireless communication system. Three key requirement areas of 5G include (1) enhanced mobile broadband (eMBB), (2) massive machine type communication (mMTC), and (3) ultra-reliable and low latency communications (URLLC). Some use cases may require multiple dimensions for optimization, while others may focus only on one key performance indicator (KPI). 5G supports such diverse use cases in a flexible and reliable way.

The eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is augmented reality (AR) for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G Logistics and freight tracking are important use cases for mobile communications that enable the tracking of inventory and packages wherever they are by using location-based information systems. The logistics and freight tracking use cases typically require lower data rates but need wide coverage and reliable location information.

DISCLOSURE

Technical Problem

Embodiment(s) has parameters related to a channel state report, a time of the channel state report and operation related to the channel state report when insufficient reference signals are received, as technical tasks.

It will be appreciated by persons skilled in the art that the objects that could be achieved with the embodiment(s) are not limited to what has been particularly described hereinabove and the above and other objects that the embodiment(s) could achieve will be more clearly understood from the following detailed description.

Technical Solution

An embodiment is a method of transmitting and receiving a signal by a sidelink user equipment (UE) in a wireless communication system including receiving a physical sidelink shared channel (PSSCH) including a channel state information reference signal (CSI-RS) and transmitting a channel state information (CSI) report based on the CSI-RS within a predetermined window, wherein a parameter related to the predetermined window is independently configured with respect to at least one of a resource pool, a service type, a priority, a quality of service (QoS) parameter, a block error rate (BLER), a speed, a CSI payload size, a subchannel size or a frequency resource region size.

An embodiment is an apparatus in a wireless communication system, the apparatus comprising; at least one processor, and at least one memory operatively connected to the at least one processor to store commands for enabling the at least one processor to perform operations, wherein the operations comprises receiving a physical sidelink shared channel (PSSCH) including a channel state information reference signal (CSI-RS) and transmitting a channel state information (CSI) report based on the CSI-RS within a predetermined window, wherein a parameter related to the predetermined window is independently set with respect to at least one of a resource pool, a service type, a priority, a quality of service (QoS) parameter, a block error rate (BLER), a speed, a CSI payload size, a subchannel size or a frequency resource region size.

The parameter may include one or more of a length of the predetermined window, a start time of the window and an end time of the window.

The QoS parameter may include one or more of reliability and latency.

When the latency is configured to be small, the length of the predetermined window may be configured to be less than a preset value.

The predetermined window starts after a preset time from a slot in which the PSSCH including the CSI-RS is received.

The preset time may be a minimum time required to generate information for the CSI report.

Based on the UE not detecting the CSI-RS for the CSI report, the UE may delay the CSI report.

Based on the UE not detecting the CSI-RS for the CSI report, the UE may skip the CSI report.

Based on the UE not detecting the CSI-RS for the CSI report, the UE may include, in the CSI report, information indicating that the CSI-RS is not detected.

The information indicating that the CSI-RS is not detected may be indicated through one state of a channel quality indicator (CQI) table.

A size of a measurement window may vary according to information included in the CSI report.

The size of the measurement window for RI may be greater than that of a measurement window for PMI and CQI.

Information included in the CSI report may be indicated by a CSI reporting configuration, and the UE may select the CSI reporting configuration in consideration of one or more of a channel variation, a relative speed with a UE which has transmitted the PSSCH, and an absolute speed of the UE.

The UE may communicate with at least one of another UE, a UE related to an autonomous vehicle, a base station or a network.

Advantageous Effects

According to an embodiment, it is possible to efficiently perform a channel state report.

It will be appreciated by persons skilled in the art that that the effects that can be achieved through embodiment(s) are not limited to what has been particularly described hereinabove and other advantages of the present invention will be more clearly understood from the detailed description.

DESCRIPTION OF DRAWINGS

The accompanying drawings, which are included to provide a further understanding of the embodiment(s) and are incorporated in and constitute a part of this application, illustrate implementations of the embodiment(s) and together with the description serve to explain the principle of the disclosure.

FIG. 1 is a diagram showing a vehicle according to the embodiment(s).

FIG. 2 is a control block diagram of the vehicle according to the embodiment(s).

FIG. 3 is a control block diagram of an autonomous driving device according to the embodiment(s).

FIG. 4 is a block diagram of the autonomous driving device according to the embodiment(s).

FIG. 5 is a diagram showing the interior of the vehicle according to the embodiment(s).

FIG. 6 is a block diagram for explaining a vehicle cabin system according to the embodiment(s).

FIG. 7 illustrates the structure of an LTE system to which the embodiment(s) is applicable.

FIG. 8 illustrates a user-plane radio protocol architecture to which the embodiment(s) is applicable.

FIG. 9 illustrates a control-plane radio protocol architecture to which the embodiment(s) is applicable.

FIG. 10 illustrates the structure of a NR system to which the embodiment(s) is applicable.

FIG. 11 illustrates functional split between a next generation radio access network (NG-RAN) and a 5G core network (5GC) to which the embodiment(s) is applicable.

FIG. 12 illustrates the structure of a new radio (NR) radio frame to which the embodiment(s) is applicable.

FIG. 13 illustrates the slot structure of a NR frame to which the embodiment(s) is applicable.

As shown in FIG. 14, a method of reserving a transmission resource for a next packet when transmission resources are selected may be used.

FIG. 15 illustrates an example of physical sidelink control channel (PSCCH) transmission in sidelink transmission mode 3 or 4 to which the embodiment(s) is applicable.

FIG. 16 illustrates physical layer processing at a transmitting side to which the embodiment(s) is applicable.

FIG. 17 illustrates physical layer processing at a receiving side to which the embodiment(s) is applicable.

FIG. 18 illustrates a synchronization source or reference in vehicle-to-everything (V2X) communication to which the embodiment(s) is applicable.

FIG. 19 is a view illustrating an SS/PBCH block to which the embodiment(s) is applicable.

FIG. 20 is a view illustrating a method of obtaining timing information to which the embodiment(s) is applicable.

FIG. 21 is a view illustrating a process of obtaining system information to which the embodiment(s) is applicable.

FIG. 22 is a view illustrating a random access procedure to which the embodiment(s) is applicable.

FIG. 23 is a view illustrating a threshold of an SS block to which the embodiment(s) is applicable.

FIG. 24 is aa a view illustrating beam switching in PRACH retransmission to which the embodiment(s) is applicable.

FIGS. 25 to 26 are views illustrating a parity check matrix to which the embodiment(s) is applicable.

FIG. 27 is a view illustrating an encoder structure for a polar code to which the embodiment(s) is applicable.

FIG. 28 is a view illustrating channel combining and channel splitting to which the embodiment(s) is applicable.

FIG. 29 is a view illustrating a UE RRC state transition to which the embodiment(s) is applicable.

FIG. 30 is a view illustrating a state transition between an NR/NGC and an E-UTRAN/EPC to which the embodiment(s) is applicable.

FIG. 31 is a view illustrating DRX to which the embodiment(s) is applicable.

FIGS. 32 to 33 are views illustrating the embodiment(s).

FIGS. 34 to 40 are diagrams for explaining various devices to which the present disclosure is applicable.

MODE FOR INVENTION

1. Driving (1) Exterior of Vehicle

FIG. 1 is a diagram showing a vehicle according to an implementation of the present disclosure.

Referring to FIG. 1, a vehicle 10 according to an implementation of the present disclosure is defined as transportation traveling on roads or railroads. The vehicle 10 includes a car, a train, and a motorcycle. The vehicle 10 may include an internal-combustion engine vehicle having an engine as a power source, a hybrid vehicle having an engine and a motor as a power source, and an electric vehicle having an electric motor as a power source. The vehicle 10 may be a private own vehicle or a shared vehicle. The vehicle 10 may be an autonomous vehicle.

(2) Components of Vehicle

FIG. 2 is a control block diagram of the vehicle according to an implementation of the present disclosure.

Referring to FIG. 2, the vehicle 10 may include a user interface device 200, an object detection device 210, a communication device 220, a driving operation device 230, a main electronic control unit (ECU) 240, a driving control device 250, an autonomous driving device 260, a sensing unit 270, and a location data generating device 280. Each of the object detection device 210, communication device 220, driving operation device 230, main ECU 240, driving control device 250, autonomous driving device 260, sensing unit 270, and location data generating device 280 may be implemented as an electronic device that generates an electrical signal and exchanges the electrical signal from one another.

1) User Interface Device

The user interface device 200 is a device for communication between the vehicle 10 and a user. The user interface device 200 may receive a user input and provide information generated in the vehicle 10 to the user. The vehicle 10 may implement a user interface (UI) or user experience (UX) through the user interface device 200. The user interface device 200 may include an input device, an output device, and a user monitoring device.

2) Object Detection Device

The object detection device 210 may generate information about an object outside the vehicle 10. The object information may include at least one of information about the presence of the object, information about the location of the object, information about the distance between the vehicle 10 and the object, and information about the relative speed of the vehicle 10 with respect to the object. The object detection device 210 may detect the object outside the vehicle 10. The object detection device 210 may include at least one sensor to detect the object outside the vehicle 10. The object detection device 210 may include at least one of a camera, a radar, a lidar, an ultrasonic sensor, and an infrared sensor. The object detection device 210 may provide data about the object, which is created based on a sensing signal generated by the sensor, to at least one electronic device included in the vehicle 10.

2.1) Camera

The camera may generate information about an object outside the vehicle 10 with an image. The camera may include at least one lens, at least one image sensor, and at least one processor electrically connected to the image sensor and configured to process a received signal and generate data about the object based on the processed signal.

The camera may be at least one of a mono camera, a stereo camera, and an around view monitoring (AVM) camera. The camera may acquire information about the location of the object, information about the distance to the object, or information about the relative speed thereof with respect to the object based on various image processing algorithms. For example, the camera may acquire the information about the distance to the object and the information about the relative speed with respect to the object from the image based on a change in the size of the object over time. For example, the camera may acquire the information about the distance to the object and the information about the relative speed with respect to the object through a pin-hole model, road profiling, etc. For example, the camera may acquire the information about the distance to the object and the information about the relative speed with respect to the object from a stereo image generated by a stereo camera based on disparity information.

The camera may be disposed at a part of the vehicle 10 where the field of view (FOV) is guaranteed to photograph the outside of the vehicle 10. The camera may be disposed close to a front windshield inside the vehicle 10 to acquire front-view images of the vehicle 10. The camera may be disposed in the vicinity of a front bumper or a radiator grill. The camera may be disposed close to a rear glass inside the vehicle 10 to acquire rear-view images of the vehicle 10. The camera may be disposed in the vicinity of a rear bumper, a trunk, or a tail gate. The camera may be disposed close to at least one of side windows inside the vehicle 10 in order to acquire side-view images of the vehicle 10. Alternatively, the camera may be disposed in the vicinity of a side mirror, a fender, or a door.

2.2) Radar

The radar may generate information about an object outside the vehicle 10 using electromagnetic waves. The radar may include an electromagnetic wave transmitter, an electromagnetic wave receiver, and at least one processor electrically connected to the electromagnetic wave transmitter and the electromagnetic wave receiver and configured to process a received signal and generate data about the object based on the processed signal. The radar may be a pulse radar or a continuous wave radar depending on electromagnetic wave emission. The continuous wave radar may be a frequency modulated continuous wave (FMCW) radar or a frequency shift keying (FSK) radar depending on signal waveforms. The radar may detect the object from the electromagnetic waves based on the time of flight (TOF) or phase shift principle and obtain the location of the detected object, the distance to the detected object, and the relative speed with respect to the detected object. The radar may be disposed at an appropriate position outside the vehicle 10 to detect objects placed in front, rear, or side of the vehicle 10.

2.3) Lidar

The lidar may generate information about an object outside the vehicle 10 using a laser beam. The lidar may include a light transmitter, a light receiver, and at least one processor electrically connected to the light transmitter and the light receiver and configured to process a received signal and generate data about the object based on the processed signal. The lidar may operate based on the TOF or phase shift principle. The lidar may be a driven type or a non-driven type. The driven type of lidar may be rotated by a motor and detect an object around the vehicle 10. The non-driven type of lidar may detect an object within a predetermined range from the vehicle 10 based on light steering. The vehicle 10 may include a plurality of non-driven type of lidars. The lidar may detect the object from the laser beam based on the TOF or phase shift principle and obtain the location of the detected object, the distance to the detected object, and the relative speed with respect to the detected object. The lidar may be disposed at an appropriate position outside the vehicle 10 to detect objects placed in front, rear, or side of the vehicle 10.

3) Communication Device

The communication device 220 may exchange a signal with a device outside the vehicle 10. The communication device 220 may exchange a signal with at least one of an infrastructure (e.g., server, broadcast station, etc.), another vehicle, and a terminal. The communication device 220 may include a transmission antenna, a reception antenna, and at least one of a radio frequency (RF) circuit and an RF element where various communication protocols may be implemented to perform communication.

For example, the communication device 220 may exchange a signal with an external device based on the cellular vehicle-to-everything (C-V2X) technology. The C-V2X technology may include LTE-based sidelink communication and/or NR-based sidelink communication. Details related to the C-V2X technology will be described later.

The communication device 220 may exchange the signal with the external device according to dedicated short-range communications (DSRC) technology or wireless access in vehicular environment (WAVE) standards based on IEEE 802.11p PHY/MAC layer technology and IEEE 1609 Network/Transport layer technology. The DSRC technology (or WAVE standards) is communication specifications for providing intelligent transport system (ITS) services through dedicated short-range communication between vehicle-mounted devices or between a road side unit and a vehicle-mounted device. The DSRC technology may be a communication scheme that allows the use of a frequency of 5.9 GHz and has a data transfer rate in the range of 3 Mbps to 27 Mbps. IEEE 802.11p may be combined with IEEE 1609 to support the DSRC technology (or WAVE standards).

According to the present disclosure, the communication device 220 may exchange the signal with the external device according to either the C-V2X technology or the DSRC technology. Alternatively, the communication device 220 may exchange the signal with the external device by combining the C-V2X technology and the DSRC technology.

4) Driving Operation Device

The driving operation device 230 is configured to receive a user input for driving. In a manual mode, the vehicle 10 may be driven based on a signal provided by the driving operation device 230. The driving operation device 230 may include a steering input device (e.g., steering wheel), an acceleration input device (e.g., acceleration pedal), and a brake input device (e.g., brake pedal).

5) Main ECU

The main ECU 240 may control the overall operation of at least one electronic device included in the vehicle 10.

6) Driving Control Device

The driving control device 250 is configured to electrically control various vehicle driving devices included in the vehicle 10. The driving control device 250 may include a power train driving control device, a chassis driving control device, a door/window driving control device, a safety driving control device, a lamp driving control device, and an air-conditioner driving control device. The power train driving control device may include a power source driving control device and a transmission driving control device. The chassis driving control device may include a steering driving control device, a brake driving control device, and a suspension driving control device. The safety driving control device may include a seat belt driving control device for seat belt control.

The driving control device 250 includes at least one electronic control device (e.g., control ECU).

The driving control device 250 may control the vehicle driving device based on a signal received from the autonomous driving device 260. For example, the driving control device 250 may control a power train, a steering, and a brake based on signals received from the autonomous driving device 260.

7) Autonomous Driving Device

The autonomous driving device 260 may generate a route for autonomous driving based on obtained data. The autonomous driving device 260 may generate a driving plan for traveling along the generated route. The autonomous driving device 260 may generate a signal for controlling the movement of the vehicle 10 according to the driving plan. The autonomous driving device 260 may provide the generated signal to the driving control device 250.

The autonomous driving device 260 may implement at least one advanced driver assistance system (ADAS) function. The ADAS may implement at least one of adaptive cruise control (ACC), autonomous emergency braking (AEB), forward collision warning (FCW), lane keeping assist (LKA), lane change assist (LCA), target following assist (TFA), blind spot detection (BSD), high beam assist (HBA), auto parking system (APS), PD collision warning system, traffic sign recognition (TSR), traffic sign assist (TSA), night vision (NV), driver status monitoring (DSM), and traffic fam assist (TJA).

The autonomous driving device 260 may perform switching from an autonomous driving mode to a manual driving mode or switching from the manual driving mode to the autonomous driving mode. For example, the autonomous driving device 260 may switch the mode of the vehicle 10 from the autonomous driving mode to the manual driving mode or from the manual driving mode to the autonomous driving mode based on a signal received from the user interface device 200.

8) Sensing Unit

The sensing unit 270 may detect the state of the vehicle 10. The sensing unit 270 may include at least one of an inertial measurement unit (IMIU) sensor, a collision sensor, a wheel sensor, a speed sensor, an inclination sensor, a weight sensor, a heading sensor, a position module, a vehicle forward/backward movement sensor, a battery sensor, a fuel sensor, a tire sensor, a steering sensor, a temperature sensor, a humidity sensor, an ultrasonic sensor, an illumination sensor, and a pedal position sensor. Further, the JNIU sensor may include at least one of an acceleration sensor, a gyro sensor, and a magnetic sensor.

The sensing unit 270 may generate data about the vehicle state based on a signal generated by at least one sensor. The vehicle state data may be information generated based on data detected by various sensors included in the vehicle 10. The sensing unit 270 may generate vehicle attitude data, vehicle motion data, vehicle yaw data, vehicle roll data, vehicle pitch data, vehicle collision data, vehicle orientation data, vehicle angle data, vehicle speed data, vehicle acceleration data, vehicle tilt data, vehicle forward/backward movement data, vehicle weight data, battery data, fuel data, tire pressure data, vehicle internal temperature data, vehicle internal humidity data, steering wheel rotation angle data, vehicle external illumination data, data on pressure applied to the acceleration pedal, data on pressure applied to the brake pedal, etc.

9) Location Data Generating Device

The location data generating device 280 may generate data on the location of the vehicle 10. The location data generating device 280 may include at least one of a global positioning system (GPS) and a differential global positioning system (DGPS). The location data generating device 280 may generate the location data on the vehicle 10 based on a signal generated by at least one of the GPS and the DGPS. In some implementations, the location data generating device 280 may correct the location data based on at least one of the IMU sensor of the sensing unit 270 and the camera of the object detection device 210. The location data generating device 280 may also be called a global navigation satellite system (GNSS).

The vehicle 10 may include an internal communication system 50. The plurality of electronic devices included in the vehicle 10 may exchange a signal through the internal communication system 50. The signal may include data. The internal communication system 50 may use at least one communication protocol (e.g., CAN, LIN, FlexRay, MOST, or Ethernet).

(3) Components of Autonomous Driving Device

FIG. 3 is a control block diagram of the autonomous driving device 260 according to an implementation of the present disclosure.

Referring to FIG. 3, the autonomous driving device 260 may include a memory 140, a processor 170, an interface 180 and a power supply 190.

The memory 140 is electrically connected to the processor 170. The memory 140 may store basic data about a unit, control data for controlling the operation of the unit, and input/output data. The memory 140 may store data processed by the processor 170. In hardware implementation, the memory 140 may be implemented as any one of a ROM, a RAM, an EPROM, a flash drive, and a hard drive. The memory 140 may store various data for the overall operation of the autonomous driving device 260, such as a program for processing or controlling the processor 170. The memory 140 may be integrated with the processor 170. In some implementations, the memory 140 may be classified as a subcomponent of the processor 170.

The interface 180 may exchange a signal with at least one electronic device included in the vehicle 10 by wire or wirelessly. The interface 180 may exchange a signal with at least one of the object detection device 210, the communication device 220, the driving operation device 230, the main ECU 240, the driving control device 250, the sensing unit 270, and the location data generating device 280 by wire or wirelessly. The interface 180 may be implemented with at least one of a communication module, a terminal, a pin, a cable, a port, a circuit, an element, and a device.

The power supply 190 may provide power to the autonomous driving device 260. The power supply 190 may be provided with power from a power source (e.g., battery) included in the vehicle 10 and supply the power to each unit of the autonomous driving device 260. The power supply 190 may operate according to a control signal from the main ECU 240. The power supply 190 may include a switched-mode power supply (SMPS).

The processor 170 may be electrically connected to the memory 140, the interface 180, and the power supply 190 to exchange signals with the components. The processor 170 may be implemented with at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The processor 170 may be driven by power supplied from the power supply 190. The processor 170 may receive data, process the data, generate a signal, and provide the signal while the power is supplied thereto.

The processor 170 may receive information from other electronic devices included in the vehicle 10 through the interface 180. The processor 170 may provide a control signal to other electronic devices in the vehicle 10 through the interface 180.

The autonomous driving device 260 may include at least one printed circuit board (PCB). The memory 140, the interface 180, the power supply 190, and the processor 170 may be electrically connected to the PCB.

(4) Operation of Autonomous Driving Device

1) Receiving Operation

Referring to FIG. 4, the processor 170 may perform a receiving operation. The processor 170 may receive data from at least one of the object detection device 210, the communication device 220, the sensing unit 270, and the location data generating device 280 through the interface 180. The processor 170 may receive object data from the object detection device 210. The processor 170 may receive HD map data from the communication device 220. The processor 170 may receive vehicle state data from the sensing unit 270. The processor 170 may receive location data from the location data generating device 280.

2) Processing/Determination Operation

The processor 170 may perform a processing/determination operation. The processor 170 may perform the processing/determination operation based on driving state information. The processor 170 may perform the processing/determination operation based on at least one of object data, HD map data, vehicle state data, and location data.

2.1) Driving Plan Data Generating Operation

The processor 170 may generate driving plan data. For example, the processor 170 may generate electronic horizon data. The electronic horizon data may be understood as driving plan data from the current location of the vehicle 10 to the horizon. The horizon may be understood as a point away from the current location of the vehicle 10 by a predetermined distance along a predetermined traveling route. Further, the horizon may refer to a point at which the vehicle 10 may arrive after a predetermined time from the current location of the vehicle 10 along the predetermined traveling route.

The electronic horizon data may include horizon map data and horizon path data.

2.1.1) Horizon Map Data

The horizon map data may include at least one of topology data, road data, HD map data and dynamic data. In some implementations, the horizon map data may include a plurality of layers. For example, the horizon map data may include a first layer matching with the topology data, a second layer matching with the road data, a third layer matching with the HD map data, and a fourth layer matching with the dynamic data. The horizon map data may further include static object data.

The topology data may be understood as a map created by connecting road centers with each other. The topology data is suitable for representing an approximate location of a vehicle and may have a data form used for navigation for drivers. The topology data may be interpreted as data about roads without vehicles. The topology data may be generated on the basis of data received from an external server through the communication device 220. The topology data may be based on data stored in at least one memory included in the vehicle 10.

The road data may include at least one of road slope data, road curvature data, and road speed limit data. The road data may further include no-passing zone data. The road data may be based on data received from an external server through the communication device 220. The road data may be based on data generated by the object detection device 210.

The HD map data may include detailed topology information including road lanes, connection information about each lane, and feature information for vehicle localization (e.g., traffic sign, lane marking/property, road furniture, etc.). The HD map data may be based on data received from an external server through the communication device 220.

The dynamic data may include various types of dynamic information on roads. For example, the dynamic data may include construction information, variable speed road information, road condition information, traffic information, moving object information, etc. The dynamic data may be based on data received from an external server through the communication device 220. The dynamic data may be based on data generated by the object detection device 210.

The processor 170 may provide map data from the current location of the vehicle 10 to the horizon.

2.1.2) Horizon Path Data

The horizon path data may be understood as a potential trajectory of the vehicle 10 when the vehicle 10 travels from the current location of the vehicle 10 to the horizon. The horizon path data may include data indicating the relative probability of selecting a road at the decision point (e.g., fork, junction, crossroad, etc.). The relative probability may be calculated on the basis of the time taken to arrive at the final destination. For example, if the time taken to arrive at the final destination when a first road is selected at the decision point is shorter than that when a second road is selected, the probability of selecting the first road may be calculated to be higher than the probability of selecting the second road.

The horizon path data may include a main path and a sub-path. The main path may be understood as a trajectory obtained by connecting roads that are highly likely to be selected. The sub-path may be branched from at least one decision point on the main path. The sub-path may be understood as a trajectory obtained by connecting one or more roads that are less likely to be selected at the at least one decision point on the main path.

3) Control Signal Generating Operation

The processor 170 may perform a control signal generating operation. The processor 170 may generate a control signal on the basis of the electronic horizon data. For example, the processor 170 may generate at least one of a power train control signal, a brake device control signal, and a steering device control signal on the basis of the electronic horizon data.

The processor 170 may transmit the generated control signal to the driving control device 250 through the interface 180. The driving control device 250 may forward the control signal to at least one of a power train 251, a brake device 252 and a steering device 253.

2. Cabin

FIG. 5 is a diagram showing the interior of the vehicle 10 according to an implementation of the present disclosure.

FIG. 6 is a block diagram for explaining a vehicle cabin system according to an implementation of the present disclosure.

Referring to FIGS. 5 and 6, a vehicle cabin system 300 (cabin system) may be defined as a convenience system for the user who uses the vehicle 10. The cabin system 300 may be understood as a high-end system including a display system 350, a cargo system 355, a seat system 360, and a payment system 365. The cabin system 300 may include a main controller 370, a memory 340, an interface 380, a power supply 390, an input device 310, an imaging device 320, a communication device 330, the display system 350, the cargo system 355, the seat system 360, and the payment system 365. In some implementations, the cabin system 300 may further include components in addition to the components described in this specification or may not include some of the components described in this specification.

1) Main Controller

The main controller 370 may be electrically connected to the input device 310, the communication device 330, the display system 350, the cargo system 355, the seat system 360, and the payment system 365 and exchange signals with the components. The main controller 370 may control the input device 310, the communication device 330, the display system 350, the cargo system 355, the seat system 360, and the payment system 365. The main controller 370 may be implemented with at least one of application specific integrated circuits (ASIC s), digital signal processors (DSPs), digital signal processing devices (DSPDs), programmable logic devices (PLDs), field programmable gate arrays (FPGAs), processors, controllers, micro-controllers, microprocessors, and electronic units for executing other functions.

The main controller 370 may include at least one sub-controller. In some implementations, the main controller 370 may include a plurality of sub-controllers. The plurality of sub-controllers may control the devices and systems included in the cabin system 300, respectively. The devices and systems included in the cabin system 300 may be grouped by functions or grouped with respect to seats for users.

The main controller 370 may include at least one processor 371. Although FIG. 6 illustrates the main controller 370 including a single processor 371, the main controller 371 may include a plurality of processors 371. The processor 371 may be classified as one of the above-described sub-controllers.

The processor 371 may receive signals, information, or data from a user terminal through the communication device 330. The user terminal may transmit signals, information, or data to the cabin system 300.

The processor 371 may identify the user on the basis of image data received from at least one of an internal camera and an external camera included in the imaging device 320. The processor 371 may identify the user by applying an image processing algorithm to the image data. For example, the processor 371 may identify the user by comparing information received from the user terminal with the image data. For example, the information may include information about at least one of the route, body, fellow passenger, baggage, location, preferred content, preferred food, disability, and use history of the user.

The main controller 370 may include an artificial intelligence agent 372. The artificial intelligence agent 372 may perform machine learning on the basis of data acquired from the input device 310. The artificial intelligence agent 372 may control at least one of the display system 350, the cargo system 355, the seat system 360, and the payment system 365 on the basis of machine learning results.

2) Essential Components

The memory 340 is electrically connected to the main controller 370. The memory 340 may store basic data about a unit, control data for controlling the operation of the unit, and input/output data. The memory 340 may store data processed by the main controller 370. In hardware implementation, the memory 140 may be implemented as any one of a ROM, a RAM, an EPROM, a flash drive, and a hard drive. The memory 340 may store various types of data for the overall operation of the cabin system 300, such as a program for processing or controlling the main controller 370. The memory 340 may be integrated with the main controller 370.

The interface 380 may exchange a signal with at least one electronic device included in the vehicle 10 by wire or wirelessly. The interface 380 may be implemented with at least one of a communication module, a terminal, a pin, a cable, a port, a circuit, an element and a device.

The power supply 390 may provide power to the cabin system 300. The power supply 390 may be provided with power from a power source (e.g., battery) included in the vehicle 10 and supply the power to each unit of the cabin system 300. The power supply 390 may operate according to a control signal from the main controller 370. For example, the power supply 390 may be implemented as a SMPS.

The cabin system 300 may include at least one PCB. The main controller 370, the memory 340, the interface 380, and the power supply 390 may be mounted on at least one PCB.

3) Input Device

The input device 310 may receive a user input. The input device 310 may convert the user input into an electrical signal. The electrical signal converted by the input device 310 may be converted into a control signal and provided to at least one of the display system 350, the cargo system 355, the seat system 360, and the payment system 365. The main controller 370 or at least one processor included in the cabin system 300 may generate a control signal based on an electrical signal received from the input device 310.

The input device 310 may include at least one of a touch input unit, a gesture input unit, a mechanical input unit, and a voice input unit. The touch input unit may convert a touch input from the user into an electrical signal. The touch input unit may include at least one touch sensor to detect the user's touch input. In some implementations, the touch input unit may be implemented as a touch screen by integrating the touch input unit with at least one display included in the display system 350. Such a touch screen may provide both an input interface and an output interface between the cabin system 300 and the user. The gesture input unit may convert a gesture input from the user into an electrical signal. The gesture input unit may include at least one of an infrared sensor and an image sensor to detect the user's gesture input. In some implementations, the gesture input unit may detect a three-dimensional gesture input from the user. To this end, the gesture input unit may include a plurality of light output units for outputting infrared light or a plurality of image sensors. The gesture input unit may detect the user's three-dimensional gesture input based on the TOF, structured light, or disparity principle. The mechanical input unit may convert a physical input (e.g., press or rotation) from the user through a mechanical device into an electrical signal. The mechanical input unit may include at least one of a button, a dome switch, a jog wheel, and a jog switch. Meanwhile, the gesture input unit and the mechanical input unit may be integrated. For example, the input device 310 may include a jog dial device that includes a gesture sensor and is formed such that jog dial device may be inserted/ejected into/from a part of a surrounding structure (e.g., at least one of a seat, an armrest, and a door). When the jog dial device is parallel to the surrounding structure, the jog dial device may serve as the gesture input unit. When the jog dial device protrudes from the surrounding structure, the jog dial device may serve as the mechanical input unit. The voice input unit may convert a user's voice input into an electrical signal. The voice input unit may include at least one microphone. The voice input unit may include a beamforming MIC.

4) Imaging Device

The imaging device 320 may include at least one camera. The imaging device 320 may include at least one of an internal camera and an external camera. The internal camera may capture an image of the inside of the cabin. The external camera may capture an image of the outside of the vehicle 10. The internal camera may obtain the image of the inside of the cabin. The imaging device 320 may include at least one internal camera. It is desirable that the imaging device 320 includes as many cameras as the maximum number of passengers in the vehicle 10. The imaging device 320 may provide an image obtained by the internal camera. The main controller 370 or at least one processor included in the cabin system 300 may detect the motion of the user from the image acquired by the internal camera, generate a signal on the basis of the detected motion, and provide the signal to at least one of the display system 350, the cargo system 355, the seat system 360, and the payment system 365. The external camera may obtain the image of the outside of the vehicle 10. The imaging device 320 may include at least one external camera. It is desirable that the imaging device 320 include as many cameras as the maximum number of passenger doors. The imaging device 320 may provide an image obtained by the external camera. The main controller 370 or at least one processor included in the cabin system 300 may acquire user information from the image acquired by the external camera. The main controller 370 or at least one processor included in the cabin system 300 may authenticate the user or obtain information about the user body (e.g., height, weight, etc.), information about fellow passengers, and information about baggage from the user information.

5) Communication Device

The communication device 330 may exchange a signal with an external device wirelessly. The communication device 330 may exchange the signal with the external device through a network or directly. The external device may include at least one of a server, a mobile terminal, and another vehicle. The communication device 330 may exchange a signal with at least one user terminal. To perform communication, the communication device 330 may include an antenna and at least one of an RF circuit and element capable of at least one communication protocol. In some implementations, the communication device 330 may use a plurality of communication protocols. The communication device 330 may switch the communication protocol depending on the distance to a mobile terminal.

For example, the communication device 330 may exchange the signal with the external device based on the C-V2X technology. The C-V2X technology may include LTE-based sidelink communication and/or NR-based sidelink communication. Details related to the C-V2X technology will be described later.

The communication device 220 may exchange the signal with the external device according to DSRC technology or WAVE standards based on IEEE 802.11p PHY/MAC layer technology and IEEE 1609 Network/Transport layer technology. The DSRC technology (or WAVE standards) is communication specifications for providing ITS services through dedicated short-range communication between vehicle-mounted devices or between a road side unit and a vehicle-mounted device. The DSRC technology may be a communication scheme that allows the use of a frequency of 5.9 GHz and has a data transfer rate in the range of 3 Mbps to 27 Mbps. IEEE 802.11p may be combined with IEEE 1609 to support the DSRC technology (or WAVE standards).

According to the present disclosure, the communication device 330 may exchange the signal with the external device according to either the C-V2X technology or the DSRC technology. Alternatively, the communication device 330 may exchange the signal with the external device by combining the C-V2X technology and the DSRC technology.

6) Display System

The display system 350 may display a graphic object. The display system 350 may include at least one display device. For example, the display system 350 may include a first display device 410 for common use and a second display device 420 for individual use.

6.1) Common Display Device

The first display device 410 may include at least one display 411 to display visual content. The display 411 included in the first display device 410 may be implemented with at least one of a flat display, a curved display, a rollable display, and a flexible display. For example, the first display device 410 may include a first display 411 disposed behind a seat and configured to be inserted/ejected into/from the cabin, and a first mechanism for moving the first display 411. The first display 411 may be disposed such that the first display 411 is capable of being inserted/ejected into/from a slot formed in a seat main frame. In some implementations, the first display device 410 may further include a mechanism for controlling a flexible part. The first display 411 may be formed to be flexible, and a flexible part of the first display 411 may be adjusted depending on the position of the user. For example, the first display device 410 may be disposed on the ceiling of the cabin and include a second display formed to be rollable and a second mechanism for rolling and releasing the second display. The second display may be formed such that images may be displayed on both sides thereof. For example, the first display device 410 may be disposed on the ceiling of the cabin and include a third display formed to be flexible and a third mechanism for bending and unbending the third display. In some implementations, the display system 350 may further include at least one processor that provides a control signal to at least one of the first display device 410 and the second display device 420. The processor included in the display system 350 may generate a control signal based on a signal received from at last one of the main controller 370, the input device 310, the imaging device 320, and the communication device 330.

The display area of a display included in the first display device 410 may be divided into a first area 411*a* and a second area 411*b*. The first area 411*a* may be defined as a content display area. For example, at least one of graphic objects corresponding to display entertainment content (e.g., movies, sports, shopping, food, etc.), video conferences, food menus, and augmented reality images may be displayed in the first area 411. Further, a graphic object corresponding to driving state information about the vehicle 10 may be displayed in the first area 411*a*. The driving state information may include at least one of information about an object outside the vehicle 10, navigation information, and vehicle state information. The object information may include at least one of information about the presence of the object, information about the location of the object, information about the distance between the vehicle 10 and the object, and information about the relative speed of the vehicle 10 with respect to the object. The navigation information may include at least one of map information, information about a set destination, information about a route to the destination, information about various objects on the route, lane information, and information on the current location of the vehicle 10. The vehicle state information may include vehicle attitude information, vehicle speed information, vehicle tilt information, vehicle weight information, vehicle orientation information, vehicle battery information, vehicle fuel information, vehicle tire pressure information, vehicle steering information, vehicle internal temperature information, vehicle internal humidity information, pedal position information, vehicle engine temperature information, etc. The second area 411*b* may be defined as a user interface area. For example, an artificial intelligence agent screen may be displayed in the second area 411*b*. In some implementations, the second area 411*b* may be located in an area defined for a seat frame. In this case, the user may view content displayed in the second area 411*b* between seats. In some implementations, the first display device 410 may provide hologram content. For example, the first display device 410 may provide hologram content for each of a plurality of users so that only a user who requests the content may view the content.

6.2) Display Device for Individual Use

The second display device 420 may include at least one display 421. The second display device 420 may provide the display 421 at a position at which only each passenger may view display content. For example, the display 421 may be disposed on the armrest of the seat. The second display device 420 may display a graphic object corresponding to personal information about the user. The second display device 420 may include as many displays 421 as the maximum number of passengers in the vehicle 10. The second display device 420 may be layered or integrated with a touch sensor to implement a touch screen. The second display device 420 may display a graphic object for receiving a user input for seat adjustment or indoor temperature adjustment.

7) Cargo System

The cargo system 355 may provide items to the user according to the request from the user. The cargo system 355 may operate on the basis of an electrical signal generated by the input device 310 or the communication device 330. The cargo system 355 may include a cargo box. The cargo box may include the items and be hidden under the seat. When an electrical signal based on a user input is received, the cargo box may be exposed to the cabin. The user may select a necessary item from the items loaded in the cargo box. The cargo system 355 may include a sliding mechanism and an item pop-up mechanism to expose the cargo box according to the user input. The cargo system 355 may include a plurality of cargo boxes to provide various types of items. A weight sensor for determining whether each item is provided may be installed in the cargo box.

8) Seat System

The seat system 360 may customize the seat for the user. The seat system 360 may operate on the basis of an electrical signal generated by the input device 310 or the communication device 330. The seat system 360 may adjust at least one element of the seat by obtaining user body data. The seat system 360 may include a user detection sensor (e.g., pressure sensor) to determine whether the user sits on the seat. The seat system 360 may include a plurality of seats for a plurality of users. One of the plurality of seats may be disposed to face at least another seat. At least two users may sit while facing each other inside the cabin.

9) Payment System

The payment system 365 may provide a payment service to the user. The payment system 365 may operate on the basis of an electrical signal generated by the input device 310 or the communication device 330. The payment system 365 may calculate the price of at least one service used by the user and request the user to pay the calculated price.

3. C-V2X

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features will not be limited only to this.

FIG. 7 illustrates a structure of an LTE system to which the present disclosure is applicable. This may also be referred to as an Evolved-UMTS Terrestrial Radio Access Network (E-UTRAN), or a Long Term Evolution (LTE)/LTE-A system.

Referring to FIG. 7, the E-UTRAN includes a base station (BS) 20, which provides a control plane and a user plane to a user equipment (UE) 10. The UE 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicates with the UE 10 and may also be referred to by using different terms, such as evolved-NodeB (eNB), Base Transceiver System (BTS), Access Point (AP), and so on.

The base stations 20 are interconnected to one another through an X2 interface. The base stations 20 are connected to an Evolved Packet Core (EPC) 30 through an S1 interface. More specifically, the base station 20 are connected to a Mobility Management Entity (MME) through an S1-MME interface and connected to Serving Gateway (S-GW) through an S1-U interface.

The EPC 30 is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

FIG. 8 illustrates a radio protocol architecture of a user plane to which the present disclosure is applicable.

FIG. 9 illustrates a radio protocol architecture of a control plane to which the present disclosure is applicable. The user plane is a protocol stack for user data transmission, and the control plane is a protocol stack for control signal transmission.

Referring to FIG. 8 and FIG. 9, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data.

Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

FIG. 10 illustrates a structure of an NR system to which the present disclosure is applicable.

Referring to FIG. 10, a Next Generation-Radio Access Network (NG-RAN) may include a next generation-Node B (gNB) and/or eNB providing a user plane and control plane protocol termination to a user. FIG. 10 shows a case where the NG-RAN includes only the gNB. The gNB and the eNB are connected to one another via Xn interface. The gNB and the eNB are connected to one another via 5th Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

FIG. 11 illustrates a functional division between an NG-RAN and a 5GC to which the present disclosure is applicable.

Referring to FIG. 11, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

FIG. 12 illustrates a structure of a radio frame of an NR to which the present disclosure is applicable.

Referring to FIG. 12, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15*2^u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shown below represents an example of a number of symbols per slot a number slots per frame, and a number of slots per subframe in accordance with an SCS, in a case where a extended CP is used.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

FIG. 13 illustrates a structure of a slot of an NR frame to which the present disclosure is applicable.

Referring to FIG. 13, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

As illustrated in FIG. 14, a scheme in which transmit resource of a next packet is reserved in selection of transmit resource may be used.

As shown in FIG. 14, when transmission resources are selected, the transmission resource for a next packet may also be reserved.

FIG. 14 illustrates an example of transmission resource selection to which the present disclosure is applicable.

In V2X communication, two transmissions may be performed for each MAC PDU. For example, referring to FIG. A14, when resource for initial transmission is selected, resource for retransmission may be reserved with a predetermined time gap. A UE may determine transmission resources reserved by other UEs and resources used by other UEs through sensing within a sensing window, exclude them within the second window, and then randomly select resource from resources with less interference among the remaining resources.

For example, the UE may decode a PSCCH including information on the period of reserved resources within the sensing window and measure a PSSCH RSRP in resources periodically determined based on the PSCCH. The UE may exclude resources with the PSSCH RSRP value exceeding a threshold from the selection window. Thereafter, the UE may randomly select sidelink resource from among the remaining resources in the selection window.

Alternatively, the UE may measure a received signal strength indication (RSSI) of periodic resources within the sensing window and determine resources with less interference (e.g., resources corresponding to the bottom 20%). In addition, the UE may randomly select sidelink resource from among resources included in the selection window among the periodic resources. For example, when the UE fails to decode the PSCCH, the UE may use the above-described method.

FIG. 15 illustrates an example of PSCCH transmission in sidelink transmission mode 3 or 4 to which the present disclosure is applicable.

In V2X communication, that is, in sidelink transmission mode 3 or 4, a PSCCH and a PSSCH are frequency division multiplexed (FDM) and transmitted, unlike sidelink communication. Since latency reduction is important in V2X in consideration of the nature of vehicle communication, the PSCCH and PSSCH are FDM and transmitted on the same time resources but different frequency resources. Referring to FIG. 15, the PSCCH and PSSCH may not be contiguous to each other as illustrated in FIG. 15 (*a*) or may be contiguous to each other as illustrated in FIG. 15 (*b*). A subchannel is used as a basic transmission unit. The subchannel may be a resource unit including one or more RBs in the frequency domain within a predetermined time resource (e.g., time resource unit). The number of RBs included in the subchannel (i.e., the size of the subchannel and the starting position of the subchannel in the frequency domain) may be indicated by higher layer signaling. The example of FIG. 15 may be applied to NR sidelink resource allocation mode 1 or 2.

Hereinafter, a cooperative awareness message (CAM) and a decentralized environmental notification message (DENM) will be described.

In V2V communication, a periodic message type of CAM and an event-triggered type of DENM may be transmitted. The CAM may include dynamic state information about a vehicle such as direction and speed, vehicle static data such as dimensions, and basic vehicle information such as ambient illumination states, path details, etc. The CAM may be 50 to 300 bytes long. In addition, the CAM is broadcast, and the latency thereof should be less than 100 ms. The DENM may be generated upon the occurrence of an unexpected incident such as a breakdown, an accident, etc. The DENM may be shorter than 3000 bytes, and it may be received by all vehicles within the transmission range thereof. The DENM may be prioritized over the CAM.

Hereinafter, carrier reselection will be described.

The carrier reselection for V2X/sidelink communication may be performed by MAC layers based on the channel busy ratio (CBR) of configured carriers and the ProSe per-packet priority (PPPP) of a V2X message to be transmitted.

The CBR may refer to a portion of sub-channels in a resource pool where S-RSSI measured by the UE is greater than a preconfigured threshold. There may be a PPPP related to each logical channel, and latency required by both the UE and BS needs to be reflected when the PPPP is configured. In the carrier reselection, the UE may select at least one carrier among candidate carriers in ascending order from the lowest CBR.

Hereinafter, physical layer processing will be described.

A transmitting side may perform the physical layer processing on a data unit to which the present disclosure is applicable before transmitting the data unit over an air interface, and a receiving side may perform the physical layer processing on a radio signal carrying the data unit to which the present disclosure is applicable.

FIG. 16 illustrates physical layer processing at a transmitting side to which the present disclosure is applicable.

Table 3 shows a mapping relationship between UL transport channels and physical channels, and Table 4 shows a mapping relationship between UL control channel information and physical channels.

TABLE 3

| transport channel | physical channel |
|---|---|
| UL-SCH | PUSCH |
| RACH | PRACH |

TABLE 4

| Control information | physical channel |
|---|---|
| UCI | PUCCH, PUSCH |

Table 5 shows a mapping relationship between DL transport channels and physical channels, and Table 6 shows a mapping relationship between DL control channel information and physical channels.

TABLE 5

| transport channel | physical channel |
|---|---|
| DL-SCH | PDSCH |
| BCH | PBCH |
| PCH | PDSCH |

TABLE 6

| Control information | physical channel |
|---|---|
| DCI | PDCCH |

Table 7 shows a mapping relationship between sidelink transport channels and physical channels, and Table 8 shows a mapping relationship between sidelink control channel information and physical channels.

TABLE 7

| transport channel | physical channel |
|---|---|
| SL-SCH | PSSCH |
| SL-BCH | PSBCH |

TABLE 8

| Control information | physical channel |
|---|---|
| SCI | PSCCH |

Referring to FIG. 17, a transmitting side may encode a TB in step S100. The PHY layer may encode data and a control stream from the MAC layer to provide transport and control services via a radio transmission link in the PHY layer. For example, a TB from the MAC layer may be encoded to a codeword at the transmitting side. A channel coding scheme may be a combination of error detection, error correction, rate matching, interleaving, and control information or a transport channel demapped from a physical channel. Alternatively, a channel coding scheme may be a combination of error detection, error correcting, rate matching, interleaving, and control information or a transport channel mapped to a physical channel.

In the LTE system, the following channel coding schemes may be used for different types of transport channels and different types of control information. For example, channel coding schemes for respective transport channel types may be listed as in Table 9. For example, channel coding schemes for respective control information types may be listed as in Table 10.

TABLE 9

| transport channel | channel coding schemes |
|---|---|
| UL-SCH | LDPC(Low Density Parity Check) |
| DL-SCH | |
| SL-SCH | |
| PCH | |
| BCH | Polar code |
| SL-BCH | |

TABLE 10

| control information | channel coding schemes |
|---|---|
| DCI | Polar code |
| SCI | |
| UCI | Block code, Polar code |

For transmission of a TB (e.g., a MAC PDU), the transmitting side may attach a CRC sequence to the TB. Thus, the transmitting side may provide error detection for the receiving side. In sidelink communication, the transmitting side may be a transmitting UE, and the receiving side may be a receiving UE. In the NR system, a communication device may use an LDPC code to encode/decode a UL-SCH and a DL-SCH. The NR system may support two LDPC base graphs (i.e., two LDPC base metrics). The two LDPC base graphs may be LDPC base graph 1 optimized for a small TB and LDPC base graph 2 optimized for a large TB. The transmitting side may select LDPC base graph 1 or LDPC base graph 2 based on the size and coding rate R of a TB. The coding rate may be indicated by an MCS index, I_MCS. The MCS index may be dynamically provided to the UE by a PDCCH that schedules a PUSCH or PDSCH. Alternatively, the MCS index may be dynamically provided to the UE by a PDCCH that (re)initializes or activates UL configured grant type 2 or DL semi-persistent scheduling (SPS). The MCS index may be provided to the UE by RRC signaling related to UL configured grant type 1. When the TB attached with the CRC is larger than a maximum code block (CB) size for the selected LDPC base graph, the transmitting side may divide the TB attached with the CRC into a plurality of CBs. The transmitting side may further attach an additional CRC sequence to each CB. The maximum code block sizes for LDPC base graph 1 and LDPC base graph 2 may be 8448 bits and 3480 bits, respectively. When the TB attached with the CRC is not larger than the maximum CB size for the selected LDPC base graph, the transmitting side may encode the TB attached with the CRC to the selected LDPC base graph. The transmitting side may encode each CB of the TB to the selected LDPC basic graph. The LDPC CBs may be rate-matched individually. The CBs may be concatenated to generate a codeword for transmission on a PDSCH or a PUSCH. Up to two codewords (i.e., up to two TBs) may be transmitted simultaneously on the PDSCH. The PUSCH may be used for transmission of UL-SCH data and layer-1 and/or layer-2 control information. While not shown in FIG. 16, layer-1 and/or layer-2 control information may be multiplexed with a codeword for UL-SCH data.

In steps S101 and S102, the transmitting side may scramble and modulate the codeword. The bits of the codeword may be scrambled and modulated to produce a block of complex-valued modulation symbols.

In step S103, the transmitting side may perform layer mapping. The complex-valued modulation symbols of the codeword may be mapped to one or more MIMO layers. The codeword may be mapped to up to four layers. The PDSCH may carry two codewords, thus supporting up to 8-layer transmission. The PUSCH may support a single codeword, thus supporting up to 4-layer transmission.

In step S104, the transmitting side may perform precoding transform. A DL transmission waveform may be general OFDM using a CP. For DL, transform precoding (i.e., discrete Fourier transform (DFT)) may not be applied.

A UL transmission waveform may be conventional OFDM using a CP having a transform precoding function that performs DFT spreading which may be disabled or enabled. In the NR system, transform precoding, if enabled, may be selectively applied to UL. Transform precoding may be to spread UL data in a special way to reduce the PAPR of the waveform. Transform precoding may be a kind of DFT. That is, the NR system may support two options for the UL waveform. One of the two options may be CP-OFDM (same as DL waveform) and the other may be DFT-s-OFDM. Whether the UE should use CP-OFDM or DFT-s-OFDM may be determined by the BS through an RRC parameter.

In step S105, the transmitting side may perform subcarrier mapping. A layer may be mapped to an antenna port. In DL, transparent (non-codebook-based) mapping may be supported for layer-to-antenna port mapping, and how beamforming or MIMO precoding is performed may be transparent to the UE. In UL, both non-codebook-based mapping and codebook-based mapping may be supported for layer-to-antenna port mapping.

For each antenna port (i.e. layer) used for transmission of a physical channel (e.g. PDSCH, PUSCH, or PSSCH), the transmitting side may map complex-valued modulation symbols to subcarriers in an RB allocated to the physical channel.

In step S106, the transmitting side may perform OFDM modulation. A communication device of the transmitting side may add a CP and perform inverse fast Fourier transform (IFFT), thereby generating a time-continuous OFDM baseband signal on an antenna port p and a subcarrier spacing (SPS) configuration u for an OFDM symbol 1 within a TTI for the physical channel. For example, for each OFDM symbol, the communication device of the transmitting side may perform IFFT on a complex-valued modulation symbol mapped to an RB of the corresponding OFDM symbol. The communication device of the transmitting side may add a CP to the IFFI signal to generate an OFDM baseband signal.

In step S107, the transmitting side may perform upconversion. The communication device of the transmitting side may upconvert the OFDM baseband signal, the SCS configuration u, and the OFDM symbol 1 for the antenna port p to a carrier frequency f0 of a cell to which the physical channel is allocated.

Processors 102 and 202 of FIG. 23 may be configured to perform encoding, scrambling, modulation, layer mapping, precoding transformation (for UL), subcarrier mapping, and OFDM modulation.

FIG. 17 illustrates PHY-layer processing at a receiving side to which the present disclosure is applicable.

The PHY-layer processing of the receiving side may be basically the reverse processing of the PHY-layer processing of a transmitting side.

In step S110, the receiving side may perform frequency downconversion. A communication device of the receiving side may receive a radio frequency (RF) signal in a carrier frequency through an antenna. A transceiver 106 or 206 that receives the RF signal in the carrier frequency may downconvert the carrier frequency of the RF signal to a baseband to obtain an OFDM baseband signal.

In step S111, the receiving side may perform OFDM demodulation. The communication device of the receiving side may acquire complex-valued modulation symbols by CP detachment and fast Fourier transform (IFFT). For example, for each OFDM symbol, the communication device of the receiving side may remove a CP from the OFDM baseband signal. The communication device of the receiving side may then perform FFT on the CP-free OFDM baseband signal to obtain complex-valued modulation symbols for an antenna port p, an SCS u, and an OFDM symbol 1.

In step S112, the receiving side may perform subcarrier demapping. Subcarrier demapping may be performed on the complex-valued modulation symbols to obtain complex-valued modulation symbols of the physical channel. For example, the processor of a UE may obtain complex-valued modulation symbols mapped to subcarriers of a PDSCH among complex-valued modulation symbols received in a BWP.

In step S113, the receiving side may perform transform de-precoding. When transform precoding is enabled for a UL physical channel, transform de-precoding (e.g., inverse discrete Fourier transform (IDFT)) may be performed on complex-valued modulation symbols of the UL physical channel. Transform de-precoding may not be performed for a DL physical channel and a UL physical channel for which transform precoding is disabled.

In step S114, the receiving side may perform layer demapping. The complex-valued modulation symbols may be demapped into one or two codewords.

In steps S115 and S116, the receiving side may perform demodulation and descrambling. The complex-valued modulation symbols of the codewords may be demodulated and descrambled into bits of the codewords.

In step S117, the receiving side may perform decoding. The codewords may be decoded into TBs. For a UL-SCH and a DL-SCH, LDPC base graph 1 or LDPC base graph 2 may be selected based on the size and coding rate R of a TB. A codeword may include one or more CBs. Each coded block may be decoded into a CB to which a CRC has been attached or a TB to which a CRC has been attached, by the selected LDPC base graph. When CB segmentation has been performed for the TB attached with the CRC at the transmitting side, a CRC sequence may be removed from each of the CBs each attached with a CRC, thus obtaining CBs. The CBs may be concatenated to a TB attached with a CRC. A TB CRC sequence may be removed from the TB attached with the CRC, thereby obtaining the TB. The TB may be delivered to the MAC layer.

Each of processors 102 and 202 of FIG. 22 may be configured to perform OFDM demodulation, subcarrier demapping, layer demapping, demodulation, descrambling, and decoding.

In the above-described PHY-layer processing on the transmitting/receiving side, time and frequency resources (e.g., OFDM symbol, subcarrier, and carrier frequency) related to subcarrier mapping, OFDM modulation, and frequency upconversion/downconversion may be determined based on a resource allocation (e.g., an UL grant or a DL assignment).

Synchronization acquisition of a sidelink UE will be described below.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

FIG. 18 illustrates a V2X synchronization source or reference to which the present disclosure is applicable.

Referring to FIG. 18, in V2X, a UE may be synchronized with a GNSS directly or indirectly through a UE (within or out of network coverage) directly synchronized with the GNSS. When the GNSS is configured as a synchronization source, the UE may calculate a direct subframe number (DFN) and a subframe number by using a coordinated universal time (UTC) and a (pre)determined DFN offset.

Alternatively, the UE may be synchronized with a BS directly or with another UE which has been time/frequency synchronized with the BS. For example, the BS may be an eNB or a gNB. For example, when the UE is in network coverage, the UE may receive synchronization information provided by the BS and may be directly synchronized with the BS. Thereafter, the UE may provide synchronization information to another neighboring UE. When a BS timing is set as a synchronization reference, the UE may follow a cell associated with a corresponding frequency (when within the cell coverage in the frequency), a primary cell, or a serving cell (when out of cell coverage in the frequency), for synchronization and DL measurement.

The BS (e.g., serving cell) may provide a synchronization configuration for a carrier used for V2X or sidelink communication. In this case, the UE may follow the synchronization configuration received from the BS. When the UE fails in detecting any cell in the carrier used for the V2X or sidelink communication and receiving the synchronization configuration from the serving cell, the UE may follow a predetermined synchronization configuration.

Alternatively, the UE may be synchronized with another UE which has not obtained synchronization information directly or indirectly from the BS or GNSS. A synchronization source and a preference may be preset for the UE. Alternatively, the synchronization source and the preference may be configured for the UE by a control message provided by the BS.

A sidelink synchronization source may be related to a synchronization priority. For example, the relationship between synchronization sources and synchronization priorities may be defined as shown in Table 11. Table 11 is merely an example, and the relationship between synchronization sources and synchronization priorities may be defined in various manners.

TABLE 11

| Priority level | GNSS-based synchronization | eNB/gNB-based synchronization |
|---|---|---|
| P0 | GNSS | BS |
| P1 | All UEs directly All UEs directly synchronized with GNSS | All UEs directly All UEs directly synchronized with BS |
| P2 | All UEs directly All UEs indirectly synchronized with GNSS | All UEs directly All UEs indirectly synchronized with BS |
| P3 | All other UEs | GNSS |
| P4 | N/A | All UEs directly All UEs directly synchronized with GNSS |
| P5 | N/A | All UEs directly All UEs indirectly synchronized with GNSS |
| P6 | N/A | All other UEs |

Whether to use GNSS-based synchronization or BS-based synchronization may be (pre)determined. In a single-carrier operation, the UE may derive its transmission timing from an available synchronization reference with the highest priority.

In the conventional sidelink communication, the GNSS, eNB, and UE may be set/selected as the synchronization reference as described above. In NR, the gNB has been introduced so that the NR gNB may become the synchronization reference as well. However, in this case, the synchronization source priority of the gNB needs to be determined. In addition, a NR UE may neither have an LTE synchronization signal detector nor access an LTE carrier (non-standalone NR UE). In this situation, the timing of the NR UE may be different from that of an LTE UE, which is not desirable from the perspective of effective resource allocation. For example, if the LTE UE and NR UE operate at different timings, one TTI may partially overlap, resulting in unstable interference therebetween, or some (overlapping) TTIs may not be used for transmission and reception. To this end, various implementations for configuring the synchronization reference when the NR gNB and LTE eNB coexist will be described based on the above discussion. Herein, the synchronization source/reference may be defined as a synchronization signal used by the UE to transmit and receive a sidelink signal or derive a timing for determining a subframe boundary. Alternatively, the synchronization source/reference may be defined as a subject that transmits the synchronization signal. If the UE receives a GNSS signal and determines the subframe boundary based on a UTC timing derived from the GNSS, the GNSS signal or GNSS may be the synchronization source/reference.

In the conventional sidelink communication, the GNSS, eNB, and UE may be set/selected as the synchronization reference as described above. In NR, the gNB has been introduced so that the NR gNB may become the synchronization reference as well. However, in this case, the synchronization source priority of the gNB needs to be determined. In addition, a NR UE may neither have an LTE synchronization signal detector nor access an LTE carrier (non-standalone NR UE). In this situation, the timing of the NR UE may be different from that of an LTE UE, which is not desirable from the perspective of effective resource allocation. For example, if the LTE UE and NR UE operate at different timings, one TTI may partially overlap, resulting in unstable interference therebetween, or some (overlapping) TTIs may not be used for transmission and reception. To this end, various implementations for configuring the synchronization reference when the NR gNB and LTE eNB coexist will be described based on the above discussion. Herein, the synchronization source/reference may be defined as a synchronization signal used by the UE to transmit and receive a sidelink signal or derive a timing for determining a subframe boundary. Alternatively, the synchronization source/reference may be defined as a subject that transmits the synchronization signal. If the UE receives a GNSS signal and determines the subframe boundary based on a UTC timing derived from the GNSS, the GNSS signal or GNSS may be the synchronization source/reference.

Initial Access (IA)

For a process of connecting a base station and a UE, the base station and the UE (transmission/reception UE) may perform initial access (IA) operation.

Cell Search

Cell search refers to a procedure in which a UE obtains time and frequency synchronization with a cell and detects a physical layer cell TD of the cell. The UE receives the following synchronization signal (SS), primary synchronization signal (PSS) and secondary synchronization signal (SSS) to perform cell search.

The UE shall assume that reception time points of a physical broadcast channel (PBCH), a PSS and an SSS are in consecutive symbols to form an SS/PBCH block. The UE shall assume that SSS, PBCH DM-RS and PBCH data have the same EPRE. The UE may assume that a ratio of a Pcf EPRE to an SSS EPRE in the SS/PBCH block of the cell is 0 dB to 3 dB.

The cell search procedure of the UE may be summarized in Table 12.

TABLE 12

| | Type of Signals | Operations |
|---|---|---|
| $1^{st}$ step | PSS | *SS/PBCH block (SSB) symbol timing acquisition* Cell ID detection within a cell ID group(3 hypothesis) |
| $2^{nd}$ Step | SSS | * Cell ID group detection (336 hypothesis) |
| $3^{rd}$ Step | PBCH DMRS | * SSB index and Half frame index(Slot and frame boundary detection) |
| $4^{th}$ Step | PBCH | * Time information (80 ms, SFN, SSB index, HF)* RMSI CORESET/Search space configuration |
| $5^{th}$ Step | PDCCH and PDSCH | * Cell access information* RACH configuration |

A synchronization signal and a PBCH block are respectively composed of a primary synchronization signal (PSS) and a secondary synchronization signal (SSS) occupying one symbol and 127 subcarriers and a PBCH across three OFDM symbols and 240 subcarriers, but, as shown in FIG. 19, one symbol is left unused in the middle of the SSS. A period of the SS/PBCH block may be configured by a network and a time position where the SS/PBCH block may be transmitted may be determined by a subcarrier spacing.

Polar coding is used for a PBCH. Unless the network configures the UE to assume different subcarrier spacings, the UE may assume a band-specific subcarrier spacing for the SS/PBCH block.

The PBCH symbol carries a unique frequency-multiplexed DMRS. QPSK modulation is used for the PBCH.

There are 1008 unique physical layer cell IDs.

$$N_{ID}^{cell} = 3N_{ID}^{(1)} + N_{ID}^{(2)} \quad \text{[Equation 1]}$$

where, $$N_{ID}^{(1)} \in \{0, 1, \ldots , 335\} \text{ and } N_{ID}^{(2)} \in \{0, 1, 2\}$$

A PSS sequence $d_{PSS}(n)$ is defined by Equation 2 below.

$$d_{PSS}(n) = 1 - 2x(m) \quad \text{[Equation 2]}$$

$$m = (n + 43N_{ID}^{(2)}) \bmod 127$$

$$0 \le n < 127$$

$$x(i+7) = (x(i+4) + x(i)) \bmod 2,$$

$$[x(6)\ x(5)\ x(4)\ x(3)\ x(2)\ x(1)\ x(0)] = [1\ 1\ 1\ 0\ 1\ 1\ 0]$$

$$d_{SSS}(n) = \quad \text{[Equation 3]}$$

$$[1 - 2x_0((n + m_0) \bmod 127)][1 - 2x_1((n + m_1) \bmod 127)]$$

$$m_0 = 15\left\lfloor \frac{N_{ID}^{(1)}}{112} \right\rfloor + 5N_{ID}^{(2)}$$

$$m_1 = N_{ID}^{(1)} \bmod 112$$

$$0 \le n < 127$$

$$x_0(i+7) = (x_0(i+4) + x_0(i)) \bmod 2$$

-continued $$x_1(i+7) = (x_1(i+1) + x_1(i)) \bmod 2$$

$$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

This sequence is mapped to a physical resource shown in FIG. 19.

In the case of a half frame having an SS/PBCH block, a first symbol index for a candidate SS/PBCH block is determined according to the subcarrier spacing of the SS/PBCH block as follows.

Case A—15-kHz subcarrier spacing: The index of a first symbol of a candidate SS/PBCH block is {2, 8}+14*n. In the case of a carrier frequency greater than or equal to 3 GHz, n=0, 1. In the case of a carrier frequency greater than 3 GHz and less than 6 GHz, n=0, 1, 2, 3.

Case B—30-kHz subcarrier spacing: The index of a first symbol of a candidate SS/PBCH block is {4, 8, 16, 20}+28*n. In the case of a carrier frequency greater than or equal to 3 GHz, n=0. In the case of a carrier frequency greater than 3 GHz and less than 6 GHz, n=0, 1. Case C—30-kHz subcarrier spacing: The index of a first symbol of a candidate SS/PBCH block is {2, 8}+14*n. In the case of a carrier frequency greater than or equal to 3 GHz, n=0. In the case of a carrier frequency greater than 1.3 GHz and less than 6 GHz, n=0, 1, 2, 3.

Case D—120-kHz subcarrier spacing: The index of a first symbol of a candidate SS/PBCH block is {4, 8, 16, 20}+28*n. In the case of a carrier frequency greater than 6 GHz, n=0, 1, 2, 3, 5, 6, 7, 8, 10, 11, 12, 13, 15, 16, 17, 18. Case E—240-kHz subcarrier spacing: The index of a first symbol of a candidate SS/PBCH block is {8, 12, 16, 20, 32, 36, 40, 44}+56*n. In the case of a carrier frequency greater than 6 GHz, n=0, 1, 2, 3, 5, 6, 7, 8.

In the half frame, the candidate SS/PBCH blocks are indexed from 0 to L−1 in ascending chronological order. The UE shall determine 2 LSBs for the case of L=4 or 3 LSBs for the case of L>4 of the SS/PBCH block index per half frame from one-to-ne mapping with the index of a DM-RS sequence transmitted in the PBCH. The UE shall determine 3 MSBs of the SS/PBCH block index per half frame by PBCH payload bits $\bar{a}_{\bar{A}+5}$, $\bar{a}_{\bar{A}+6}$, $\bar{a}_{\bar{A}+7}$ for the case of L=4.

The UE may be configured by a higher layer parameter SSB-transmitted-SIB1, which is an index of an SS/PBCH block for a UE that should not receive other signals or channels of REs overlapping REs corresponding to the SS/PBCH block.

The UE may be configured by a higher layer parameter SSB-transmitted, which is an index of an SS/PBCH block that should not receive other signals or channels of REs overlapping REs corresponding to the SS/PBCH block, for each serving cell. Configuration by SSB-transmitted takes precedence over configuration by SSB-transmitted-SIB100. The UE may be configured by a higher layer parameter SSB-periodicityServingCell, which is a period of a half frame for reception of an SS/PBCH block per serving cell. When the period of the half frame for reception of the SS/PBCH block is not configured for the UE, the UE shall assume the period of the half frame. The UE shall assume that the period is the same for all SS/PBCH blocks of the serving cell.

FIG. 20 illustrates a method of obtaining timing information by a UE.

First, the UE may obtain 6-bit SNF information through a MIB MasterInformationBlock received in a PBCH. In addition, 4 bits of SNF may be obtained in PBCH transport block.

Second, the UE may obtain a 1-bit half-frame indication as part of PBCH payload. For below 3 GHz, the half-frame indication may be implicitly signaled as part of PBCH DMRS for Lmax=4.

Finally, the UE may obtain an SS/PBCH block index by DMRS sequence and PBCH payload. That is, 3 LSBs of the SS block index are obtained by DMRS sequence within a period of 5 ms. In addition, 3 MSBs of timing information are explicitly transmitted in PBCH payload (for 6 GHz and above).

For initial cell selection, the UE may assume that a half frame with an SS/PBCH block occurs with a period of 2 frames. Upon detection of the SS/PBCH block, the UE determines that there is a control resource set for Type0-PDCCH common search space in the case of $k_{SSB} \leq 23$ for FR1 and $k_{SSB} \leq 11$ for FR2. The UE determines that there is no control resource set for Type0-PDCCH common search space in the case of $k_{SSB} > 23$ for FR1 and $k_{SSB} > 11$ for FR2.

For a serving cell without transmission of an SS/PBCH block, the UE obtains time and frequency synchronization of the serving cell based on reception of the SS/PBCH block on PCell or PSCell of a cell group for the serving cell.

System Information Acquisition

System information (SI) is divided into an MIB MasterInformationBlock and several SIBs SystemInformationBlocks as follows.

MIB MasterInformationBlock is always transmitted on a BCH with a period of 80 ms and repeatedly within 80 ms, and includes parameters necessary to acquire SIB1 SystemInformationBlockType1 from a cell.

SIB1 (SystemInformationBlockType1) is periodically and repeatedly transmitted on a DL-SCH. SIB1 includes information on availability and scheduling of other SIBs (e.g., periodicity or SI window size). In addition, it indicates whether they (that is, other SIBs) are provided on a periodic broadcast or request basis. If the other SIBs are provided on a request basis, SIB1 includes information for the UE to perform an SI request.

SI other than SystemInformationBlockType1 is transmitted as an SI (SystemInformation) message transmitted through a DL-SCH. Each SI message is transmitted within a time domain window (SI window) occurring periodically.

In the case of PSCell and SCell, an RAN provides necessary SI through dedicated signalling. Nevertheless, the UE shall acquire an MIB of a PSCell in order to obtain SFN timing of an SCG (which may be different from an MCG). When relevant SI for an SCell is changed, the RAN releases and adds a relevant SCell. In the case of PSCell, SI may be changed only by reconfiguration through synchronization.

The UE acquires AS and NAS information by applying an SI acquisition procedure. The procedure applies to a UE in RRC_IDLE, RRC_INACTIVE and RRC_CONNECTED.

The UE in RRC_IDLE and RRC_INACTIVE shall have valid versions of (at least) MasterInformationBlock, SystemInformationBlockType1 and SystemInformationBlockTypeX through SystemInformationBlockTypeY (which varies according to support of relevant RAT for UE control mobility).

The UE in RRC_CONNECTED shall have valid versions of (at least one) MasterInformationBlock, SystemInformationBlockType1 and SystemInformationBlockTypeX (according to support of mobility for relevant RAT).

The UE shall store relevant SI acquired from a currently camped cell/serving cell. The version of SI acquired and stored by the UE is valid only for a specific time. The UE may use the stored version of SI. For example, when returning out of coverage after cell reselection or after SI change indication corresponds to this.

Random Access

The random access procedure of the UE may be summarized in Table 13 and FIG. 22.

TABLE 13

| | Type of Signals | Operations/Information Acquired |
|---|---|---|
| $1^{st}$ step | PRACH preamble in UL | * Initial beam acquisition* Random election of RA-preamble ID |
| $2^{nd}$ Step | Random Access Response on DL-SCH | Timing alignment information* RA-preamble ID<br>* Initial UL grant, Temporary C-RNTI |
| $3^{rd}$ Step | UL transmission on UL-SCH | * RRC connection request* UE identifier |
| $4^{th}$ Step | Contention Resolution on DL | * Temporary C-RNTI on PDCCH for initial access* C-RNTI on PDCCH for UE in RRC_CONNECTED |

First, the UE may transmit a PRACH preamble on UL as Msg1 of the random access procedure.

Random access preamble sequences having two lengths are supported. A long sequence length 839 applies at subcarrier spacings of 1.25 and 5 kHz, and a short sequence length 139 applies at subcarrier spacings of 15, 30, 60 and 120 kHz. The long sequence supports an unrestricted set and restricted sets of Type A and Type B, while the short sequence supports only an unrestricted set.

A plurality of RACH preamble formats is defined by one or more RACH OFDM symbols and different cyclic prefixes and guard times. A used PRACH preamble configuration is provided to the UE in system information.

If there is no response to Msg1, the UE may retransmit the PRACH preamble through power ramping within a preset number of times. The UE calculates the PRACH transmit power for retransmission of the preamble based on most recent estimated path loss and power ramp counter. When the UE performs beam switching, the power ramping counter remains unchanged.

The system information notifies the UE of association between an SS block and RACH resource. FIG. 23 shows the concept of the threshold of an SS block for association of the RACH resource.

The threshold of the SS block for association of the RACH resource is based on RSRP and network configurability. Transmission or retransmission of the RACH preamble is based on an SS block satisfying the threshold.

When the UE receives a random access response on a DL-SCH, the DL-SCH may provide timing alignment information, RA-preamble ID, initial UL grant and Temporary C-RNTI.

Based on this information, the UE may perform (transmit) UL transmission through a UL-SCH as Msg3 of the random access procedure. Msg3 may include an RRC connection request and a UE identifier.

In response thereto, the network may transmit Msg4 which may be treated as a contention resolution message on the DL. By receiving this, the UE may enter the RRC connection state.

A detailed description of each step is as follows.

Before starting the physical random access procedure, Layer 1 shall receive a set of SS/PBCH block indices from a higher layer and provide the higher layer with an RSRP measurement set corresponding thereto.

Before starting the physical random access procedure, Layer 1 shall receive the following information from the higher layer:

PRACH (Physical Random Access Channel) transmission parameter configuration (PRACH preamble format, time resources, and frequency resources for PRACH transmission).

parameter for determining a root sequence and cyclic shift thereof in a PRACH preamble sequence set (index of a logical root sequence table, cyclic shift ( ), set type (unrestricted, restricted set A, or restricted set B)).

From the viewpoint of a physical layer, an L1 random access procedure includes transmission of a random access preamble (Msg1) in PRACH, a random access response (RAR) message with PDCCH/PDSCH (Msg2) and, if applicable, transmission of Msg3 PUSCH and PDSCH for contention resolution.

When the random access procedure is initiated by "PDCCH order" for the UE, random access preamble transmission has the same subcarrier spacing as random access preamble transmission initiated by a higher layer.

If the UE is configured with two UL carriers for a serving cell and the UE detects "PDCCH order", the UE determines a UL carrier for corresponding random access preamble transmission using a UL/SUL indicator field value from the detected "PDCCH order".

In relation to the random access preamble transmission step, the physical random access procedure is triggered according to a PRACH transmission request or PDCCH order by the higher layer. A higher layer configuration for PRACH transmission includes the following.

configuration for PRACH transmission preamble index, preamble subcarrier spacing, $P_{PRACHtarget}$, corresponding RA-RNTI, and PRACH resource The preamble is transmitted using a PRACH format selected by transmit power $P_{PRACHb,f,c}(i)$ on indicated PRACH resource.

The UE is provided with a plurality of SS/PBCH blocks related to one PRACH occasion by the value of a higher layer parameter SSB-perRACH-Occasion. If the value of SSB-perRACH-Occasion is less than 1, one SS/PBCH block is mapped to SSB-per-rach-occasion which is 1/consecutive PRACH occasion. The UE is provided with a plurality of preambles per SS/PBCH block by a higher layer parameter cb-preamblePerSSB, and the UE determines the total number of preambles per SSB per PRACH occasion as a product of the values of SSB-perRACH-Occasion and cb-preamblePerSSB.

The SS/PBCH block indices are mapped to PRACH occasions in the following order.

First, the order of increasing the order of the preamble index within a single PRACH occasion Second, the order of increasing the frequency resource index for frequency multiplexed PRACH occasions Third, the order of increasing the time index for time multiplexed PRACH occasions in the PRACH slot Fourth, the order of increasing the index for PRACH slot A period starting from frame 0 for mapping the SS/PBCH block to the PRACH occasions is the smallest period of {1, 2, 4} PRACH configuration periods greater than or equal to $$\lceil N_{Tx}^{SSB}/N_{PRACHperiod}^{SSB} \rceil,$$

where the UE obtains $$N_{Tx}^{SSB}$$

from a higher layer parameter SSB-transmitted-SIB1, and $$N_{PRACHperiod}^{SSB}$$

is the number of SS/PBCH blocks which may be mapped to one PRACH configuration period.

When a random access procedure is initiated by the PDCCH order, the UE shall transmit a PRACH on an available first PRACH occasion, which is a time between a last symbol of PDCCH order reception and a first symbol of PRACH transmission equal to or greater than $N_{T,2}+\Delta_{BWPSwitching}+\Delta_{Delay}$ msec, when a request is made by a higher layer. $N_{T,2}$ is a time period of $N_2$ symbol corresponding to a PUSCH preparation time for PUSCH processing capability 1, and is a preset value. In response to PRACH transmission, the UE attempts to detect a PDCCH corresponding to an RA-RNTI during a window controlled by a higher layer.

The window starts at a first symbol of an initial control resource set, and the UE is configured for a Type1-PDCCH common search space which is at least $$\lceil (\Delta \cdot N_{slot}^{subframe,\mu} \cdot N_{symb}^{slot})/T_{sf} \rceil$$

symbols after a last symbol of a preamble sequence transmission.

A window length as the number of slots based on a subcarrier spacing for a Type0-PDCCH common search space is provided by a higher layer parameter rar-WindowLength.

If the UE detects a PDCCH corresponding to the corresponding RA-RNTI and the corresponding PDSCH including a DL-SCH transport block within the window, the UE transmit the transport block to a higher layer. The higher layer parses the transport block for a random access preamble identity (RAPID) related to PRACH transmission. When higher layers identify the RAPID in RAR messages(s) of the DL-SCH transport block, the higher layers indicate an uplink grant to a physical layer. This is referred to as a random access response (RAR) UL grant in the physical layer. If the higher layers do not identify the RAPID related to PRACH transmission, the higher layers may instruct the physical layer to transmit the PRACH. A minimum time between a last symbol of PDSCH reception and a first symbol of PRACH transmission is equal to $N_{T,1}+\Delta_{new}+0.5$ msec, wherein $N_{T,1}$ is a time period of $N_1$ symbol corresponding to a PDSCH reception time for PDSCH processing capability 1 when an additional PDSCH DM-RS is configured.

The UE shall receive a corresponding PDSCH including a DL-SCH transport block having the same DM-RS antenna port quasi co-location attributes and the PDCCH of the corresponding RA-RNTI, for the detected SS/PBCH block or the received CSI. When the UE attempts to detect the PDCCH corresponding to the RA-RNTI in response to PRACH transmission initiated by the PDCCH order, the UE assumes that the PDCCH and the PDCCH order have the same DM-RS antenna port quasi co-location attributes.

The RAR UL grant schedules PUSCH transmission from the UE (Msg3 PUSCH). The content of the RAR UL grant starting with MSB and ending with LSB is shown in Table 14. Table 14 shows a random access response grant content field size.

TABLE 14

| RAR grant field | Number of bits |
|---|---|
| Frequency hopping flag | 1 |
| Msg3 PUSCH frequency resource allocation | 12 |
| Msg3 PUSCH time resource allocation | 4 |
| MCS | 4 |
| TPC command for Msg3 PUSCH | 3 |
| CSI request | 1 |
| Reserved bits | 3 |

Msg3 PUSCH frequency resource allocation is for uplink resource allocation type 1. In the case of frequency hopping, based on indication of a frequency hopping flag field, a first bit or two bits of the Msg3 PUSCH frequency resource allocation field and $N_{UL,hop}$ bits are used as hopping information bits as shown in Table 14.

The MCS is determined from the first 16 indices of the MCS index table applicable to the PUSCH.

A TPC command $\delta_{msg,2,b,f,c}$ is used to set power of the Msg3 PUSCH and is interpreted according to Table 15. Table 15 shows a TPC command for the Msg3 PUSCH.

TABLE 15

| TPC Command | Value (in dB) |
|---|---|
| 0 | −6 |
| 1 | −4 |
| 2 | −2 |
| 3 | 0 |
| 4 | 2 |
| 5 | 4 |
| 6 | 6 |
| 7 | 8 |

In a contention-free random access procedure, a CSI request field is interpreted to determine whether an aperiodic CSI report is included in corresponding PUSCH transmission. In a contention random access procedure, a CSI request field is reserved.

Unless the UE configures a subcarrier spacing, the UE receives a subsequent PDSCH using the same subcarrier spacing as PDSCH reception for providing the RAR message.

When the UE does not detect a PDCCH within the window using the corresponding RA-RNTI and the corresponding DL-SCH transport block, the UE performs a random access response reception failure procedure.

For example, the UE may perform power ramping for retransmission of a random access preamble based on a power ramping counter. However, as shown in FIG. I.6, when the UE performs beam switching in PRACH retransmission, the power ramping counter remains unchanged.

In FIG. 24, when the UE retransmits a random access preamble for the same beam, the UE may increase the power ramping counter by 1. However, even if the beam is changed, the power ramping counter is not changed.

In relation to Msg3 PUSCH transmission, a higher layer parameter msg3-tp indicates whether the UE shall apply transform precoding to Msg3 PUSCH transmission. When the UE applies transform precoding to Msg3 PUSCH transmission with frequency hopping, a frequency offset for a second hop is given in Table 16. Table 16 shows a frequency offset for a second hop for Msg3 PUSCH transmission with frequency hopping.

TABLE 16

| Number of PRBs in initial active UL BWP | Value of $N_{UL,hop}$ Hopping Bits | Frequency offset of $2^{nd}$ hop |
|---|---|---|
| $N_{BWP}^{size} < 50$ | 0 | $N_{BWP}^{size}/2$ |
| | 1 | $N_{BWP}^{size}/4$ |
| $N_{BWP}^{size} \geq 50$ | 00 | $N_{BWP}^{size}/2$ |
| | 01 | $N_{BWP}^{size}/4$ |
| | 10 | $-N_{BWP}^{size}/4$ |
| | 11 | Reserved |

A subcarrier spacing for Msg3 PUSCH transmission is provided by a higher layer parameter msg3-scs. The UE shall transmit a PRACH and an Msg3 PUSCH through the same uplink carrier of the same serving cell. UL BWP for Msg3 PUSCH transmission is indicated by SystemInformationBlockType1.

If the PDSCH and the PUSCH have the same subcarrier spacing, a minimum time between a last symbol of PDSCH reception for transmitting the RAR to the UE and a first symbol of corresponding Msg3 PUSCH transmission scheduled by the RAR of the PDSCH is equal to $N_{T,1}+N_{T,2}+N_{TA,Max}+0.5$ msec. $N_{T,1}$ is a time period of $N_2$ symbol corresponding to a PDSCH reception time for PDSCH processing capability 1 when an additional PDSCH DM-RS is configured, $N_{T,2}$ is a time period of a symbol corresponding to a PUSCH preparation time for PUSCH processing capability 1, and $N_{TA,max}$ is a maximum timing adjustment value which may be provided in a TA command field of an RAR. In response to Msg3 PUSCH transmission when a C-RNTI is not provided to the UE, the UE attempts to detect a PDCCH with a TC-RNTI scheduling a PDSCH including a UE contention resolution ID. In response to PDSCH reception through the UE contention resolution ID, the UE transmits HARQ-ACK information in the PUCCH. A minimum time between a last symbol of PDSCH reception and a first symbol of the corresponding HARQ-ACK transmission is equal to $N_{T,1}+0.5$ msec. $N_{T,1}$ is a time period of a symbol corresponding to a PDSCH reception time for PDSCH processing capability 1 when an additional PDSCH DM-RS is configured.

Channel Coding Scheme

A channel coding scheme according to an embodiment mainly includes (1) LDPC (Low Density Parity Check) coding scheme for data and (2) other coding schemes such as Polar coding, repetition coding/simplex coding/Reed-Muller coding for control information.

Specifically, a network/UE may perform LDPC coding for a PDSCH/PUSCH with support of two basic graphs (BGs). BG1 is mother code rate 1/3 and BG2 is mother code rate 1/5.

For coding of control information, repetition coding/simplex coding/Reed-Muller coding may be supported. If the control information has a length longer than 11 bits, a polar coding scheme may be used. In the case of DL, a mother code size may be 512 and, in the case of UL, a mother code size may be 1024. Table 17 summarizes the coding scheme of uplink control information.

TABLE 17

| Uplink Control Information size including CRC, if present | Channel code |
|---|---|
| 1 | Repetition code |
| 2 | Simplex code |
| 3-11 | Reed Muller code |
| >11 | Polar code |

As described above, a polar coding scheme may be used for a PBCH. This coding scheme may be the same as in the PDCCH.

The LDPC coding structure will be described in detail.

The LDPC code is a (n, k) linear block code defined by a null space of (n, k) x a sparse parity-check matrix H.

$$Hx^T = 0 \qquad \text{[Equation 4]}$$

$$Hx^T = \begin{bmatrix} 1 & 1 & 1 & 0 & 0 \\ 1 & 0 & 0 & 1 & 1 \\ 1 & 1 & 0 & 0 & 0 \\ 0 & 1 & 1 & 1 & 0 \end{bmatrix} \begin{bmatrix} x_1 \\ x_2 \\ x_3 \\ x_4 \\ x_5 \end{bmatrix} = \begin{bmatrix} 0 \\ 0 \\ 0 \\ 0 \end{bmatrix}$$

The parity-check matrix is expressed as a protograph as shown in FIG. 25.

In an embodiment, a QC (quasi-cyclic) LDPC code is used. In this embodiment, a parity-check matrix is an m×n array of a Z×Z cyclic permutation matrix. By using this QC LDPC, it is possible to reduce complexity and to obtain highly parallelizable encoding and decoding.

FIG. 26 shows an example of a parity check matrix based on a 4-4 cyclic permutation matrix.

In FIG. 26, H is expressed by a shift value (cyclic matrix) and 0 (zero matrix) instead of Pi.

FIG. 27 is a view illustrating an encoder structure for a polar code. Specifically, FIG. 27(*a*) shows a basic module of a polar code and I.9(*b*) shows a basic matrix.

The polar code is known in the art as a code capable of obtaining channel capacity in a binary input discrete memoryless channel (B-DMC). That is, when the size N of the code block increases to infinity, channel capacity may be obtained. The encoder of the polar code performs channel combining and channel splitting as shown in FIG. 28.

UE States and State Transitions

FIG. 29 shows UE RRC state machine and state transition. The UE has one RRC state at a time.

FIG. 30 is a view illustrating UE state machine and state transition and a mobility procedure supported between an NR/NGC and an E-UTRAN/EPC.

The RRC state shows whether the RRC layer of the UE is logically connected to the RRC layer of the NG RAN.

When an RRC connection is established, the UE is in an RRC (radio resource control)_CONNECTED state or RRC_INACTIVE state. Otherwise, that is, when an RRC connection is not established, the UE is in an RRC_IDLE state.

In the RRC connection state or the RRC inactive state, since the UE has an RRC connection, the NG RAN may recognize presence of the UE in the cell unit. Accordingly, it is possible to effectively control the UE. On the other hand, in the RRC Idle state, the UE may not be recognized by the NG RAN, and is managed by the core network in a tracking area unit which is a unit of a wider area than the cell. That is, with respect to the UE in the RRC idle state, only presence of the UE is recognized in units of wide areas. In order to receive a general mobile communication service such as voice or data, switching to the RRC connection state is required.

When a user first turns on the UE, the UE first searches for a suitable cell and then maintains the RRC idle state in the cell. Only when it is necessary to establish an RRC connection, the UE in the RRC Idle state establishes an RRC connection with the NG RAN through an RRC connection procedure and then transition to the RRC connected state or the RRC_INACTIVE state. Examples of the case where the UE in the RRC Idle state establishes an RRC connection include various cases such as the case where uplink data transmission is necessary due to a call attempt of a user or the case where a response message is transmitted in response to a paging message received from the NG RAN.

The RRC IDLE state and the RRC INACTIVE state have the following features:

(1) RRC_IDLE:

UE-specific DRX (discontinuous reception) may be configured by a higher layer;

UE control mobility based on network configuration;

UE:

monitor a paging channel;

perform neighboring cell measurement and cell (reselection)

system information acquisition (2) RRC_INACTIVE:

UE-specific DRX may be configured by a higher layer or an RRC layer;

UE control mobility based on network configuration;

UE stores AS (Access Stratum) context;

UE:

monitor a paging channel;

perform neighboring cell measurement and cell (reselection)

perform RAN-based notification area update when moving out of RAN-based notification area.

system information acquisition (3) RRC_CONNECTED:

UE stores AS context;

unicast data transmission with UE;

in a lower layer, UE may be configured by UE-specific DRX;

in the case of UE supporting CA, use one or more SCells merged with SpCells for extended bandwidth;

in the case of UE supporting DC, use one SCG merged with MCG for extended bandwidth;

network control mobility from E-UTRAN/E-UTRAN in NR;

UE:

monitor a paging channel;

monitor a control channel related to a shared data channel to check whether data is reserved provide channel quality and feedback information perform neighboring cell measurement and measurement report system information acquisition RRC Idle State and RRC Inactive State The procedure of the UE related to the RRC_IDLE state and the RRC_INACTIVE state is summarized as shown in Table 18.

TABLE 18

| | UE procedure |
|---|---|
| 1st step | a public land mobile network (PLMN) selection when a UE is switched on |
| 2nd Step | cell (re)selection for searching a suitable cell |
| 3rd Step | tune to its control channel (camping on the cell) |
| 4th Step | Location registration and a RAN-based Notification Area (RNA) update |

PLMN selection, cell reselection procedure and location registration are common to both the RRC_IDLE state and the RRC_INACTIVE state.

When the UE is switched on, the PLMN is selected by NAS (Non-Access Stratum). For the selected PLMN, associated RAT (Radio Access Technology) may be set. The NAS shall provide an equivalent PLMN list to be used by the AS for cell selection and cell reselection, if possible.

Through cell selection, the UE may search for a suitable cell of the selected PLMN and select the cell to provide an available service, and, additionally, the UE tune to its control channel. This selection is referred to as "camping on the cell".

While the UE is in the RRC_IDLE state, the following three levels of services are provided Limited service (emergency calls, ETWS and CMAS in acceptable cell);

Normal service (public use in suitable cell);

Operator service (allowed only to operators in reserved cell).

While the UE is in the RRC_INACTIVE state, the following two levels of services are provided.

Normal service (public use in suitable cell);

Operator service (allowed only to operators in reserved cell).

The UE, if necessary, registers its presence by the NAS registration procedure of the tracking area of the selected cell, and, as a result of successful location registration, the selected PLMN becomes a registered PLMN.

When the UE finds the suitable cell according to a cell reselection criterion, the UE reselects the cell and camps on the cell. When a new cell does not belong to at least one tracking area in which the UE is registered, location registration is performed. In the RRC_INACTIVE state, if the new cell does not belong to the configured RNA, an RNA update procedure is performed.

If necessary, the UE searches for a PLMN having a higher priority at regular time intervals and searches for a suitable cell when the NAS selects another PLMN.

If the UE loses the coverage of the registered PLMN, a new PLMN is automatically selected (automatic mode) or manual selection is made (manual mode) because an indication indicating which PLMN is available is given to a user.

Registration is not performed by a UE capable of only services that do not require registration.

There are four purpose of camping on the cell in the RRC_IDLE state and the RRC_INACTIVE state.

a) The UE may be enabled to receive system information from the PLMN.

b) Upon registration and when the UE establishes an RRC connection, this may be performed by first accessing the network through the control channel of the camped cell.

c) When receiving a call to the registered UE, the PLMN knows a set of tracking areas, on which the UE camps (RCR_IDLE state) or the RNA (RCC_INACTIVE state) (in most cases). A "paging" message may be transmitted to the UE on the control channel of all cells of the set of areas. The UE may receive and respond to the paging message.

Three processes distinguished from the RRC_IDLE state and the RRC_INACTIVE state will be described in detail.

First, a PLMN selection procedure will be described.

In the UE, the AS shall report an available PLMN to the NAS according to the request of the NAS or autonomously.

In the PLMN selection process, based on a PLMN identifier list of priority, a specific PLMN may be automatically or manually selected. Each PLMN of the PLMN ID list is identified by "PLMN ID". In the system information of a broadcast channel, the UE may receive one or a plurality of "PLMN IDs" in a given cell. A PLMN selection result performed by the NAS is the identifier of the selected PLMN.

The UE shall scan all RF channels of the NR band according to ability to find an available PLMN. On each carrier, the UE shall search for a strongest cell and read system information, in order to determine which PLMN(s) belongs. When the UE may read one or several PLMN identifiers in the strongest cell, if the following high-quality criteria are satisfied, each found PLMN shall be reported to the NAS as a high-quality PLMN (however, there is no RSRP value).

In the case of an NR cell, a measured RSRP value shall be equal to or greater than −110 dBm.

A PLMN which does not satisfy the high-quality criteria but is found such that the UE may read the PLMN identifier is reported to the NAS along with the RSRP value. A quality measure value reported by the UE to the NAS shall be the same for each PLMN found in one cell.

PLMN search may be stopped according to the request of the NAS. The UE may optimize PLMN search using stored information, e.g., information on a carrier frequency and, optionally, a cell parameter from previously received measurement control information elements.

When the UE selects a PLMN, the cell selection procedure shall be performed to select a suitable cell of a PLMN on which the UE will camp.

Cell selection and cell reselection will now be described.

The UE shall perform measurement for the purpose of cell selection and reselection.

The NAS may indicate RAT related to the selected PLMN and control the RAT in which cell selection shall be performed, by maintaining a forbidden registration area(s) list and an equivalent PLMN list. The UE shall select a suitable cell based on RRC_IDLE state measurement and cell selection criteria.

To facilitate a cell selection process, stored information on several RATs may be available in the UE.

When camping on the cell, the UE shall periodically search for a better cell according to cell reselection criteria. When the better cell is found, the corresponding cell is selected. A change in cell may mean change in RAT. When received system information related to the NAS is changed due to cell selection and reselection, this is reported to the NAS.

For a normal service, the UE shall camp on the suitable cell and tune to the control channel(s) of the cell such that the UE performs the following:

receive system information from the PLMN;

receive registration area information from the PLMN, such as tracking area information receive other AS and NAS information if registered:

receive a paging and notification message from the PLMN start transmission in Connected mode For cell selection, the quantity of measurement of the cell depends on UE implementation.

For cell reselection in multi-beam operation, using a maximum number of beams to be considered and a threshold provided to SystemInformationBlockTypeX, the quantity of measurement of the cell is derived as follows between beams corresponding to the same cell based on the SS/PBCH block.

if a maximum beam measurement quantity value is less than a threshold:

the quantity of measurement of the cell is derived as a highest beam measurement quantity value;

in the other case, a cell measurement quantity is derived as a linear average of power values up to a maximum number of maximum beam measurement quantity value exceeding the threshold Cell selection is performed by one of the following two procedures.

a) initial cell selection (there is no prior knowledge of which RF channel is an NR carrier);

1. The UE shall scan all RF channels of an NR band according to ability to find a suitable cell.
2. At each carrier frequency, the UE searches for a strongest cell.
3. When the suitable cell is found, this cell shall be selected.

b) Cell selection using stored information.

1. This procedure requires previously received measurement control information elements or storage information of a carrier frequency from a previously detected cell and, optionally, information on a cell parameter.
2. When the UE find a suitable cell, the UE shall select this cell.
3. When the suitable cell is not found, an initial cell selection procedure shall start.

Next, a cell reservation and access restriction procedure will be described.

There are two mechanisms by which operators may apply cell reservation or access restriction. A first mechanism uses a cell state indication and special reservation to control the cell selection and reselection procedure. A second mechanism called unified access control disables a selected access category or access ID to transmit an initial access message due to load control reasons.

Cell state and cell reservation are indicated in MasterInformationBlock or SIB1 (SystemInformationBlockType1) message through the following three fields.

cellBarred (IE type: “barred” or “not barred”)

indicated in the MasterInformationBlock message. In the case of multiple PLMNs indicated in SIB1, this field is common to all PLMNs.

cellReservedForOperatorUse (IE type: “reserved” or “not reserved”)

indicated in the SystemInformationBlockType1 message. In the case of multiple PLMNs indicated in SIB1, this field is detailed per PLMN.

cellReservedForOtherUse (IE type: “reserved” or“not reserved”)

indicated in the SystemInformationBlockType1 message. In the case of multiple PLMNs indicated in SIB1, this field is common to all PLMNs.

When a cell state is marked as “not barred” and “not reserved” and is marked as “not reserved” for other purposes, all UEs shall treat this cell as a candidate cell during the cell selection and cell reselection procedure.

When a cell state is marked as “reserved” for other use,

UE shall treat the cell state of this cell as being “barred”.

When the cell state is marked as “not barred” and “reserved” for operator use of the PLMN and is “not reserved” for the other purposes, A UE allocated to Access Identity 11 or 15 operating in HPLMN/EHPLMN shall treat this cell as a candidate cell during a cell selection and reselection procedure when a cellReservedForOperatorUse field for the corresponding PLMN is configured to “reserved”.

A UE assigned to an access identifier in a range from 12 to 14 shall operate as if the cell state is “barred” in the case of “reserved for operator use” for the registered PLMN or the selected PLMN.

When the cell state “barred” is indicated or when the cell state is treated as “barred”, the UE may not select/reselect this cell even if it is not an emergency call.

the UE shall select another cell according to the following rules:

When MasterInformationBlock or SystemInformationBlockType1 cannot be obtained and thus the cell state is treated as “barred”:

the UE may exclude the barred cell as a cell selection/reselection candidate for a maximum 300 seconds.

When selection criteria are satisfied, the UE may select another cell at the same frequency.

otherwise, when the intraFreqReselection field of the MasterInformationBlock is configured to “allowed”, if reselection criteria are selected, the UE may select another cell at the same frequency.

The UE shall exclude the barred cell as a cell selection/reselection candidate for 300 seconds.

When the intraFreqReselection field of the MasterInformationBlock is configured to “not allowed”, the UE shall not reselect the cell at the same frequency as the barred cell.

The UE shall exclude the barred cell and the cell at the same frequency as the cell selection/reselection candidate for 300 seconds.

Cell selection of another cell may include a change in RAT.

Information on cell access restrictions related to an access category and ID is broadcast as system information.

The UE shall ignore cell access restrictions related to the access category and identifier for cell reselection. Change in indicated access restrictions shall not trigger cell reselection by the UE.

The UE shall cell access restriction related to the access category and identifier for NAS initiated access attempt and RNAU.

Next, a tracking area registration and RAN area registration procedure will be described.

In the UE, the AS shall report tracking area information to the NAS.

When the UE reads one or more PLMN identifiers in the current cell, the UE shall report the found PLMN identifier suitable for the tracking area information for the cell to the NAS.

The UE transmits RNAU (RAN-based notification area update) periodically or when selecting a cell which does not belong to the RNA configured by the UE.

Next, mobility in RRC IDLE and RRC INACTIVE will be described in greater detail.

In NR, the principle of PLMN selection is based on the 3GPP PLMN selection principle. Cell selection is required when switching from RM-DEREGISTERED to RM-REGISTERED, from CM-IDLE to CM-CONNECTED or from CM-CONNECTED to CM-IDLE, and is based on the following principles.

The UE NAS layer identifies a selected PLMN and an equivalent PLMN;

the UE search for an NR frequency band and identifies a strongest cell with respect to each carrier frequency. In order to identify the PLMN, a cell system information broadcast is read.

The UE may sequentially search for each carrier ("initial cell selection") or shorten search using stored information ("stored information cell selection").

The UE attempts to identify a suitable cell; and attempts to identify an acceptable cell if the suitable cell cannot be identified. When the suitable cell is found or only the acceptable cell is found, camping on the corresponding cell starts and a cell reselection procedure starts.

The suitable cell is a cell in which measured cell attributes satisfy cell selection criteria. A cell PLMN is a selected PLMN or a registered or equivalent PLMN, the cell is not barred or reserved, and a cell is not part of a tracking area in a "forbidden tracking areas for roaming" list.

The acceptable cell is a cell in which measured cell attributes satisfy cell selection criteria and the cell is not blocked.

Switching to RRC_IDLE:

When transitioning from RRC_CONNECTED to RRC_IDLE, the UE camps at a frequency allocated by RRC in any cell or cell/state transition message of a last cell/cell set in RRC_CONNECTED.

Recovery out of coverage:

The UE shall attempt to find a suitable cell in the manner described for the stored information or initial cell selection. When the suitable cell is not found at any frequency or RAT, the UE shall attempt to find an acceptable cell.

In multi-beam operation, cell quality is derived between beams corresponding to the same cell.

The UE in RC_IDLE performs cell reselection. The principle of the procedure is as follows.

The UE measures the attributes of the serving and neighboring cells to enable a reselection process.

Only a carrier frequency is indicated for search and measurement of neighboring cells between frequencies.

Cell reselection identifies a cell on which the UE shall camp. This is based on cell reselection criteria including measurement of serving and neighboring cells:

Intra-frequency reselection is based on the rank of the cell;

Inter-frequency reselection is based on absolute priority at which the UE attempts to camp with available maximum priority frequency;

NCL is provided by the serving cell to handle specific cases for intra- and inter-frequency neighboring cells.

The UE may provide a blacklist to prevent reselection of specific intra- and inter frequency neighboring cells.

Cell reselection may depend on a speed;

Prioritization of each service.

In multi-beam operation, cell quality is derived between beams corresponding to the same cell.

RRC_INACTIVE is a state in which the UE is maintained in a CM-CONNECTED state and may move in an area configured with NG-RAN (RNA) without announcing NG-RAN. In RRC_INACTIVE, a last serving gNB node maintains UE context and UE related NG connection with the serving AMF and UPF.

While the UE is in RRC_INACTIVE, when a last serving gNB receives DL data from the UPF or receives a DL signal from the AMF, if paging is performed in a cell corresponding to the RNA and the RNA includes a cell of neighboring gNB(s), XnAP RAN paging may be transmitted to the neighboring gNB.

The AMF provides RRC inactivity assistance information to the NG-RAN node to assist the NG-RAN node to determine whether the UE may be transitioned to RRC_INACTIVE. The RRC inactivity assistance information includes a registration area configured for the UE, UE specific DRX, a periodic registration update timer, whether the UE is configured by the AMF as a mobile initiated connection only (MICO) mode, and a UE identity index value. The UE registration area is considered by the NG-RAN node when configuring an RAN based notification area. The UE specific DRX and the UE identity index value are used by the NG-RAN node for RAN paging. The periodic registration update timer is considered to construct a periodic RAN notification area update timer in the NG-RAN node.

In switching to RRC_INACTIVE, the NG-RAN node may configure the UE with the periodic RNA update timer value.

When the UE accesses a gNB other than the last serving gNB, a reception gNB may trigger an XnAP search UE context procedure to acquire UE context from the last serving gNB, and trigger a data transmission procedure including tunnel information for potential recovery of data from the last serving gNB. According to successful context search, the reception gNB becomes a serving gNB and further triggers an NGAP path switch request procedure. After the path switch procedure, the serving gNB triggers release of the UE context in the last serving gNB by the XnAP UE context release procedure.

When the UE accesses a gNB other than the last serving gNB and the reception gNB does not find valid UE context, the gNB establishes a new RRC connection instead of resuming a previous RRC connection.

The UE in the RRC_INACTIVE shall start the RNA update procedure when moving out of the configured RNA. When receiving an RNA update request from the UE, the reception gNB may determine to transition the UE back to the RRC_INACTIVE state, to move the UE to the RRC_CONNECTED state or to transition the UE to RRC_IDLE.

The UE in RRC_INACTIVE performs cell reselection. The principle of the procedure is the same as the RRC_IDLE state.

DRX (Discontinuous Reception)

The procedure of the UE related to DRX may be summarized as shown in Table 19.

TABLE 19

| | Type of signals | UE procedure |
|---|---|---|
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

FIG. 31 shows a DRX cycle.

The UE uses DRX in an RRC_IDLE and RRC_INACTIVE state in order to reduce power consumption.

When DRX is configured, the UE performs DRX operation according to DRX configuration information.

The UE operating as DRX repeatedly turns on and off reception operation.

For example, when DRX is configured, the UE attempts to receive a PDCCH which is a downlink channel only for a predetermined time period and does not attempt to receive a PDCCH for the remaining period. A period in which the UE attempts to receive the PDCCH is referred to as an on-duration and this on-duration is defined once every DRX cycle.

The UE may receive DRX configuration information from the gNB through RRC signaling and operate as DRX through reception of a (Long) DRX command MAC CE.

The DRX configuration information may be included in MAC-CellGroupConfig.

IE MAC-CellGroupConfig is used to configure MAC parameters for a cell group including DRX.

Tables 20 and 21 show examples of IE MAC-CellGroupConfig.

TABLE 20

```
-- ASN1START
-- TAG-MAC-CELL-GROUP-CONFIG-START
MAC-CellGroupConfig ::=          SEQUENCE {
   drx-Config                    SetupRelease { DRX-Config }
                                    OPTIONAL, --Need M
   schedulingRequestConfig       SchedulingRequestConfig
                                 OPTIONAL, -- Need M
   bsr-Config                    BSR-Config
                              OPTIONAL, -- Need M
   tag-Config                    TAG-Config
                              OPTIONAL, -- Need M
   phr-Config                    SetupRelease { PHR-Config }
                                    OPTIONAL, -- Need M
   skipUplinkTxDynamic              BOOLEAN,
   cs-RNTI                          SetupRelease { RNTI-Value }
                                    OPTIONAL -- Need M
}
DRX-Config ::=                   SEQUENCE {
   drx-onDurationTimer              CHOICE {
                                    subMilliSeconds INTEGER (1..31),
                                    milliSeconds: ENUMERATED {
                                 ms1, ms2, ms3, ms4, ms5, ms6, ms8, ms10, ms20,
ms30, ms40, ms50, ms60, ms80, ms100, ms200, ms300, ms400, ms500, ms600, ms800,
ms1000, ms1200, ms1600, spare9, spare8, spare7, spare6, spare5, spare4, spare3, spare2,
spare1}
                                    },
   drx-InactivityTimer           ENUMERATED {
                                 ms0, ms1, ms2, ms3, ms4, ms5, ms6, ms8, ms10,
ms20, ms30, ms40, ms50, ms60, ms80, ms100, ms200, ms300, ms500, ms750, ms1280,
ms1920, ms2560, spare9, spare8, spare7, spare6, spare5, spare4, spare3, spare2, spare1},
   drx-HARQ-RTT-TimerDL             INTEGER (0..56),
   drx-HARQ-RTT-TimerUL             INTEGER (0..56),
   drx-RetransmissionTimerDL        ENUMERATED {
                                 sl0; sl1, sl2, sl4, sl6, sl8, sl6, sl24, sl33, sl40, sl64,
sl80, sl96, sl112, sl128, sl160, sl320, spare15, spare14, spare13, spare12, spare11, spare10,
spare9, spare8, spare7, spare6, spare5, spare4, spare3, spare2, spare1},
   drx-Retransmission TimerUL       ENUMERATED {
                                 sl0, sl1, sl2, sl4, sl6, sl8, sl16, sl24, sl33, sl40, sl64,
sl80, sl96, sl112, sl128, sl160, sl320, spare15, spare14, spare13, spare12, spare11, spare10,
spare9, spare8, spare7, spare6, spare5, spare4, spare3, spare2, spare1 },
   drx-LongCycleStartOffset       CHOICE {
      ms10                       INTEGER(0..9),
      ms20                       INTEGER(0..19),
      ms32                       INTEGER(0..31),
      ms40                       INTEGER(0..39),
      ms60                       INTEGER(0..59),
      ms64                       INTEGER(0..63),
      ms70                       INTEGER(0..69),
      ms80                       INTEGER(0..79),
      ms128                      INTEGER(0..127),
      ms160                      INTEGER(0..159),
      ms256                      INTEGER(0.255),
      ms320                      INTEGER(0..319),
      ms512                      INTEGER(0..511),
      ms640                      INTEGER(0..639),
      ms1024                     INTEGER(0..1023),
      ms1280                     INTEGER(0..1279),
```

TABLE 20-continued

```
      ms2048                    INTEGER(0..2047),
      ms2560                    INTEGER(0..2559),
      ms5120                    INTEGER(0..5119),
      ms10240                   INTEGER(0..10239)
   },
   shortDRX                  SEQUENCE {
      drx-ShortCycle             ENUMERATED {
                                   ms2, ms3, ms4, ms5, ms6, ms7, ms8, ms10,
ms14, ms16, ms20, ms30, ms32, ms35, ms40, ms64, ms80, ms128, ms160, ms256, ms320,
ms512, ms640, spare9, spare8, spare7, spare6, spare5, spare4, spare3, spare2, spare1 },
      drx-ShortCycleTimer       INTEGER (1..16)
   }   OPTIONAL,                                                        -- Need R
   drx-SlotOffset             INTEGER (0..31)
}
```

TABLE 21

| MAC-CellGroupConfig field descriptions |
|---|
| drx-Config<br>Used to configure DRX. |
| drx-HARQ-RTT-TimerDL<br>Value in number of symbols. |
| drx-HARQ-RTT-TimerUL<br>Value in number of symbols. |
| drx-Inactivity Timer<br>Value in multiple integers of 1ms. ms0 corresponds to 0, ms1 corresponds to 1ms, ms2 corresponds to 2ms, and soon. |
| drx-onDuration Timer<br>Value in multiples of 1/32 ms (subMilliSeconds) or in ms (milliSecond). For the latter, ms1 corresponds to 1ms, ms2 corresponds to 2ms, and so on. |
| drx-LongCycleStartOffset<br>dix-LongCycle in ms and drx-StartOffset in multiples of 1ms. |
| drx-RetransmissionTimerDL<br>Value in number of slot lengths: sl1 corresponds to 1 slot, sl2 corresponds to 2 slots, and so on. |
| drx-RetransmissionTimerUL<br>Value in number of slot lengths. sl1 corresponds to 1 slot, sl2 corresponds to 2 slots, and so on. |
| drx-ShortCycle<br>Value in ms. ms1 corresponds to 1ms, ms2 corresponds to 2ms, and so on. |
| drx-ShortCycleTimer<br>Value in multiples of drx-ShortCycle. A value of 1 corresponds to drx-ShortCycle, a value of 2 corresponds to 2 * drx-ShortCycle and so on. |
| drx-SlotOffset<br>Value in 1/32 ms. Value 0 corresponds to 0ms, value 1 corresponds to 1/32ms, value 2 corresponds to 2/32ms, and so on. |

drx-onDurationTimer is a duration when a DRX cycle starts. drx-SlotOffset is slot delay before starting drx-onDurationTimer.

drx-StartOffset is a subframe in which the DRX cycle starts.

drx-InactivityTimer is a duration after a PDCCH in which a PDCCH occurs.

It indicates initial UL or DL user data transmission for MAC entity.

drx-RetransmissionTimerDL (per DL HARQ process) is a maximum duration until DL retransmission is received.

drx-RetransmissionTimerUL (per UL HARQ process) is a maximum duration until a grant for UL retransmission is received.

drx-LongCycle is a Long DRX cycle.

drx-ShortCycle (option) is a Short DRX cycle.

drx-ShortCycleTimer (option) is a period during which the UE shall follow the Short DRX Cycle.

drx-HARQ-RTT-TimerDL (per DL HARQ process) is a minimum duration before DL allocation for HARQ retransmission is expected by the MAC entity.

drx-HARQ-RTT-TimerUL (per UL HARQ process) is a minimum duration until UL HARQ retransmission grant is expected by the MAC entity.

DRX Command MAC CE or Long DRX Command MAC CE is identified by an MAC PDU subheader with an LCID. The fixed size is 0 bits.

Table 5 shows an example of the LCID value for DL-SCH.

TABLE 22

| Index | LCID values |
|---|---|
| 111011 | Long DRX Command |
| 111100 | DRX Command |

The PDCCH monitoring activity of the UE is managed by DRX and BA.

When DRX is configured, the UE does not need to continuously monitor the PDCCH.

DRX has the following features.

on-duration: a time when the UE waits to receive a PDCCH after waking up. When the UE successfully decodes the PDCCH, the UE remains awake and starts an inactivity timer;

inactivity-timer: a period in which the UE waits to successfully decode the PDCCH from last successful decoding of the PDCCH. If it fails, the UE may return to sleep. The UE shall restart the inactivity timer according to single successful decoding of the PDCCH for first transmission (that is, not retransmission).

retransmission timer: a period continued until retransmission is expected;

cycle: periodic repetition and inactivity cycle of on-duration.

Next, DRX described in the MAC layer will be described. The MAC entity used below may be expressed by a UE or an MAC entity of a UE.

The MAC entity may be configured by RRC with a DRX function for controlling PDCCH monitoring activity of the UE for C-RNTI, CS-RNTI, TPC-PUCCH-RNTI, TPC-PUSCH-RNTI and TPC-SRS-RNTI of the MAC entity. When DRX operation is used, the MAC entity shall monitor the PDCCH. In RRC_CONNECTED, when DRX is configured, the MAC entity may discontinuously monitor the PDCCH using DRX operation; otherwise, the MAC entity shall continuously monitor the PDCCH.

RRC controls DRX operation by configuring parameters in Tables 3 and 4 (DRX configuration information).

When the DRX cycle is configured, the following time is included in the activity time.

during execution of drx-onDurationTimer or drx-InactivityTimer or drx-RetransmissionTimerDL or drx-RetransmissionTimerUL or ra-ContentionResolutionTimer, or during pending after a scheduling request is transmitted on a PUCCH; or after successfully receiving a random access response to a random access preamble which is not selected by the MAC entity among contention-based random access preambles, a PDCCH indicating new transmission addressed to the C-RNTI of the MAC entity is not received.

When DRX is configured, the MAC entity shall perform operation shown in the following table.

TABLE 23

1> if a MAC PDU is transmitted in a configured uplink grant:
2> start the drx-HARQ-RTT-TimerUL for the corresponding HARQ process immediately after the first repetition of the corresponding PUSCH transmission;
2> stop the drx-RetransmissionTimerUL for the corresponding HARQ process.
1> if a drx-HARQ-RTT-TimerDL expires:
2> if the data of the corresponding HARQ process was not successfully decoded:
3> start the drx-RetransmissionTimerDL for the corresponding HARQ process.
1> if a drx-HARQ-RTT-TimerUL expires:
2> start the drx-RetransmissionTimerUL for the corresponding HARQ process.
1> if a DRX Command MAC CE or a Long DRX Command MAC CE is received:
2> stop drx-onDurationTimer;
2> stop drx-InactivityTimer.
1> if drx-InactivityTimer expires or a DRX Command MAC CE is received;
2> if the Short DRX cycle is configured:
3> start or restart drx-ShortCycleTimer,
3> use the Short DRX Cycle.
2> else:
3> use the Long DRX cycle.
1> if drx-ShortCycleTimer expires:
2> use the Long DRX cycle.
1> if a Long DRX Command MAC CE is received:
2> stop drx-ShortCycleTimer;
2> use the Long DRX cycle.
1> if the Short DRX Cycle is used, and [(SFN × 10) + subframe number] modulo (drx-ShortCycle) = (drx-StartOffset) modulo (drx-ShortCycle); or
1> if the Long DRX Cycle is used, and [(SFN × 10) + subframe number] modulo (drx-LongCycle) = drx-StartOffset:
2> if drx-SlotOffset is configured:
3> start drx-onDurationTimer after drx-SlotOffset.
2> else:
3> start drx-onDurationTimer.
1> if the MAC entity is in Active Time:
2> monitor the PDCCH;
2> if the PDCCH indicates a DL transmission or if a DL assignment has been configured:
3> start the drx-HARQ-RTT-TimerDL for the corresponding HARQ process immediately after the corresponding PUCCH transmission;
3> stop the drx-RetransmissionTimerDL for the corresponding HARQ process.
2> if the PDCCH indicates a UL transmission;
3> start the drx-HARQ-RTT-TimerUL for the corresponding HARQ process immediately after the first repetition of the corresponding PUSCH transmission;
3> stop the drx-RetransmissionTimerUL for the corresponding HARQ process.
2> if the PDCCH indicates a new transmission (DL or UL);
3> start or restart drx-InactivityTimer:
1> else (i.e: not part of the Active Time);
2> not transmit type-0-triggered SRS.
1> if CQI masking (cqi-Mask) is setup by upper layers:
2> if drx-onDurationTimer is not running:
3> not report CSI on PUCCH.
1> else:
2> if the MAC entity is not in Active Time:
3> report CSI on PUCCH:

Regardless of whether the MAC entity is monitoring a PDCCH, the MAC entity performs transmission when expecting HARQ feedback and type 1 trigger SRS.

The MAC entity does not need to monitor the PDCCH when it is not a complete PDCCH occasion (for example, an active time starts or expires in the middle of the PDCCH occasion).

Next, DRX for paging will be described.

The UE may use DRX in the RRC_IDLE and RRC_INACTIVE state to reduce power consumption. The UE monitors one paging occasion (PO) per DRX cycle, and one PO may be composed of a plurality of time slots (e.g., subframes or OFDM symbols) in which paging DCI may be transmitted. In multi-beam operation, the length of one PO is one cycle of beam sweeping, and the UE may assume that the same paging message is repeated in all beams of a sweeping pattern. The paging message is the same for both RAN-initiated paging and CN-initiated paging.

One paging frame (PF) is one radio frame which may include one or a plurality of paging events.

The UE initiates an RRC connection resumption procedure when receiving RAN paging. when the UE receives CN-initiated paging in the RRC_INACTIVE, the UE moves to RRC_IDLE and notify NAS.

On the other hand, when UEs supporting V2X communication perform sidelink communication, the UEs require automatic gain control (AGC) operation in step of receiving information. Such AGC operation performs a function for maintaining a signal at a constant amplitude level and is first performed in signal processing. In LTE V2X, AGC is performed using a first symbol of 14 OFDM symbols of one subframe. AGC is operation required for both a control channel and a data channel and a time required for AGC may vary depending on the modulation order. (Hereinafter, a time required for AGC is referred to as an AGC time, a control channel is referred to as a PSCCH, and a data channel is referred to as a PSSCH.) For example, the modulation order of the PSCCH uses QPSK, and, in the PSSCH, if higher order modulation (e.g., 16QAM) is used, the AGC times of the PSCCH and the PSSCH may be different.

On the other hand, in the NR SL system, for efficient resource transmission between UEs, a procedure where a Tx UE request a CSI report from an Rx UE may be necessary. In this case, for CSI measurement by the Rx UE, a CSI-RS may be transmitted within the PSSCH and CSI triggering may be performed through the PSCCH associated with the corresponding PSSCH. In this situation, if the Rx UE succeeds in decoding of the PSCCH, it is possible for the Rx UE to report CSI to the Tx UE on time, but, if decoding of the PSCCH fails, there is a problem in that a relevant RS cannot be sufficiently detected during a certain measurement window that is determined based on a time for reporting the CSI from the Rx UE. Accordingly, hereinafter, according to an embodiment of the present invention, a method of processing CSI report operation in an Rx UE and an apparatus supporting the method.

Embodiment

A UE according to an embodiment may receive a Physical Sidelink shared Channel (PSSCH) including a Channel State Information Reference Signal (CSI-RS) (S3201 of FIG. 32) and transmit a Channel State Information (CSI) report based on the CSI-RS within a predetermined window (S3202 of FIG. 32).

Here, a parameter related to the predetermined window may be independently configured with respect to at least one of a resource pool, a service type, a priority, a Quality of Service (QoS) parameter, a Block Error Rate (BLER), a speed, a CSI payload size, a subchannel size or a frequency resource region size. The parameter may include one or more of a length of the predetermined window, a start time of the window, and an end time of the window. In other words, a CSI_RPTW (a time preset from a time when the CSI-RS is received or when the CSI report is triggered) related parameter (e.g., a length, an interval between a SLOT N time and a CSI_RPTW start time (and/or end time, etc.) (and/or information on whether the proposed rule is applied) may be configured specifically or differently (or independently) (by the network/base station) with respect to a resource pool (and/or a service type/priority and/or a (service) QOS parameter (e.g., RELIABILITY, LATENCY) and a target requirement (e.g., BLER) and/or a UE (absolute or relative) speed and/or a CSI payload size and/or a subchannel size and/or a scheduled (PSSCH) frequency resource region size).

The QoS parameter may include one or more of reliability and latency. When the latency is configured to be small (or when the relative/absolute speed is large), the length of the predetermined window may be configured to be less than a predetermined value. That is, in the case of a relatively short LATENCY service (and if the (relative or absolute) speed of the UE is high), a CSI_RPTW length (and/or an interval between a SLOT N time and a CSI_RPTW start time (and/or an end time)) may be configured to be relatively small (for example, for the purpose of efficiently satisfying target LATENCY requirements and mitigating OUTDATE of CSI information).

The predetermined window may start after a preset time from a slot in which the PSSCH including the CSI-RS is received. For example, the predetermined window may be a time period from N+K1 to N+K2 shown in FIG. 33. The preset time may be a minimum time required to generate information for the CSI report, and may correspond to N to N+K1 shown in FIG. 33. More specifically, the TX UE may configure the RX UE to complete the CSI report (to the Tx UE) within the preset time (CSI_RPTW) from the time when the CSI-RS is received (or the time when the CSI report is triggered) (SLOT N). Here, CSI_RPTW may be configured to SLOT N+K1 to SLOT N+K2 (e.g., (minimum or maximum or average) K2 value (and/or K1 value) may be configured) in consideration of a minimum time K1 required for CSI measurement/calculation and CSI information generation. For example, when the corresponding rule is applied, it may be interpreted that the RX UE has to complete the CSI report to the TX UE within the time window from SLOT N+K1 to SLOT N+K2.

Meanwhile, based on that the UE not detecting the CSI-RS for the CSI report, the UE may delay the CSI report. Alternatively, based on that the UE not detecting the CSI-RS for the CSI report, the UE may skip the CSI report. Alternatively, based on that the UE not detecting the CSI-RS for the CSI report, the UE may include, in the CSI report, information indicating that the CSI-RS is not detected. In addition, based on that the UE not detecting the CSI-RS for the CSI report, the report may be skipped. Here, not detecting the CSI-RS may mean that the RS for CSI measurement is not sufficient. The reason may include the case where the Tx UE did not initially perform transmission and the case where the Tx UE performed transmission but the Rx UE did not detect and recognize the PSCCH. The case where the Tx UE performed transmission but the Rx UE did not detect the PSCCH may include up to half duplex. In this case, the Rx UE may skip the report or delay the report time and expect an additional RS to be transmitted from the Tx UE or report insufficient RS to the Tx UE and transmit a separate message indicating the situation or allocate one state to a CQI table to use the same. The Rx UE may operate in one of the above manners or a combination of the above manners.

In addition, the size of the measurement window may vary according to information included in the CSI report. More specifically, depending on information reported by the Rx UE, necessary RS density and a window length for measuring the RS may vary. RI is considered to be a relatively long term and may be estimated by an RS transmitted a while ago, but PMI or CQI is a relatively short term and may be measured only when sufficient RS is transmitted relatively recently. For example, the size of the measurement window for RI may be greater than that of the measurement window for PMI and CQI. In this case, some (e.g., RS and CQI) may be reported, but PMI may be reported as "unidentifiable". This may be regarded as a change in CSI reporting configuration, and the CSI reporting configuration may be regarded as a configuration for specifying which information is reported. That is, information included in the CSI report may be indicated by the CSI reporting configuration.

In this way, the Rx UE may select the CSI reporting configuration based on a channel variation, a relative speed with the Tx UE (or an absolute speed of the Rx UE) and so on. That is, the UE may select the CSI reporting configuration based on one or more of a channel variation, a relative speed of a UE which has transmitted the PSSCH and/or an absolute speed of the UE. In this case, in case that UCI piggyback is used, it is necessary to indicate configuration for the CSI reporting and whether CSI reporting is performed in SCI in order to perform correctly rate matching for the PSSCH.

The matters of embodiment(s) and/or an embodiment may be regarded as one proposed method or a combination of the matters and/or embodiment may be regarded as a new method. In addition, the matters are not limited to the embodiments of the present disclosures and are not limited to a specific system. All (parameters) and/or (operations) and/or (a combination of each parameter and/or operation) and/or (whether to apply the corresponding parameter and/or operation) and/or (whether to apply a combination of each parameter and/or operation) of the embodiment(s) may be (pre)configured through higher layer signaling and/or physical layer signaling from a base station to a UE or may be predefined in a system. In addition, each of matters of the embodiment(s) may be defined as one operation mode, and one of the matters may be (pre)configured through higher layer signaling and/or physical layer signaling from a base station to a UE, such that the base station operates according to the corresponding operation mode. A transmit time interval (TTI) or a resource unit for signal transmission of the embodiment(s) may correspond to units having various lengths, such as basic unit which is a basic transmission unit or sub-slot/slot/subframe, and the UE of the embodiment(s) may correspond to devices having various shapes, such as a vehicle, pedestrian UE, etc. In addition, operation of a UE and/or a base station and/or a road side unit (RSU) of the embodiment(s) is not limited to each device type and is applicable to different types of devices. For example, in the embodiment(s), a matter described as operation of a base station is applicable to operation of a UE. Alternatively, a matter applied to direct communication between UEs in the embodiment(s) may be used between a UE and a base station (for example, uplink or downlink). At this time, the proposed method may be used for communication between a UE and a special UE such as a base station, a relay node or a UE type RSU or communication between special types of wireless devices. In addition, in the above description, the base station may be replaced with a relay node or a UE-type RSU.

By the way, the present disclosure is not limited to D2D communication. That is, the disclosure may be applied to UL or DL communication, and in this case, the proposed methods may be used by a BS, a relay node, etc.

Since each of the examples of the proposed methods may be included as one method for implementing the present disclosure, it is apparent that each example may be regarded as a proposed method. Although the proposed methods may be implemented independently, some of the proposed methods may be combined (or merged) for implementation. In addition, it may be regulated that information on whether the proposed methods are applied (or information on rules related to the proposed methods) should be transmitted from a BS to a UE or from a transmitting UE to a receiving UE through a predefined signal (e.g., a physical layer signal, a higher layer signal, etc.).

Device Configurations According to Embodiment(s)

Hereinbelow, a device to which the present disclosure is applicable will be described.

FIG. 34 illustrates a wireless communication device according to an implementation of the present disclosure.

Referring to FIG. 34, a wireless communication system may include a first device 9010 and a second device 9020.

The first device 9010 may be a BS, a network node, a transmitting UE, a receiving UE, a radio device, a wireless communication device, a vehicle, an autonomous driving vehicle, a connected car, a drone (unmanned aerial vehicle (UAV)), an artificial intelligence (AI) module, a robot, an augmented reality (AR) device, a virtual reality (VR) device, a mixed reality (MR) device, a hologram device, a public safety device, an MTC device, an IoT device, a medical device, a FinTech device (or financial device), a security device, a climate/environment device, a device related to 5G services, or a device related to the fourth industrial revolution field.

The second device 9020 may be a BS, a network node, a transmitting UE, a receiving UE, a radio device, a wireless communication device, a vehicle, an autonomous driving vehicle, a connected car, a drone (UAV), an AI module, a robot, an AR device, a VR device, an MR device, a hologram device, a public safety device, an MTC device, an IoT device, a medical device, a FinTech device (or financial device), a security device, a climate/environment device, a device related to 5G services, or a device related to the fourth industrial revolution field.

For example, the UE may include a portable phone, a smart phone, a laptop computer, a terminal for digital broadcasting, a personal digital assistants (PDA), a portable multimedia player (PMP), a navigator, a slate personal computer (PC), a tablet PC, an ultrabook, a wearable device (e.g., watch type terminal (smartwatch), glass type terminal (smart glass), head mounted display (HMD)), etc. For example, the HMD may be a display device worn on the head. The HMD may be used to implement VR, AR, or MR.

For example, the drone may be a flying object controlled by radio control signals without a human pilot. For example, the VR device may include a device for implementing an object or background in a virtual world. For example, the AR device may include a device for connecting an object or background in a virtual world to an object or background in the real world. For example, the MR device may include a device for merging an object or background in a virtual world with an object or background in the real world. For example, the hologram device may include a device for implementing a 360-degree stereographic image by recording and playing back stereographic information based on a light interference phenomenon generated when two lasers called holography are met. For example, the public safety device may include a video relay device or imaging device capable of being worn on a user's body. For example, the MTC and IOT devices may be a device that does not require direct human intervention or manipulation. For example, the MTC and IoT devices may include a smart meter, a vending machine, a thermometer, a smart bulb, a door lock, or various sensors. For example, the medical device may be a device used for diagnosing, treating, mitigating, handling, or preventing a disease. For example, the medical device may be a device used for diagnosing, treating, mitigating, or correcting an injury or obstacle. For example, the medical device may be a device used for testing, substituting, or modifying a structure or function. For example, the medical device may be a device used for controlling pregnancy. For example, the medical device may include a device for medical treatment, a device for operation, a device for (external) diagnosis, a hearing aid, or a device for surgery. For example, the security device may be a device installed to prevent a potential danger and maintain safety. For example, the security device may be a camera, a CCTV, a recorder, or a black box. For example, the FinTech device may be a device capable of providing financial services such as mobile payment. For example, the FinTech device may include a payment device or point of sales (POS). For example, the climate/environment device may include a device for monitoring or predicting the climate/environment.

The first device 9010 may include at least one processor such as a processor 9011, at least one memory such as a memory 9012, and at least one transceiver such as a transceiver 9013. The processor 9010 may perform the above-described functions, procedures, and/or methods. The processor 9010 may implement one or more protocols. For example, the processor 9010 may implement one or more radio interface protocol layers. The memory 9012 is connected to the processor 9010 and may store various forms of information and/or instructions. The transceiver 9013 may be connected to the processor 9010 and may be controlled to transmit and receive radio signals. The transceiver 9013 may be connected to one or more antennas 9014-1 to 9014-*n*, and the transceiver 9013 may be configured to transmit and receive the user data, the control information, a radio signal/channel, etc. described in the methods and/or flowcharts of this specification through one or more antennas 9014-1 to 9014-*n*. In this specification, the n antennas may be the number of physical antennas or the number of logical antenna ports.

The second device 9020 may include at least one processor such as a processor 9021, at least one memory such as a memory 9022, and at least one transceiver such as a transceiver 9023. The processor 9021 may perform the above-described functions, procedures, and/or methods. The processor 9021 may implement one or more protocols. For example, the processor 9021 may implement one or more radio interface protocol layers. The memory 9022 is connected to the processor 9021 and may store various forms of information and/or instructions. The transceiver 9023 may be connected to the processor 9021 and may be controlled to transmit and receive radio signals. The transceiver 9023 may be connected to one or more antennas 9024-1 to 9024-*n*, and the transceiver 9203 may configured to transmit and receive the user data, the control information, the radio signal/channel, etc. described in the methods and/or flowcharts of this specification through one or more antennas 9024-1 to 9024-*n*.

The memory 9012 and/or memory 9022 may be connected inside or outside the processor 9011 and/or the processor 9021, respectively. Further, the memory 9012 and/or memory 9022 may be connected to other processors through various technologies such as a wired or wireless connection. FIG. 35 illustrates a wireless communication device according to an embodiment.

FIG. 35 shows a more detailed view of the first or second device 9010 or 9020 of FIG. 34. However, the wireless communication device of FIG. 35 is not limited to the first or second device 9010 or 9020. The wireless communication device may be any suitable mobile computing device for implementing at least one configuration of the present disclosure such as a vehicle communication system or device, a wearable device, a portable computer, a smart phone, etc.

Referring to FIG. 35, the wireless communication device (UE) may include at least one processor (e.g., DSP, microprocessor, etc.) such as a processor 9110, a transceiver 9135, a power management module 9105, an antenna 9140, a battery 9155, a display 9115, a keypad 9120, a GPS chip 9160, a sensor 9165, a memory 9130, a subscriber identification module (SIM) card 9125 (which is optional), a speaker 9145, and a microphone 9150. The UE may include at least one antennas.

The processor 9110 may be configured to implement the above-described functions, procedures, and/or methods. In some implementations, the processor 9110 may implement one or more protocols such as radio interface protocol layers.

The memory 9130 is connected to the processor 9110 and may store information related to the operations of the processor 9110. The memory 9130 may be located inside or outside the processor 9110 and connected to other processors through various techniques such as wired or wireless connections.

A user may enter various types of information (e.g., instructional information such as a telephone number) by various techniques such as pushing buttons of the keypad 9120 or voice activation using the microphone 9150. The processor 9110 may receive and process the information from the user and perform appropriate functions such as dialing the telephone number. For example, the processor 9110 data may retrieve data (e.g., operational data) from the SIM card 9125 or the memory 9130 to perform the functions. As another example, the processor 9110 may receive and process GPS information from the GPS chip 9160 to perform functions related to the location of the UE, such as vehicle navigation, map services, etc. As a further example, the processor 9110 may display various types of information and data on the display 9115 for user reference and convenience.

The transceiver 9135 is connected to the processor 9110 and may transmit and receives a radio signal such as an RF signal. The processor 9110 may control the transceiver 9135 to initiate communication and transmit radio signals including various types of information or data such as voice communication data. The transceiver 9135 includes a receiver and a transmitter to receive and transmit radio signals. The antenna 9140 facilitates the radio signal transmission and reception. In some implementations, upon receiving radio signals, the transceiver 9135 may forward and convert the signals to baseband frequency for processing by the processor 9110. Various techniques may be applied to the processed signals. For example, the processed signals may be transformed into audible or readable information to be output via the speaker 9145.

In some implementations, the sensor 9165 may be coupled to the processor 9110. The sensor 9165 may include one or more sensing devices configured to detect various types of information including, but not limited to, speed, acceleration, light, vibration, proximity, location, image, and so on. The processor 9110 may receive and process sensor information obtained from the sensor 9165 and perform various types of functions such as collision avoidance, autonomous driving, etc.

In the example of FIG. 35, various components (e.g., camera, universal serial bus (USB) port, etc.) may be further included in the UE. For example, a camera may be coupled to the processor 9110 and used for various services such as autonomous driving, vehicle safety services, etc.

The UE of FIG. 35 is merely exemplary, and implementations are not limited thereto. That is, in some scenarios, some components (e.g., keypad 9120, GPS chip 9160, sensor 9165, speaker 9145, and/or microphone 9150) may not be implemented in the UE.

FIG. 36 illustrates a transceiver of a wireless communication device according to an embodiment. Specifically, FIG. 36 shows a transceiver that may be implemented in a frequency division duplex (FDD) system.

In the transmission path, at least one processor such as the processor described in FIGS. 34 and 35 may process data to be transmitted and then transmit a signal such as an analog output signal to a transmitter 9210.

In the transmitter 9210, the analog output signal may be filtered by a low-pass filter (LPF) 9211, for example, to remove noises caused by prior digital-to-analog conversion (ADC), upconverted from baseband to RF by an upconverter (e.g., mixer) 9212, and amplified by an amplifier 9213 such as a variable gain amplifier (VGA). The amplified signal may be filtered again by a filter 9214, further amplified by a power amplifier (PA) 9215, routed through duplexer 9250 and antenna switch 9260, and transmitted via an antenna 9270.

In the reception path, the antenna 9270 may receive a signal in a wireless environment. The received signal may be routed through the antenna switch 9260 and duplexer 9250 and sent to a receiver 9220.

In the receiver 9220, the received signal may be amplified by an amplifier such as a low noise amplifier (LNA) 9223, filtered by a band-pass filter 9224, and downconverted from RF to baseband by a downconverter (e.g., mixer) 9225.

The downconverted signal may be filtered by an LPF 9226 and amplified by an amplifier such as a VGA 9227 to obtain an analog input signal, which is provided to the at least one processor such as the processor.

Further, a local oscillator (LO) 9240 may generate and provide transmission and reception LO signals to the upconverter 9212 and downconverter 9225, respectively.

In some implementations, a phase locked loop (PLL) 9230 may receive control information from the processor and provide control signals to the LO 9240 to generate the transmission and reception LO signals at appropriate frequencies.

Implementations are not limited to the particular arrangement shown in FIG. 36, and various components and circuits may be arranged differently from the example shown in FIG. 36.

FIG. 37 illustrates a transceiver of a wireless communication device according to an embodiment. Specifically, FIG. 37 shows a transceiver that may be implemented in a time division duplex (TDD) system.

In some implementations, a transmitter 9310 and a receiver 9320 of the transceiver in the TDD system may have one or more similar features to those of the transmitter and the receiver of the transceiver in the FDD system. Hereinafter, the structure of the transceiver in the TDD system will be described.

In the transmission path, a signal amplified by a PA 9315 of the transmitter may be routed through a band selection switch 9350, a BPF 9360, and an antenna switch(s) 9370 and then transmitted via an antenna 9380.

In the reception path, the antenna 9380 may receive a signal in a wireless environment. The received signals may be routed through the antenna switch(s) 9370, the BPF 9360, and the band selection switch 9350 and then provided to the receiver 9320.

FIG. 38 illustrates sidelink operations of a wireless device according to an embodiment. The sidelink operations of the wireless device shown in FIG. 38 are merely exemplary, and the wireless device may perform sidelink operations based on various techniques. The sidelink may correspond to a UE-to-UE interface for sidelink communication and/or sidelink discovery. The sidelink may correspond to a PC5 interface as well. In a broad sense, the sidelink operation may mean information transmission and reception between UEs. Various types of information may be transferred through the sidelink.

Referring to FIG. 38, the wireless device may obtain sidelink-related information in step S9410. The sidelink-related information may include at least one resource configuration. The wireless device may obtain the sidelink-related information from another wireless device or a network node.

After obtaining the sidelink-related information, the wireless device may decode the sidelink-related information in step S9420.

After decoding the sidelink-related information, the wireless device may perform one or more sidelink operations based on the sidelink-related information in step S9430. The sidelink operation(s) performed by the wireless device may include at least one of the operations described herein.

FIG. 39 illustrates sidelink operations of a network node according to an embodiment. The sidelink operations of the network node shown in FIG. 39 are merely exemplary, and the network node may perform sidelink operations based on various techniques.

Referring to FIG. 39, the network node may receive sidelink-related information from a wireless device in step S9510. For example, the sidelink-related information may correspond to Sidelink UE Information, which is used to provide sidelink information to a network node.

After receiving the sidelink-related information, the network node may determine whether to transmit one or more sidelink-related instructions based on the received information in step S9520.

When determining to transmit the sidelink-related instruction(s), the network node may transmit the sidelink-related instruction(s) to the wireless device in S9530. In some implementations, upon receiving the instruction(s) transmitted from the network node, the wireless device may perform one or more sidelink operations based on the received instruction(s).

FIG. 40 illustrates the implementation of a wireless device and a network node according to an embodiment. The network node may be replaced with a wireless device or a UE.

Referring to FIG. 40, a wireless device 9610 may include a communication interface 9611 to communicate with one or more other wireless devices, network nodes, and/or other entities in the network. The communication interface 9611 may include one or more transmitters, one or more receivers, and/or one or more communications interfaces. The wireless device 9610 may include a processing circuitry 9612. The processing circuitry 9612 may include at least one processor such as a processor 9613 and at least one memory such as a memory 9614.

The processing circuitry 9612 may be configured to control at least one of the methods and/or processes described herein and/or enable the wireless device 9610 to perform the methods and/or processes. The processor 9613 may correspond to one or more processors for performing the wireless device functions described herein. The wireless device 9610 may include the memory 9614 configured to store the data, programmable software code, and/or information described herein.

In some implementations, the memory 9614 may store software code 9615 including instructions that allow the processor 9613 to perform some or all of the above-described processes when driven by the at least one processor such as the processor 9613.

For example, the at least one processor such as the processor 9613 configured to control at least one transceiver such as a transceiver 2223 may process at least one processor for information transmission and reception.

A network node 9620 may include a communication interface 9621 to communicate with one or more other network nodes, wireless devices, and/or other entities in the network. The communication interface 9621 may include one or more transmitters, one or more receivers, and/or one or more communications interfaces. The network node 9620 may include a processing circuitry 9622. The processing circuitry 9622 may include a processor 9623 and a memory 9624.

In some implementations, the memory 9624 may store software code 9625 including instructions that allow the processor 9623 to perform some or all of the above-described processes when driven by at least one processor such as the processor 9623.

For example, the at least one processor such as the processor 9623 configured to control at least one transceiver such as a transceiver 2213 may process at least one processor for information transmission and reception.

The above-described implementations may be embodied by combining the structural elements and features of the present disclosure in various ways. Each structural element and feature may be selectively considered unless specified otherwise. Some structural elements and features may be implemented without any combination with other structural elements and features. However, some structural elements and features may be combined to implement the present disclosure. The operation order described herein may be changed. Some structural elements or feature in an implementation may be included in another implementation or replaced with structural elements or features suitable for the other implementation.

The above-described implementations of the present disclosure may be embodied through various means, for example, hardware, firmware, software, or any combination thereof. In a hardware configuration, the methods according the present disclosure may be achieved by at least one of one or more ASICs, one or more DSPs, one or more DSPDs, one or more PLDs, one or more FPGAs, one or more processors, one or more controllers, one or more microcontrollers, one or more microprocessors, etc.

In a firmware or software configuration, the methods according to the present disclosure may be implemented in the form of a module, a procedure, a function, etc. Software code may be stored in a memory and executed by a processor. The memory may be located inside or outside the processor and exchange data with the processor via various known means.

Those skilled in the art will appreciate that the present disclosure may be carried out in other specific ways than those set forth herein without departing from the spirit and essential characteristics of the present disclosure. Although the present disclosure has been described based on the 3GPP LTE/LTE-A system or 5G system (NR system), the present disclosure is also applicable to various wireless communication systems

INDUSTRIAL APPLICABILITY

The above-described implementations of the present disclosure are applicable to various mobile communication systems.

The invention claimed is:

1. A method, comprising:

transmitting, by a first user equipment (UE) to a second UE, sidelink control information (SCI) including information related to a channel state information (CSI) request, wherein a CSI report is triggered by the SCI with the information related to the CSI request;

transmitting, by the first UE to the second UE, a CSI-reference signal (CSI-RS) within a physical sidelink shared channel (PSSCH) transmission, only when the CSI report is triggered by the SCI; and receiving, by the first UE from the second UE, the CSI report related to the CSI-RS, wherein the CSI report is received based on a latency bound of the CSI report from the triggering of the CSI report in terms of number of slots.

2. The method of claim 1, wherein the CSI report is transmitted within a window, wherein a parameter related to the window is configured based on at least one of a resource pool, a service type, a priority, a quality of service (QoS) parameter, a block error rate (BLER), a speed, a CSI payload size, a subchannel size or a frequency resource region size, and wherein the QoS parameter comprises one or more of reliability and latency.

3. The method of claim 2, wherein, when the latency is configured to be small, a length of the window is configured to be less than a preset value.

4. The method of claim 2, wherein the window starts after a preset time from a slot in which the PSSCH transmission including the CSI-RS is received.

5. The method of claim 4, wherein the preset time is a minimum time required to generate information for the CSI report.

6. The method of claim 2, wherein a size of the window is determined based on which information is included in the CSI report.

7. The method of claim 6, wherein a size of a window for rank indicator (RI) is greater than a size of a window for precoding matrix indicator (PMI) and CQI.

8. The method of claim 1, wherein the CSI report is delayed based on the second UE failing to detect the CSI-RS.

9. The method of claim 1, wherein the CSI report is skipped based on the second UE failing to detect the CSI-RS.

10. The method of claim 1, wherein the CSI report includes information indicating that the CSI-RS is not detected based on the second UE failing to detect the CSI-RS for the CSI report.

11. The method of claim 10, wherein the information indicating that the CSI-RS is not detected is represented by one state of a channel quality indicator (CQI) table.

12. The method of claim 1, wherein which information is included in the CSI report is indicated by a CSI reporting configuration.

13. The method of claim 1, wherein the CSI report includes a channel quality information (CQI).

14. The method of claim 1, wherein the CSI-RS is transmitted only within the PSSCH transmission.

15. The method of claim 1, wherein the CSI-RS is not mapped outside of a resource for the PSSCH transmission.

16. A first user equipment (UE), comprising:

at least one transceiver;

at least one processor; and at least one memory connected to the at least one processor and storing instructions that, based on being executed by the at least one processor, cause the first UE to perform operations comprising:

transmitting, to a second UE, sidelink control information (SCI) including information related to channel state information (CSI) request, wherein a CSI report is triggered by the SCI with the information related to the CSI request;

transmitting, to the second UE, a CSI-reference signal (CSI-RS) within a physical sidelink shared channel (PSSCH) transmission, only when the CSI report is triggered by the SCI; and receiving, from the second UE, the CSI report related to the CSI-RS, wherein the CSI report is received based on a latency bound of the CSI report from the triggering of the CSI report in terms of number of slots.

17. The first UE of claim 16, wherein the CSI report includes a channel quality information (CQI).

18. The first UE of claim 16, wherein which information is included in the CSI report is indicated by a CSI reporting configuration.

19. The method of claim 1, wherein the CSI report is received based on a latency related parameter for determining a boundary for transmission of the CSI report.

20. A second user equipment (UE), comprising:

at least one transceiver;

at least one processor; and at least one memory connected to the at least one processor and storing instructions that, based on being executed by the at least one processor, cause the second UE to perform operations comprising:

receiving, from a first UE, sidelink control information (SCI) including information related to channel state information (CSI) request, wherein a CSI report is triggered by the SCI with the information related to the CSI request;

receiving, from the first UE, a CSI-reference signal (CSI-RS) within a physical sidelink shared channel (PSSCH) transmission, only when the CSI report is triggered by the SCI; and transmitting, to the first UE, the CSI report related to the CSI-RS, wherein the CSI report is transmitted based on a latency bound of the CSI report from the triggering of the CSI report in terms of number of slots.

* * * * *